United States Patent [19]
Bouldin et al.

[11] Patent Number: 5,343,963
[45] Date of Patent: Sep. 6, 1994

[54] METHOD AND APPARATUS FOR PROVIDING CONTROLLED FORCE TRANSFERENCE TO A WELLBORE TOOL

[76] Inventors: Brett W. Bouldin, 15802 St. Lawrence Ct., Friendswood, Tex. 77546; Steven C. Owens, 6019 Fernhollow Ct., Katy, Tex. 77449; Dave E. Rothers, 21717 Inverness Forest Blvd. #607, Houston, Tex. 77073; Kevin R. Jones, 7215 Dillon, Houston, Tex. 77061

[21] Appl. No.: 831,202

[22] Filed: Jan. 31, 1992

Related U.S. Application Data

[63] Continuation-in-part of Ser. No. 751,861, Aug. 28, 1991, Pat. No. 5,179,349, and Ser. No. 784,666, Oct. 24, 1991, abandoned, which is a continuation of Ser. No. 549,803, Jul. 9, 1990, abandoned.

[51] Int. Cl.⁵ ............................................. E21B 44/00
[52] U.S. Cl. ........................................ 175/27; 175/38; 175/40; 166/65.1
[58] Field of Search ................ 175/24, 27, 40, 48; 166/65.1, 66.4

[56] References Cited

U.S. PATENT DOCUMENTS

| | | |
|---|---|---|
| 2,898,088 | 8/1959 | Alder . |
| 3,112,796 | 12/1963 | Myers . |
| 3,136,364 | 6/1964 | Myers . |
| 3,211,226 | 10/1965 | Myers . |
| 3,266,575 | 8/1966 | Owen . |
| 3,737,845 | 6/1973 | Maroney et al. . |
| 3,790,930 | 2/1974 | Lamel et al. ............................ 175/40 |
| 3,855,853 | 12/1974 | Claycomb ......................... 175/40 X |
| 3,863,203 | 1/1975 | Patton et al. ...................... 175/40 X |
| 3,896,667 | 7/1975 | Jeter . |
| 3,961,308 | 6/1976 | Parker . |
| 3,971,317 | 7/1976 | Gemmell et al. . |
| 4,073,341 | 2/1978 | Parker . |
| 4,078,620 | 3/1978 | Westlake et al. . |
| 4,129,184 | 12/1978 | Parker . |
| 4,308,884 | 1/1982 | Hoerger et al. . |
| 4,364,587 | 12/1982 | Samford . |
| 4,367,794 | 1/1983 | Bednar et al. . |
| 4,373,582 | 2/1983 | Bednar et al. . |
| 4,432,064 | 2/1984 | Barker et al. ..................... 175/40 X |
| 4,593,559 | 6/1986 | Brown et al. . |
| 4,617,960 | 10/1986 | More . |
| 4,656,944 | 4/1987 | Gonzales . |
| 4,695,957 | 9/1987 | Peltier ............................. 175/40 X |
| 4,736,791 | 4/1988 | Rorden et al. . |
| 4,768,594 | 9/1988 | Akkerman . |
| 4,896,722 | 1/1990 | Upchurch ........................ 166/65.1 |
| 4,915,168 | 4/1990 | Upchurch ...................... 166/66.4 X |
| 4,945,761 | 8/1990 | Lessi et al. ....................... 175/40 X |

FOREIGN PATENT DOCUMENTS 0216970 of 0000 European Pat. Off. .

Primary Examiner—Ramon S. Britts
Assistant Examiner—Frank S. Tsay
Attorney, Agent, or Firm—Felsman, Bradley, Gunter & Dillon

[57] ABSTRACT

Method and apparatus for actuating one or more downhole well tools carried by a production or workstring conduit having an imperforate wall and for blocking fluid communication between an activating fluid body and a second fluid source within said well across dynamic seals between actuating members of the well tool, by producing selective signals through the conduit wall detectable by a member to produce an activating signal for actuating the downhole well tool by a downhole energy source.

43 Claims, 55 Drawing Sheets

TANGENTIAL AND AXIAL STRAINS AS FUNTION OF FORCE $F$, WITH $P_i = 0$

TANGENTIAL AND AXIAL STRAINS
AS FUNCTIONS OF $P_i$, WITH $F=0$

FUNCTION 2: $V_2 = M_2 F$
FUNCTION 4: $V_4 = M_4 F$

FUNCTION 1: $V_1 = M_1 P$

FUNCTION 3: $V_3 = M_3 P$

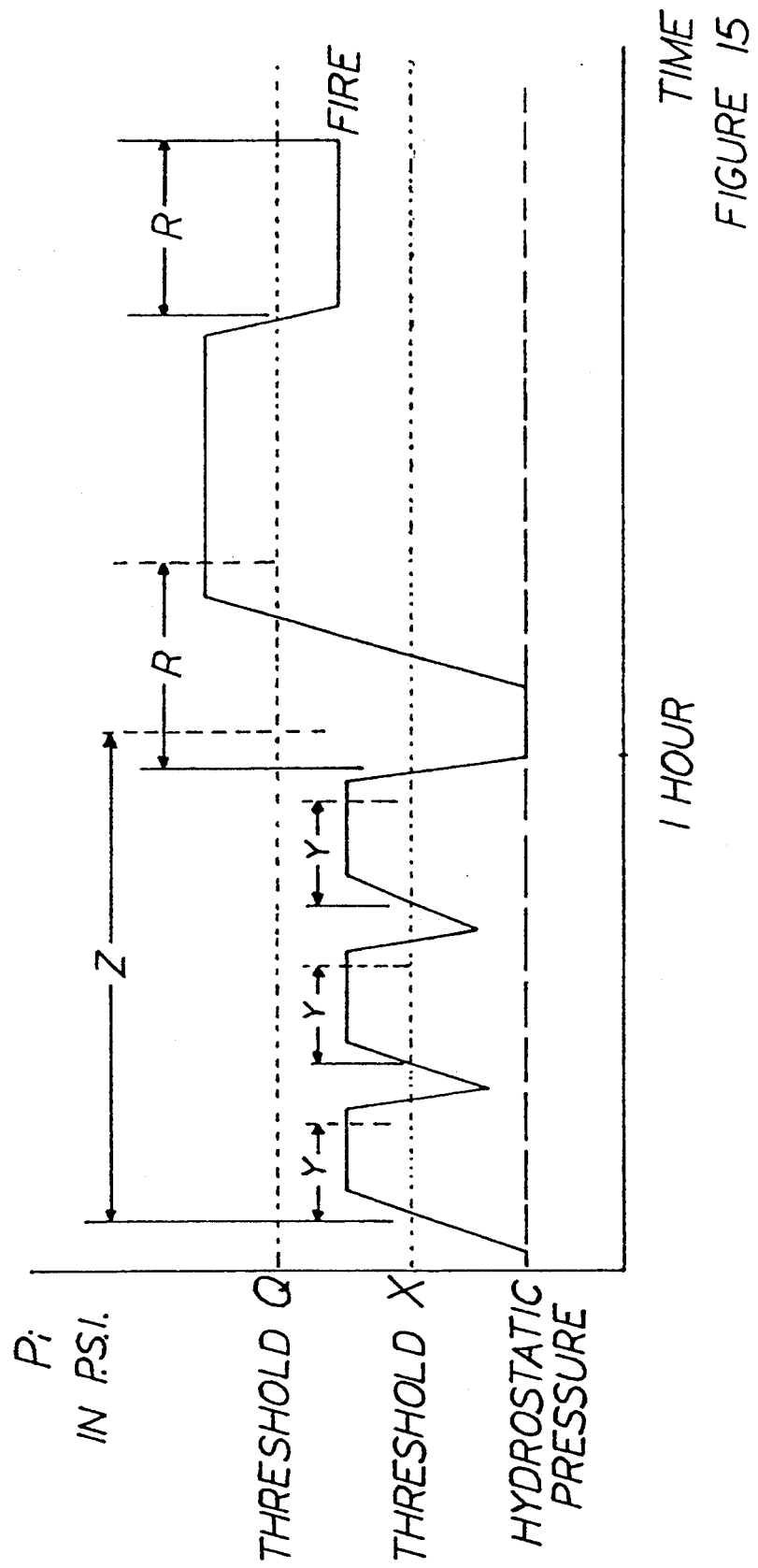

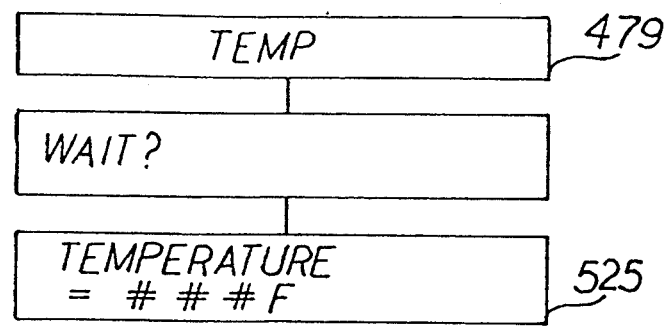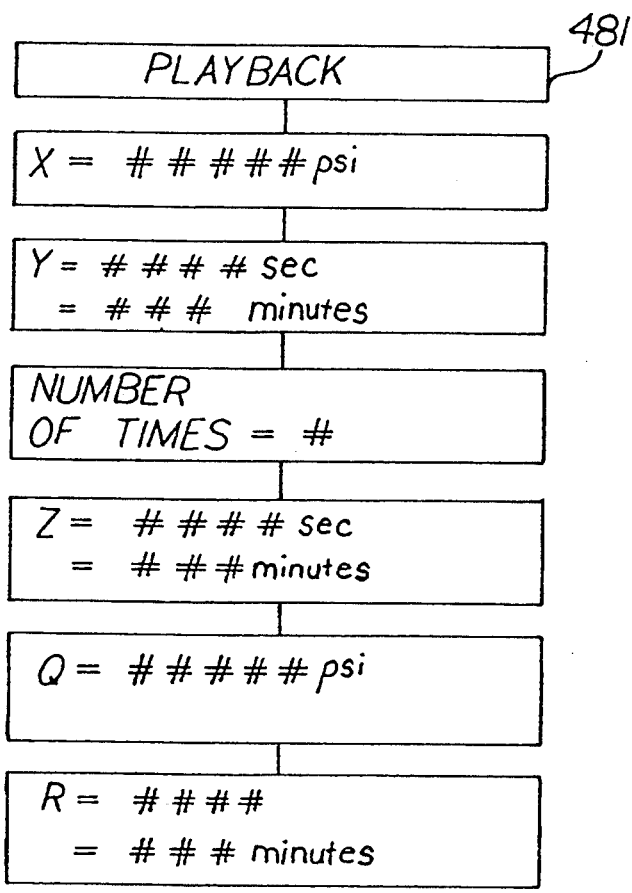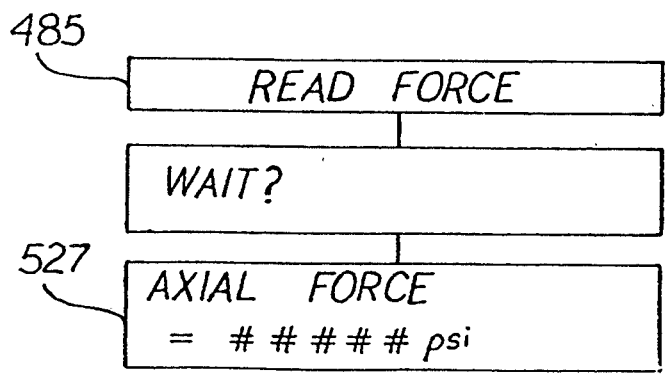
FIGURE 17d

FACTORS WHICH LIMIT THE USE OF
DOWNHOLE TOOL ACTUATION METHODS

| ACTUATION METHOD | PERFORMANCE | | | LIMITATION | |
|---|---|---|---|---|---|
| | STRING PROPERTIES | WELL DEPTH & DEVIATION | SURFACE EQUIPMENT | ELASTOMER LIFE | AVAILABLE FORCE |
| MECHANICAL | YES | YES | NO | NO | HIGH |
| HYDRAULIC | YES | NO | YES | YES | HIGH |
| SLICKLINE | NO | YES | NO | NO | LOW |
| SELECTIVE WL & HYDRAULIC | YES | YES | YES | YES | LOW/HIGH |
| ELECTRIC WIRELINE | NO | YES | NO | NO | HIGH |
| EM TECHNOLOGY | NO | YES | NO | YES | LOW |
| THE PRESENT INVENTION | NO | YES | NO | NO | HIGH |

FIGURE 20

METHOD AND APPARATUS FOR PROVIDING CONTROLLED FORCE TRANSFERENCE TO A WELLBORE TOOL

This application is a continuation-in-part of the earlier applications: application Ser. No. 07/751,861, filed on Aug. 28, 1991, having the title "Subsurface Well Apparatus", now U.S. Pat. No. 5,179,349, and is a continuation-in-part of application Ser. No. 07/784,666, filed Oct. 24, 1991, now abandoned, which is a FWC of application Ser. No. 07/549,803, filed Jul. 9, 1990, now abandoned.

BACKGROUND OF THE INVENTION

2. Field of the Invention

The present invention relates to subsurface well apparatus and more particularly to the remote operation of subterranean well tools.

3. Description of the Prior Art

Subsurface well tools have been operated in the past by a wide variety of mechanisms. Manipulation of the tubing string, such as push and/or pull, tubular rotation, and the like, is one of the more common methods employed, but can be difficult to accurately accomplish in deep or deviated wells. Other actuation means include use of hydraulic/hydrostatic members, pneumatic elements, as well as radio and other surface and subsurface-initiated electronic components.

Typical of subterranean well tools actuated by such procedures include bridge plugs, packers, perforating guns, tubing hangers, safety and other valves, test trees, and the like, all of which are contemplated for use with the present invention. Such tools require actuation procedures, such as setting at correct depth in the well and at a particular time during the completion operation, unsetting in response to time given well condition or event, re-setting, opening, closing or throttling flow paths, perforating casing, and the like.

In the normal operation of a well wherein the production tubing or work string is installed or being installed, and the tools are to be activated by hydraulic means incorporating fluid and pressure within the production or work string, it is very common to provide one or more ports in the wall of the production tubing or work string, or a component in direct fluid communication therewith, to provide actuating fluid from the bore of the production tubing to well tools to initiate the desired operation, such as the setting of a packer.

It has been found that such openings provided in the wall of the production tubing or work string are highly undesirable because such openings must be effectively sealed against any leakage of any fluids subsequently carried through the tubing, such as the produced well fluids. Seals that are employed in and between operating components of well tools, such as pistons and housing therefor, are subject to deterioration, hence leakage, because of the high temperature, high pressure environment in which such seals are required to operate regardless of whether such seals are elastomeric, metallic, or any other commonly used structures.

This is particularly true of the seals employed on actuating pistons for packers, safety valves or similar downhole tools wherein an actuating fluid is applied to one side of the piston and the other side of the piston is exposed to well fluids, atmospheric pressure, or the like. Deterioration of the seals on such actuating member expose such components to undesirable leakage of either actuating fluid or production or other fluids, depending on the relative pressures, around the piston, or other actuating component, thus initially creating a microannulus therethrough. Such micro-annulus leak path could be serious enough to subject the well to a blow out.

The utilization of a downhole energy source which can be transformed into kinetic energy by the provision of a triggering signal to operate a well tool is disclosed in U.S. Pat. No. 3,233,674. In the illustrated device thereof, the downhole source of energy is an explosive charge which is discharged and the resulting gas is applied to a piston which functions to set a hanger in a well casing. The triggering signals for energizing the downhole circuitry for effecting the discharge of the explosive charge is produced by a pair of sonic frequency generators which are located at the surface and which are transmitted downhole through well fluids or a tubing string, or can be packaged with a suitable power supply contained that is lowered into the well on wireline or cable.

One problem with apparatus constructed in accordance with U.S. Pat. No. 3,233,674, is that the acoustical signals employed for effecting the triggering of the downhole source of energy must be coded in order to prevent inadvertent operation of the device by the static normally encountered in the transmission of acoustic signals either through the well fluids or through the body of a tubular conduit. The employment of coded alternating signals necessarily complicates the electronic pickup circuitry which must be designed so as to distinguish between static signals and the proper coded signal.

U.S. Pat. No. 4,896,722 discloses another approach to energization of a downhole source of energy. In the apparatus illustrated in this patent, the hydrostatic pressure of well fluids in the well annulus acts on a floating piston to provide the source of downhole energy. Such energy is employed to effect the opening and closing of a test valve which is normally utilized in the lower end of a string of drill stem testing tools. The hydrostatically pressurized oil acts on one side of a piston which is opposed on its opposite side by air at atmospheric or other low pressure. The piston is prevented from movement by a spring until a predetermined hydrostatic annulus pressure is obtained. A pair of solenoid controlled valves controls the hydrostatic pressure acting on the floating piston. The two solenoid control valves are in turn controlled by a microprocessor which operates in response to a pressure transducer which is exposed to annulus pressure and provides an electrical signal output indicative thereof. Again, however, the signals applied to the pressure transducer are in the nature of a series of low level pressure pulses, each having a specified duration. Such pulses are applied at the well surface to the fluids standing in the well annulus. Thus, the detection circuitry which picks up the signals is complicated because it has to be designed to respond to only a specific series of low level pressure pulses.

The prior art has not provided an actuating system for a downhole well tool which does not require ports in the production tubing or work string or component in fluid communication therewith, and which may be reliably controlled from the surface through the utilization of control forces through the wall of the production tubing or work string to produce an activating signal for actuating the downhole well tool by a downhole energy source and to block fluid communication between an actuating fluid body and a second fluid source within said well across dynamic seals between actuating members of the well tool.

SUMMARY OF THE INVENTION

The method and apparatus of this invention may be employed for the actuation of any one or more downhole tools, such as packers, safety valves, testing valves, perforating guns, and the like. The apparatus employed in the invention contemplates a production tubing or work string portion extendable to a tubular conduit string extending from the earth surface down into contact with the well fluids existing in the well. The wall of such production tubing is imperforate throughout its entire length and to and through the actuating members of the well tool or tools to be actuated. The apparatus and method block fluid communication between an activating fluid body and a second fluid source within the well across dynamic seals between the actuating members of the well tool during actuation thereof.

The apparatus and method of the present invention also contemplate incorporation of a signal generating means which forms a part of the wall of the tubular conduit portion for selectively generating a signal in response to a predetermined condition which is detectable on the wall of the conduit string or portion. Actuation means are disposed exteriorly of the bore of the production conduit and include an actuating member for performing at least one desired function. An activating body is in direct or indirect communication with the actuating member. Movement prevention means selectively resist movement of the actuating member. Preferably, releasing means are responsive to the signal generating means for releasing the movement prevention means from the actuating member for performance of the desired function or functions, and the apparatus thus prevents direct fluid communication between the activating fluid and the second fluid source across the seals.

A packer which may be incorporated with this invention may be mounted in surrounding relationship to the production tubing or work string and actuated by the downhole apparatus of this invention to sealingly engage the bore wall of the well casing.

The signaling generation means preferably comprises a strain gauge forming a part of the imperforate wall of the production tubing, but may also be a piezoelectric crystal, light beam, sonic vibratory component, or any other non-magnetic transducer or electronically activated element which generate a signal which is detectable as hereinafter described and contemplated. The strain gauge, or other element, is mounted so as to detect all forms of stress or other physical phenomena (hence, strain) detectable on the wall portion.

In the case of a strain gauge, a first signal may be produced in response to a preselected circumferential tensile stress, a different signal in response to a preselected circumferential tensile stress, a different signal in response to a preselected circumferential compressive stress, or other signals respectively corresponding to the existence of a predetermined stain in the wall portion of the production tubing or work string portion to which the strain gauge is affixed.

During the initial run-in of a production tubing and a packer, it is obviously difficult to apply any lasting change in circumferential tension or other stress, in the wall of the production conduit portion to which the strain gauge is affixed. However, variation of the sensed pressure at the location of the strain gauge to a level substantially different than an initial pressure within the tubular conduit will result in a significant change in the strain, with the corresponding generating of a significant change in the resistance characteristics between circumferentially spaced contact points of the strain gauge will be produced, resulting in a significant change in resistance between the same circumferentially spaced contact points of the strain gauge.

On one embodiment of the invention, such changes in average value of the resistance of the strain gauge are detected by an electronic hookup to a microprocessor. The average value changes are amplified to a level sufficient to effect the activation of a stored or other energy actuating mechanism which may take a variety of forms, such as an explosive charge which is fired to generate a high pressure gas, a spring, or a motor, which is then employed to shift a piston or other mechanism, to effect the actuation of a well tool, for example, a packer.

The control signal could also be employed to operate one or more solenoid valves to derive energy from the hydrostatic annulus pressure to effect the opening or closing of a testing valve or safety valve.

Lastly, and in accordance with this invention, the control signal can be employed to function as a latch release means for a downhole tool actuating piston disposed in a chamber formed exteriorly of the production conduit and containing pressurized gas either generated in-situ, or stored, or explosively created, urging the piston or other activating mechanism in a tool operating direction. So long as the latch mechanism is engaged with the piston, or the like, the tool is not operable, but the control signal is applied to a solenoid to release the latch, thus releasing the piston for movement to effect the actuation of the tool.

As will be later described, such tool may conveniently comprise a packer which is set by the release of the latch in response to a predetermined change in strain in that portion of the production conduit on which the strain gauge is mounted.

When the packer is set, other signals may be generated for various useful purposes. The setting of the packer will, for example, effect a substantial reduction in the axial tensile stress existing in the conduit above the packer. If the strain gauge is so located, it will generate a significant in-situ signal which can be sent to the surface by an acoustic or radio frequency transmitter to inform the operator that the packer or other downhole tool has indeed been set, or activated.

Alternatively, and particularly when the production tubing or work string is being initially installed, the second signal generated by the strain gauge upon or at any time subsequent to the setting of the packer, can be utilized to effect the firing of a perforating gun or other activation of a second or auxiliary well tool. However, it is sometimes desirable that the perforating gun be fired when the pressure conditions in the production zone below the packer are in a so-called "underbalanced" condition, where the fluid pressure within the production conduit is significantly less than the annulus fluid pressure. This reduction in production tubing pressure may be conventionally accomplished by running the production tubing or work string into the well dry by having a closed valve at its lower end, or by swabbing any fluids existing in the production tubing or work string from the well after the packer is set. This procedure has many variables and such procedure and variables are well known to those skilled in the art. In either event, the resulting change in circumferential compressive stress will result in the strain gauge producing a distinctive signal which may be employed to effect the firing of the perforating gun.

After the firing of the perforating gun, it is common to kill the well, unset the packer, retrieve the work string and run into the well a permanent completion hook-up, including, for example, a safety valve, a packer, a production screen, or ported sub, and the like. The production string is positioned in the well so as to place the screen, or ported sub, to lie adjacent the newly formed perforations in the casing, thus permitting production fluid to flow through the screen or ported sub and into the production tubing.

If a test valve is incorporated in the lower portion of the production tubing, it can be maintained in a closed position by a spring or other means, and conventional instrumentation disposed within the production tubing can effect a measurement of the formation pressure. An increase in fluid pressure within the production tubing over the annulus fluid pressure will result in a circumferential compressive stress in the strain gauge accompanied by a significant change in the resistance of the strain gauge in the circumferential direction. The signal can be employed to effect the opening of the testing valve or safety valve as the case may be, by a solenoid winding disposed in surrounding relation to the production tubing. Such solenoid operated testing valves and/or safety valves are well known in the art.

The electrical energy for operating the various solenoids heretofore referred to is preferably supplied by a downhole battery pack which is disposed in the annulus surrounding the production tubing string.

Those skilled in the art will recognize that the actuation of one or a plurality of downhole well tools by downhole energy sources in response to a predetermined condition detectable on a portion of the wall of an imperforate production or work tubing string portion provides an unusually economical, yet highly reliable system for effecting the remote operation of the downhole well tools and for blocking fluid communication between an activating fluid body and a second fluid body source within the well across dynamic seals between actuating members of a well tool during the actuation procedure.

The present invention includes an actuator apparatus for use in a subterranean wellbore having a wellbore tool disposed therein which is operable in a plurality of operating modes and is switchable between selected modes of the plurality of operating modes upon receipt of a selected force pattern with respect to time by at least one force receptor member which is a part of the wellbore tool. As is typical, the subterranean wellbore has at least one tubular conduit disposed therein, one of which carries the wellbore tool. The subterranean wellbore also includes at least one fluid column disposed therein which is in contact with the tubular conduit.

Viewed broadly, the actuator apparatus of the present invention includes a number of components which cooperate together. An electrically-actuable force generator assembly is provided, and is in force-transferring communication with the at least one force receptor member of the wellbore tool. A controller is also provided, and is electrically coupled to the electrically-actuable force generator assembly. In the preferred embodiment of the present invention the controller is operable in a plurality of operating modes. In a programming mode of operation, the controller receives selected force parameters which define a selected force pattern with respect to time which is required to switch the wellbore tool between selected modes of operation of the plurality of operating modes. In an armed mode of operation, the controller continually monitors for receipt of an actuation signal for initiation of the force transfer to the wellbore tool. In a force moderation mode of operation, the controller continually monitors force transferrance from the electrically-actuable force generator to the at least one force receptor member, and selectively actuates the electrically-actuable force generator to obtain the selected force pattern.

In the preferred embodiment, in the force moderation mode of operation, the controller provides the force pattern with respect to time independently of manipulation of any tubular conduit disposed within the subterranean wellbore and independently of manipulation of any fluid column disposed within the subterranean wellbore. Also, preferably, during the armed mode of operation, the controller continually monitors for receipt of an actuation signal which is carried within a selected one of the at least one fluid columns. Preferably, the actuation signal is initiated at a remote location and conveyed within the wellbore to the controller. In the specific embodiment described herein, the actuation signal comprises a pressure pattern which is carried within the selected fluid column, to provide the actuation signals to the controller.

Once the controller receives the actuation signal, the force moderation mode of operation will be performed independently of wellbore tubular strings, and also independently of any manipulation of the fluid columns which are disposed in the wellbore. This feature is particularly useful when other wellbore tools are also disposed within the subterranean wellbore, which are switchable between selected modes of operation by manipulation of one or more wellbore tubulars (for example, by torquing the tubulars, applying set down weight to the tubulars, or lifting weight off of tubulars) or by manipulation of the fluid columns within the wellbore (for example, by pressurizing selected fluid columns or superimposing a pressure pattern upon the fluid columns).

In the preferred embodiment of the present invention, the wellbore tool includes at least one resilient member (preferably, formed of an elastomeric material) which is urged between selected shapes by application of a selected force pattern. When wellbore tools include resilient members (such as elastomeric packing sleeves) which are urged between selected shapes by application of force, the elastomeric elements tend to resist the change in shape which is sought. This is true because elastomeric elements have "elastic" properties which tend to make the elastomeric element resistant to sudden changes in shape.

Those skilled in the wellbore tool arts will appreciate that elastomeric elements require a not-insignificant amount of time to "square-off" or otherwise conform to a new shape, especially when the wellbore objective is to obtain a fluid-tight and gas-tight seal between the elastomeric element and a selected surface of a selected wellbore tubular conduit. In the preferred embodiment of the present invention, during the force moderation mode of operation, the controller causes the electrically-actuable force generator to apply force of a selected pressure level and prolonged duration to the force receptor member of the wellbore tool, which will transfer the force to the resilient member of the wellbore tool, and ensure complete reshaping of the resilient member.

In the preferred embodiment of the present invention, the electrically-actuable force generator includes a piston member which is in communication with the source of pressure. The application of pressure to the piston is moderated by the controller during the force moderation mode of operation. Also, preferably, the electrically-actuable force generator is incrementally actuable by the controller during the force moderation mode of operation. In the preferred embodiment, the controller includes a monitor for continually determining the actual force applied to the force receptor of the wellbore tool. During the force moderation mode of operation, the controller will continually compare the actual force applied to the force receptor and a target force. Preferably, the target force comprises a range of forces for a specified time interval.

Further advantages of the invention, will be readily apparent to those skilled in the art from the following detailed description, taken in conjunction with the annexed sheets of drawings.

BRIEF DESCRIPTION OF THE DRAWINGS

FIG. 15 is a graph of fluid pressure verses time, and illustrates the use of predetermined pressure patterns to transmit coded messages within a wellbore, according to the present invention.

FIGS. 17a, 17b, 17c, 17d, and 17e are graphic representations of the functions of the preferred programming unit of the present invention.

FIG. 20 is a tabular comparison of the advantages of the present invention relative prior art wellbore tool actuation methods.

DETAILED DESCRIPTION OF THE INVENTION

Figure 1A:
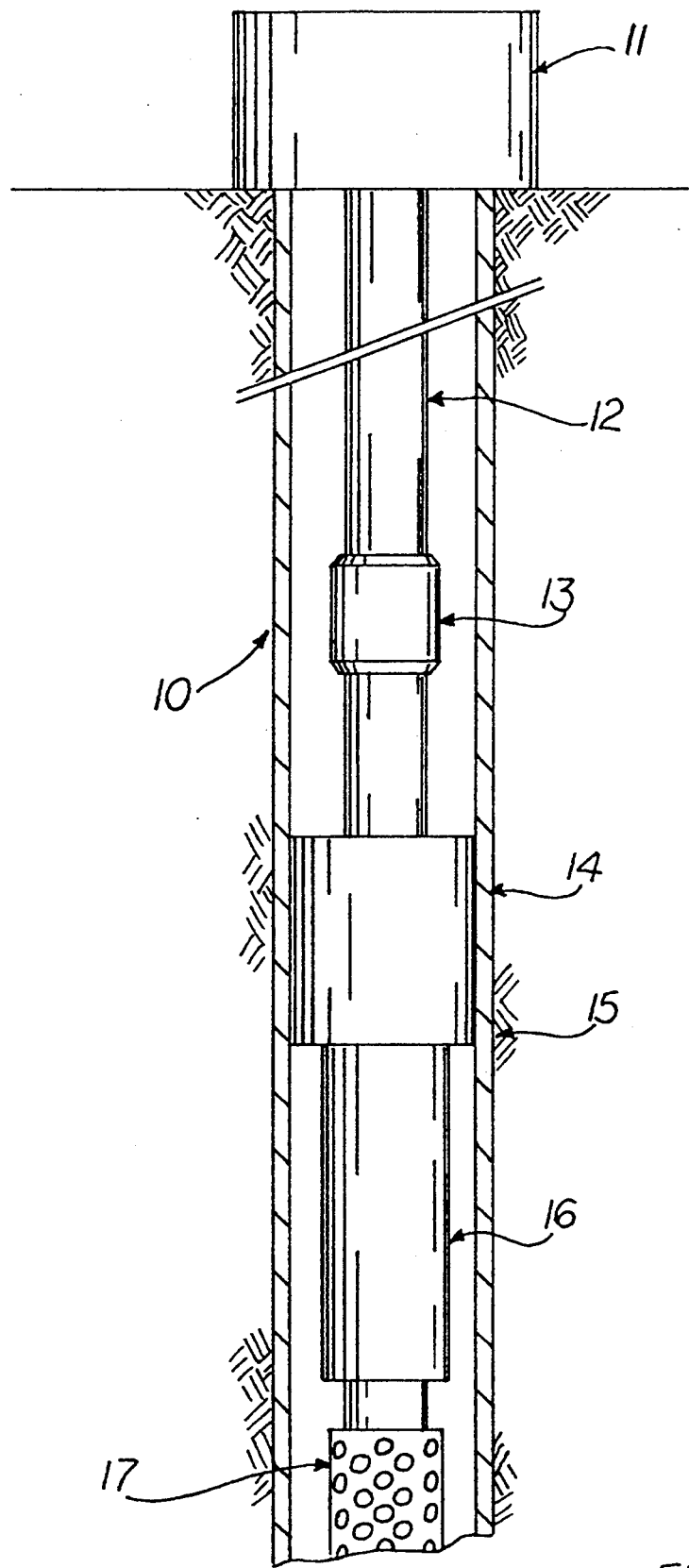
FIGS. 1a, and 1b are schematic, vertical section views of a well showing a tubing string incorporating a packer, a safety valve, and a perforating gun positioned in the well subsequent to setting of the packer in response to signals generated by a strain gauge forming a portion of the wall of the production conduit.
Figure 1B:
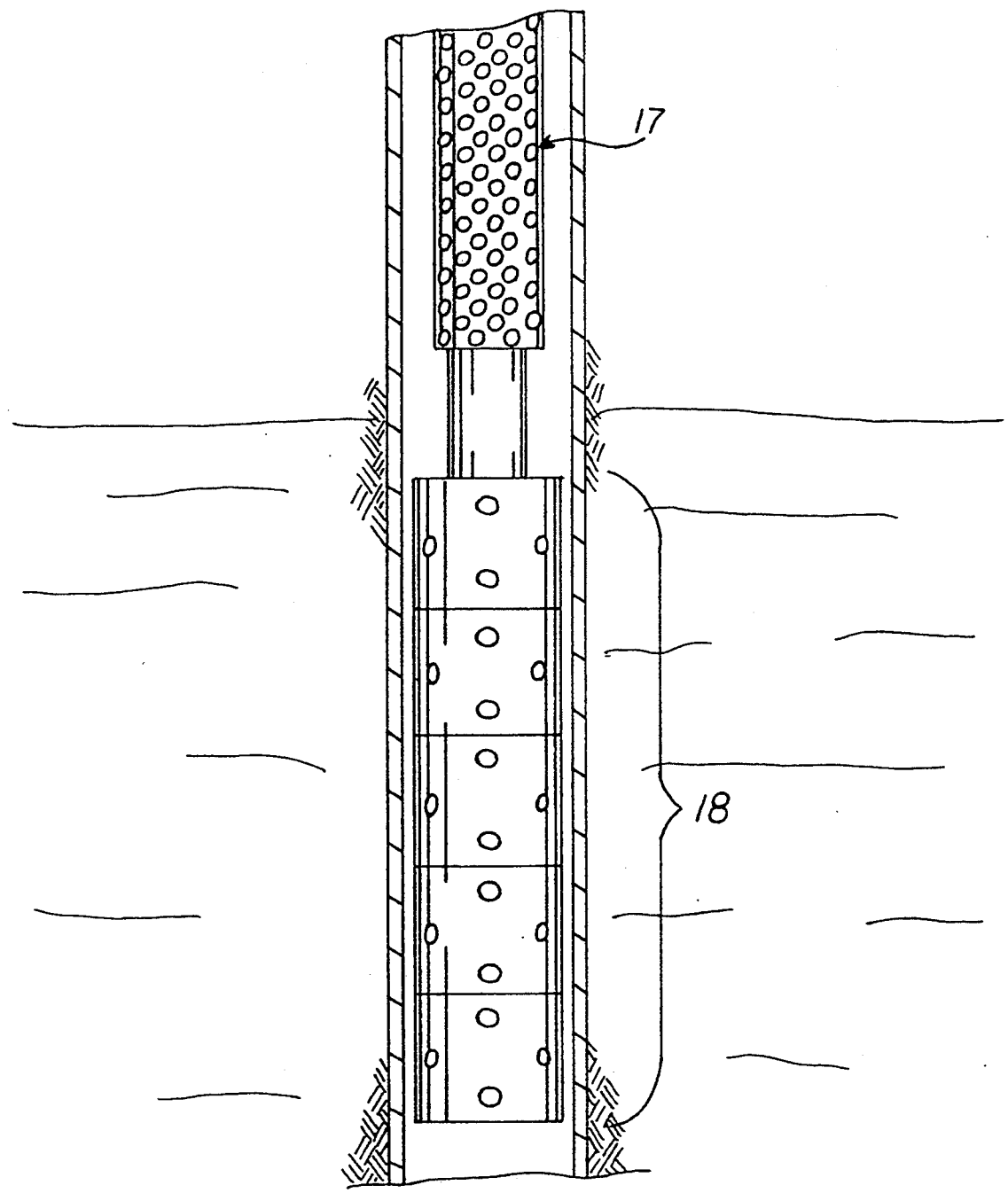

Now with reference to the drawings, and, in particular, FIGS. 1a and 1b, there is shown schematically at the top thereof a wellhead 11, conventional in nature, securing a production conduit 12 extending from the lowermost facial side of the wellhead 11 into a subterranean well 10. The production conduit 12 may be production tubing, or a tubular work string, conventional in nature, and well known to those skilled in the art.

The production conduit 12 is shown as carrying a safety valve 13, which may take the form of a ball, flapper, or other valve construction known to those skilled in the art. A packer 14 is schematically illustrated as being disposed on the production conduit 12 below the safety valve 13, with the conduit 12 extending in the well 10 and within casing 15.

Actuation controls 16 (depicted in more detail in FIGS. 2d and 3d) are disposed on the well conduit 12 below the packer 14.

As shown, a well production screen 17 is shown on the conduit 12 above the perforating gun 18. It will be appreciated by those skilled in the art that, in lieu of a screen 17, a simple ported sub may be utilized for introduction of production fluids from the production zone PZ of the well 10 into the annular area between the casing 15 and production conduit 12, thence interiorly of the conduit 12 to the top of the wellhead 11.

The perforating gun 18 is shown as a tubing-conveyed perforating gun which is well known to those in well completion technology.

Now with reference to FIGS. 2a, 2b, 2c, 2d, and 2e, the apparatus of the present invention is shown disposed within the casing 15 (of FIGS. 1a and 1b) with the packer 14 (of FIGS. 1a and 1b) being positioned in an unset mode. The production conduit 12 (of FIGS. 1a and 1b) extends to a conduit member, or body 142, having threads 141 at its uppermost end for securement to companion threads in the lowermost section of the production conduit 12 thereabove.

A securing ring 144 is carried around the exterior of the body 142 for containment of the uppermost end of a series of slip members 145 having contoured teeth 146 circumferentially subscribed exteriorly therearound for embedding and anchoring engagement of the packer 14 (of FIGS. 1a and 1b) relative to the casing (of FIGS. 1a and 1b) when the tool is shown in the set position, as in FIGS. 3a, 3b, 3c, 3d, and 3e. The slips 145 have a lower facing beveled slip ramp 150 for companion interface with a ramp 149 carried at the uppermost end of an upper cone member 148 being carried exteriorly around a support member 146a, with the upper cone 148 secured to the support 146a by means of shear pin members 147. Thus, the slips are secured in retracted position relative to the cone 148, prior to setting actuation.

Below the cone 148 is a series of non-extrusion seal members which may comprise a combination of metallic elastomeric seal assemblies, the seal system 151 being carried exteriorly around the cone 148. The system 151 is affixed around the exterior of the body 142 and at the uppermost end of a conventional elastomeric seal element 152 having an upper inward lip 152a extending interiorly of the seal system 151.

At the lowermost end of the seal element 152 is a lower lip 152b of similar construction as the lid 152a. Exteriorly of the lip 152b is a second, or lower, non-extrusion seal system 151, which, in turn, is carried round its lowermost end on the uppermost beveled face of the lower cone element 153 which is shear pinned at pin 154 to the body 142.

Figure 3A:
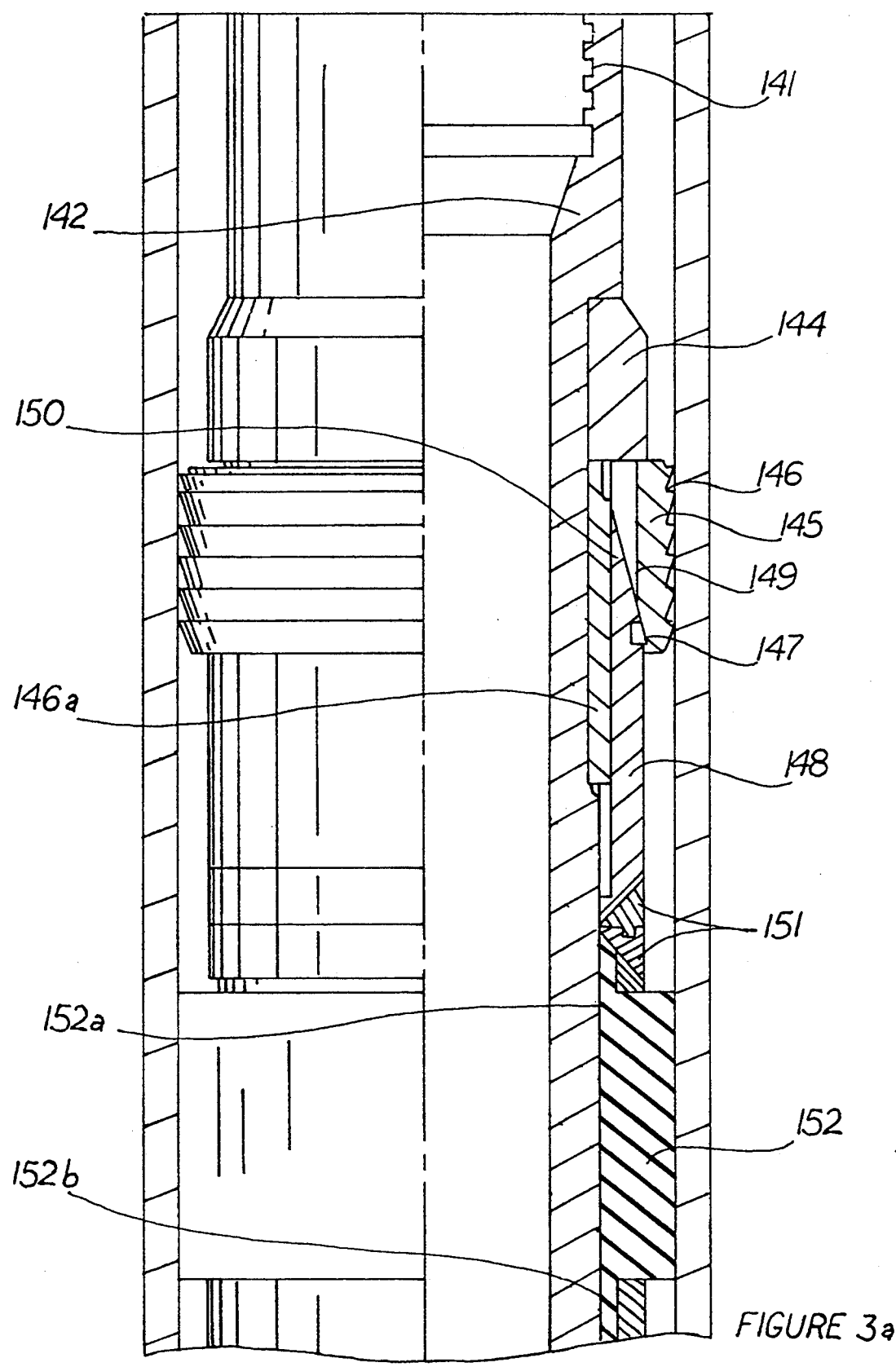
FIGS. 3a, 3b, 3c, 3d, and 3e respectively correspond to FIGS. 2a, 2b, 2c, 2d, and 2e but show the position of the packer and its actuating mechanism after the setting of the packer has been accomplished.
Figure 3B:
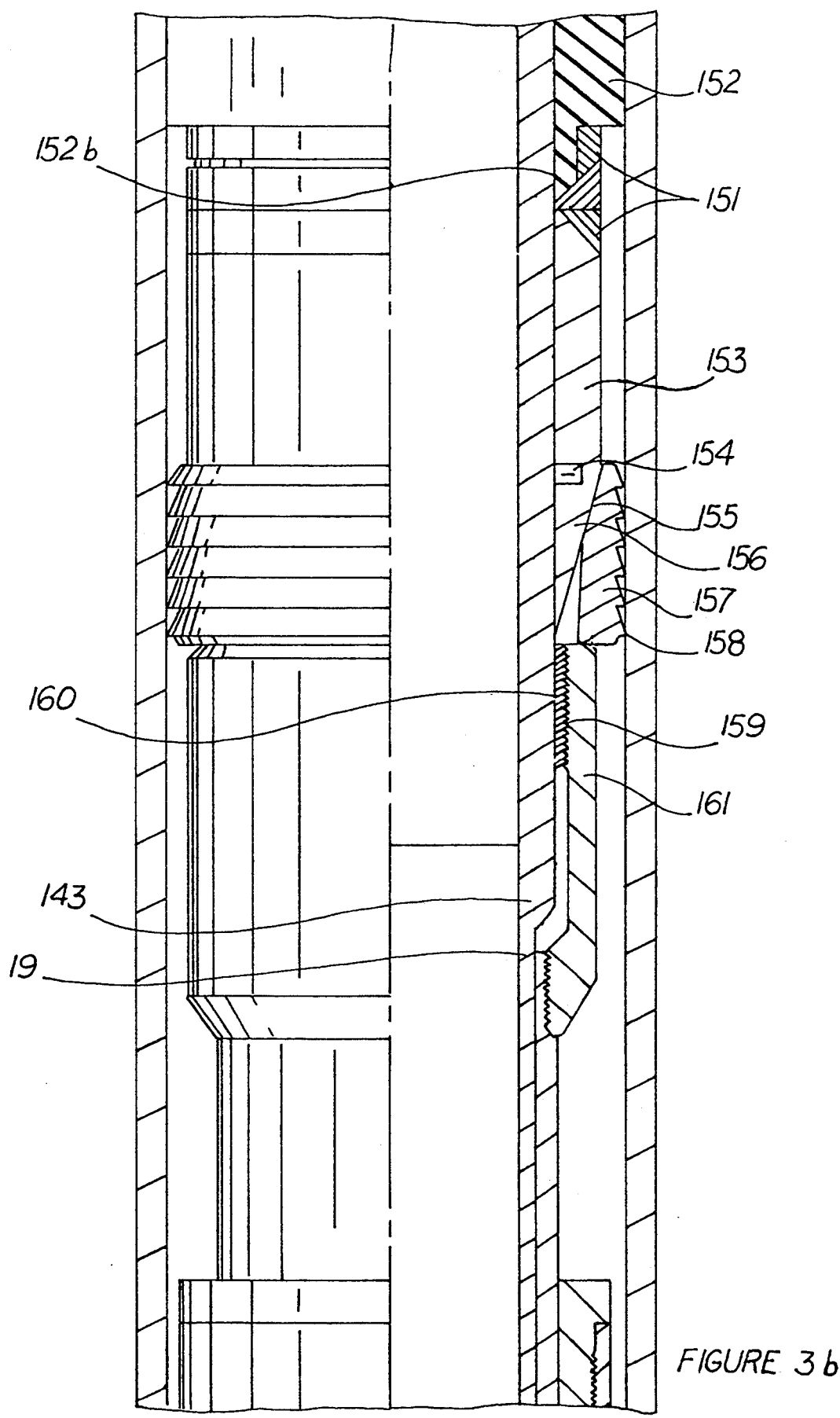
Figure 3C:
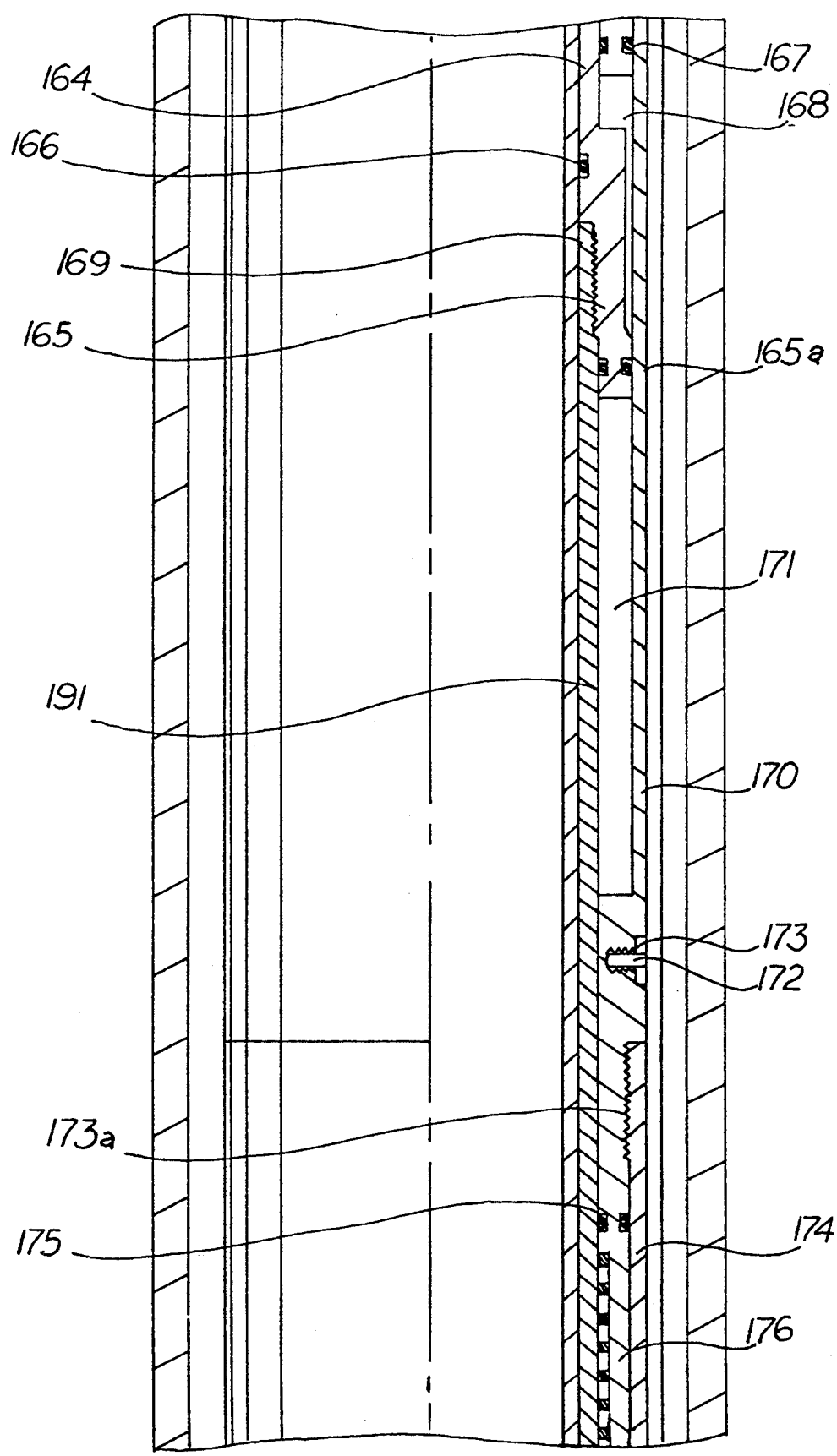

A lower ramp 155 is carried exteriorly around the cone 153 and contoured interiorly at its lowermost tip for companion interengagement with a similarly profiled slip ramp 156 around the uppermost interior surface of the slip element 157. The lower slid 157 has teeth 158 which are similar in construction to the teeth 146 on the uppermost slip rings or elements 145 for interengagement to anchor the device relative to the casing member 15 (of FIGS. 1a and 1b) when the tool is in the set position, as shown in FIG. 3a.

Below the lowermost slip ring 157 is a body lock ring 160 which is housed exteriorly of the body 142 and interior of an outer ring 162 having ratchet threads 159 thereon. The purpose of the body lock ring 160 and ratchet threads 159 is to lock the setting energy resulting from the setting actuation of the packer 14 (of FIGS. 1a and 1b) into the upper and lower slips 145, 157, and to thus assure sealing integrity of the seal element 152 relative to the casing 15 (of FIGS. 1a and 1b). The ratchet teeth 159 are, of course, one way acting, but could be provided in a configuration which would permit resetting of the device subsequent to unsetting.

Figure 2A:
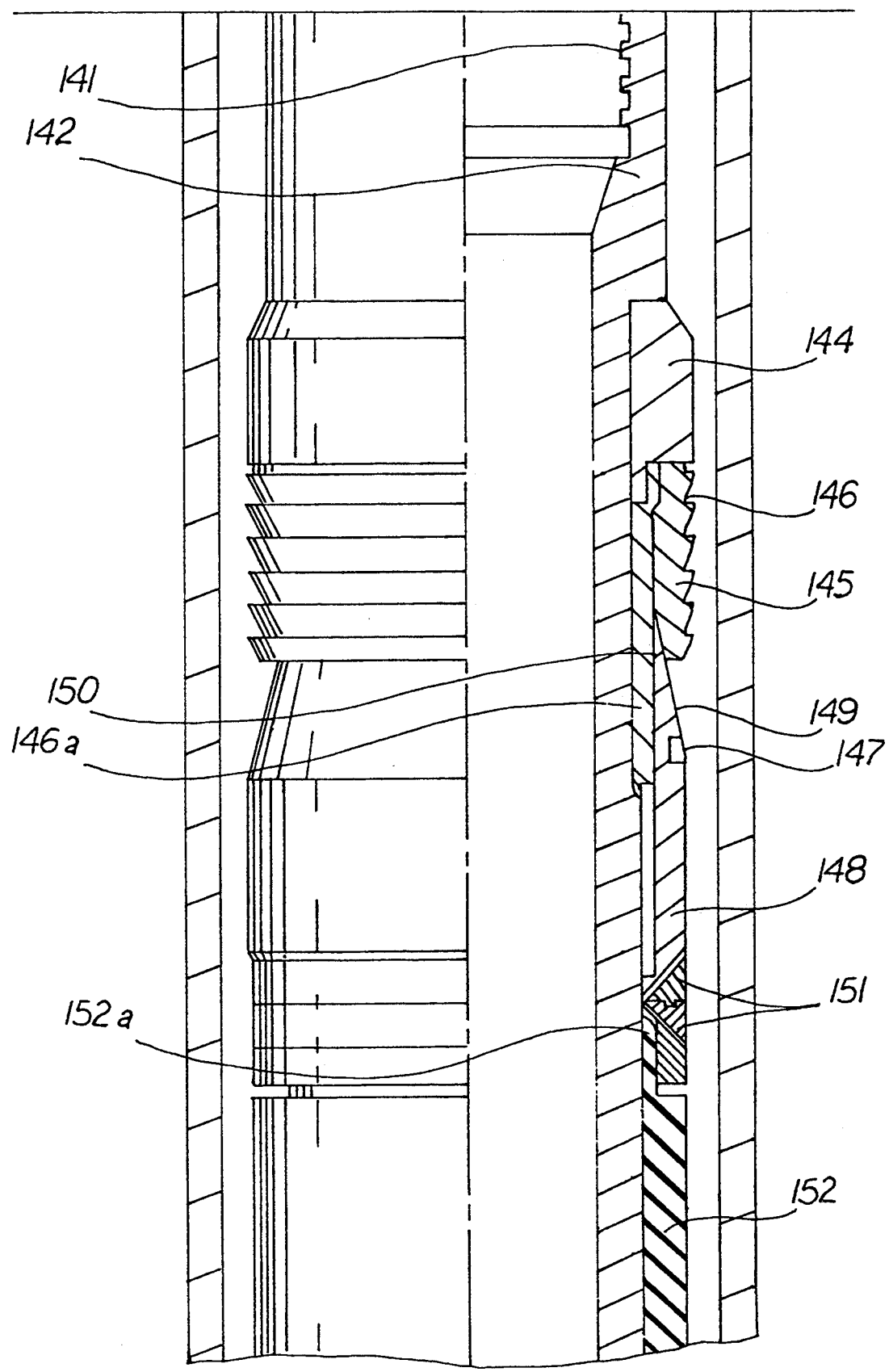
FIGS. 2a, 2b, 2c, 2d, and 2e collectively represent an enlarged scale, vertical sectional views of the unset packer and packer actuating mechanism, including a schematic showing of the strain gauge and microprocessor employed for setting the packer and actuating other well tools.
Figure 2B:
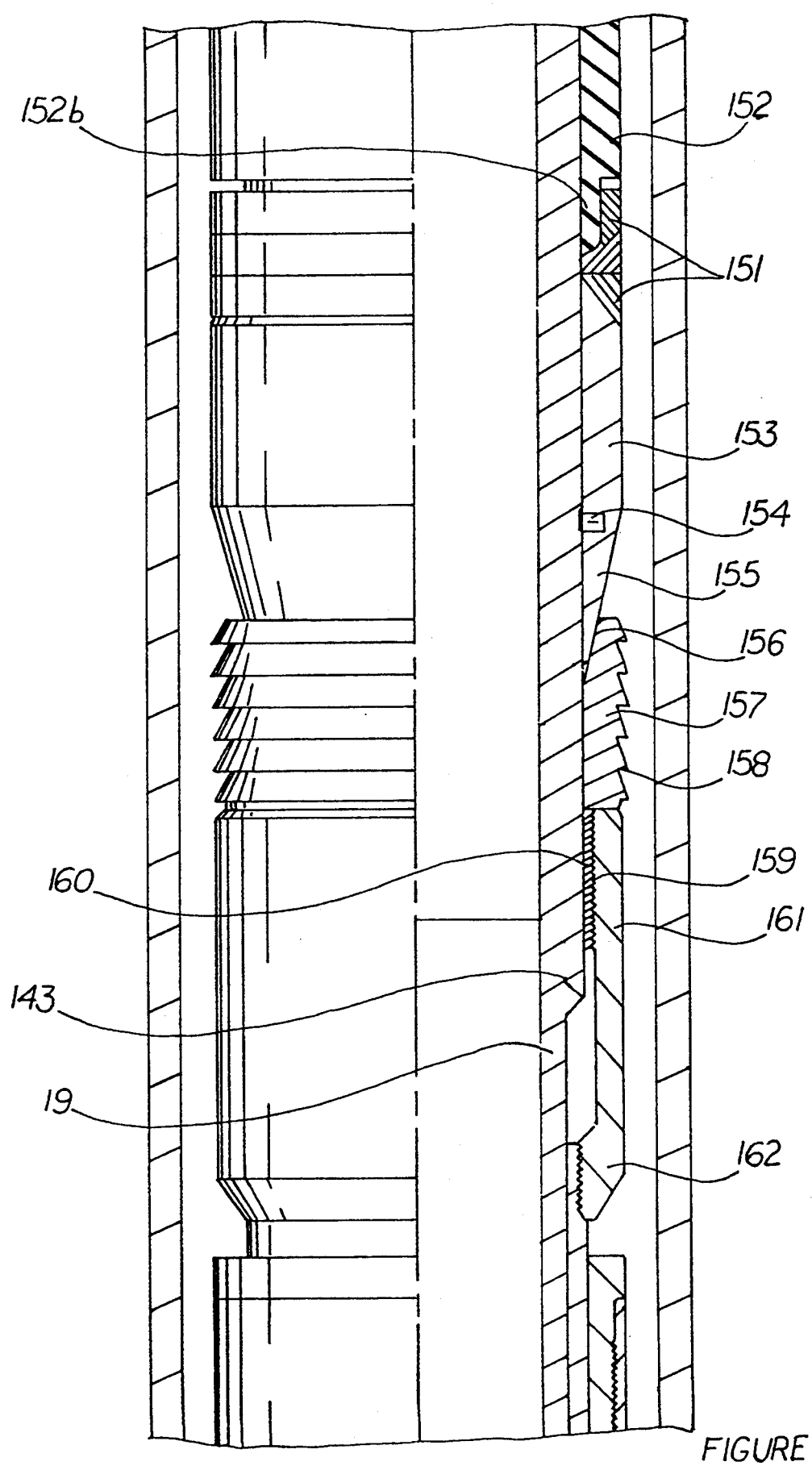
Figure 2C:
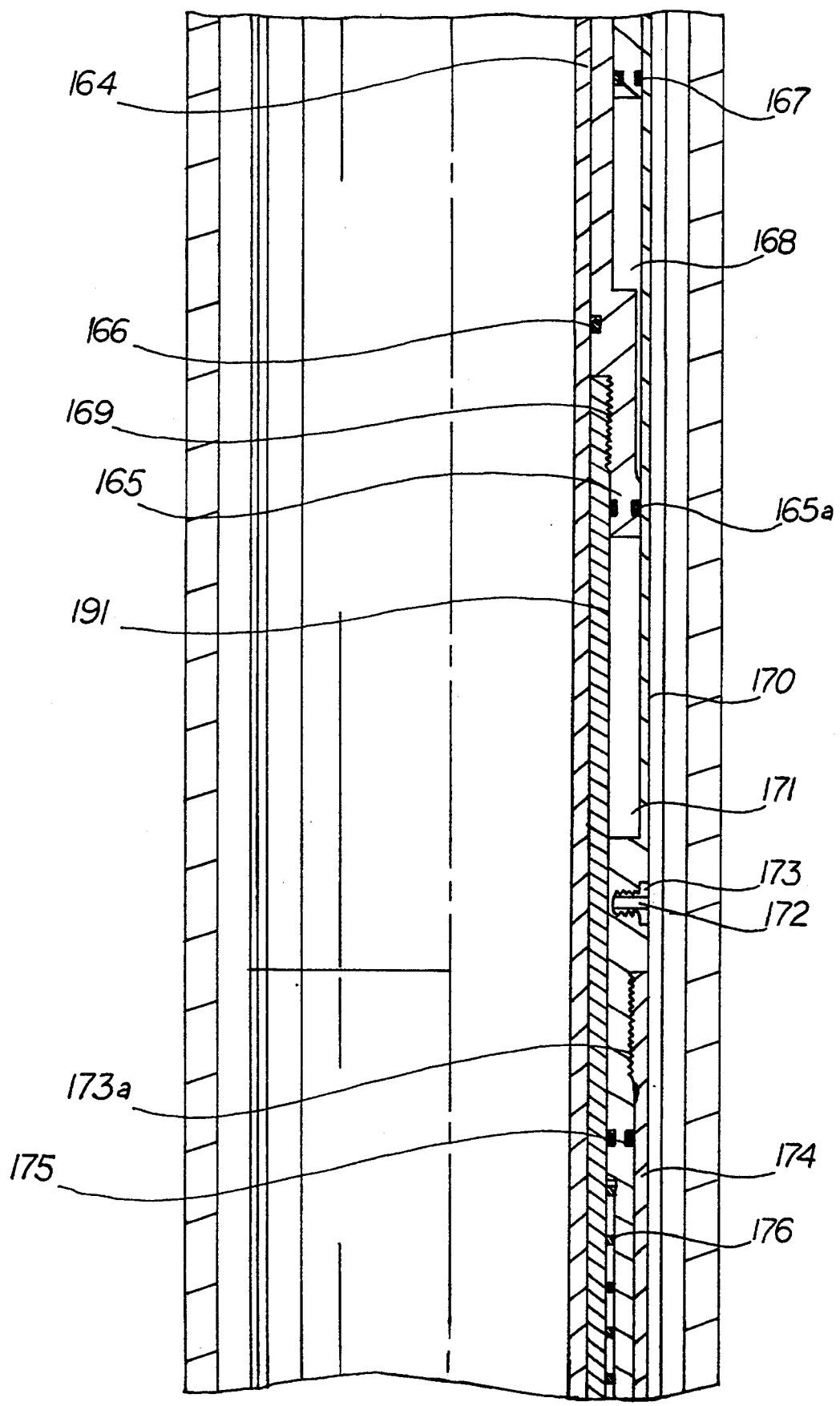
Figure 2D:
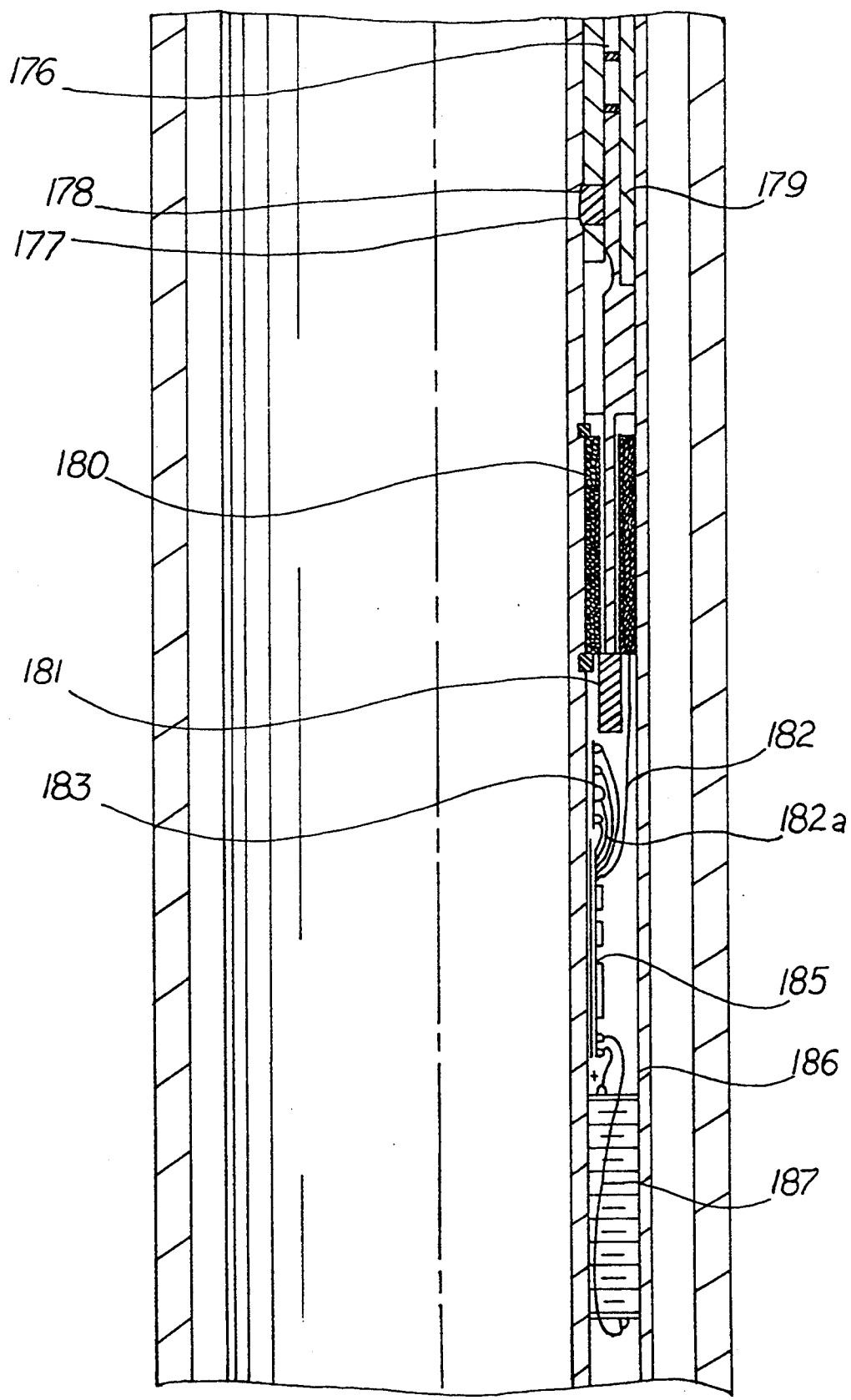
Figure 3D:
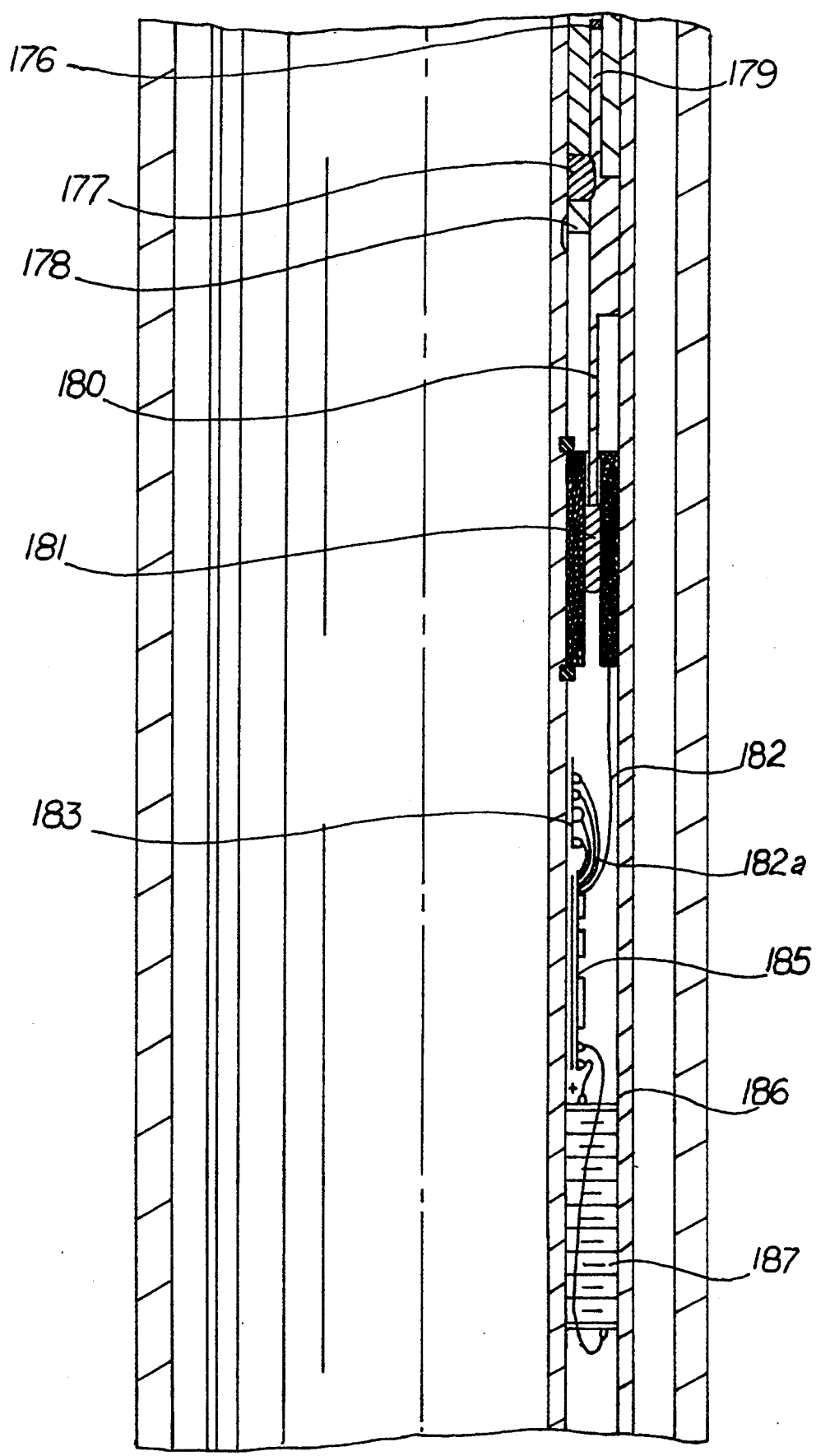
Figure 3E:
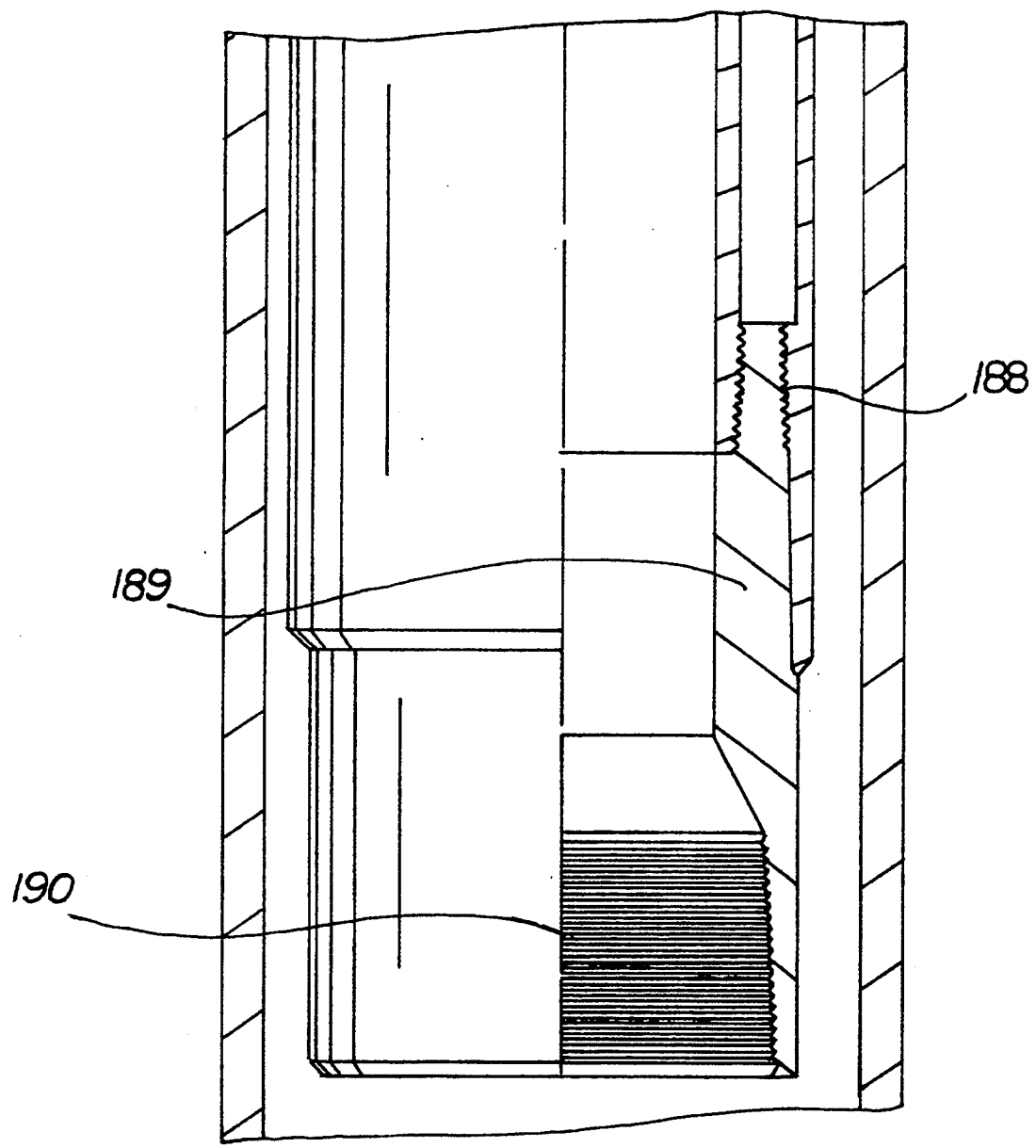

At the lowermost end of the body element 142 is a series of threads 143 for securing the body 142 to the tubular member 19 (of FIGS. 1a and 1b) extending to the actuation controls 16, shown in FIGS. 2b and 2c and 2d.

Figure 2E:
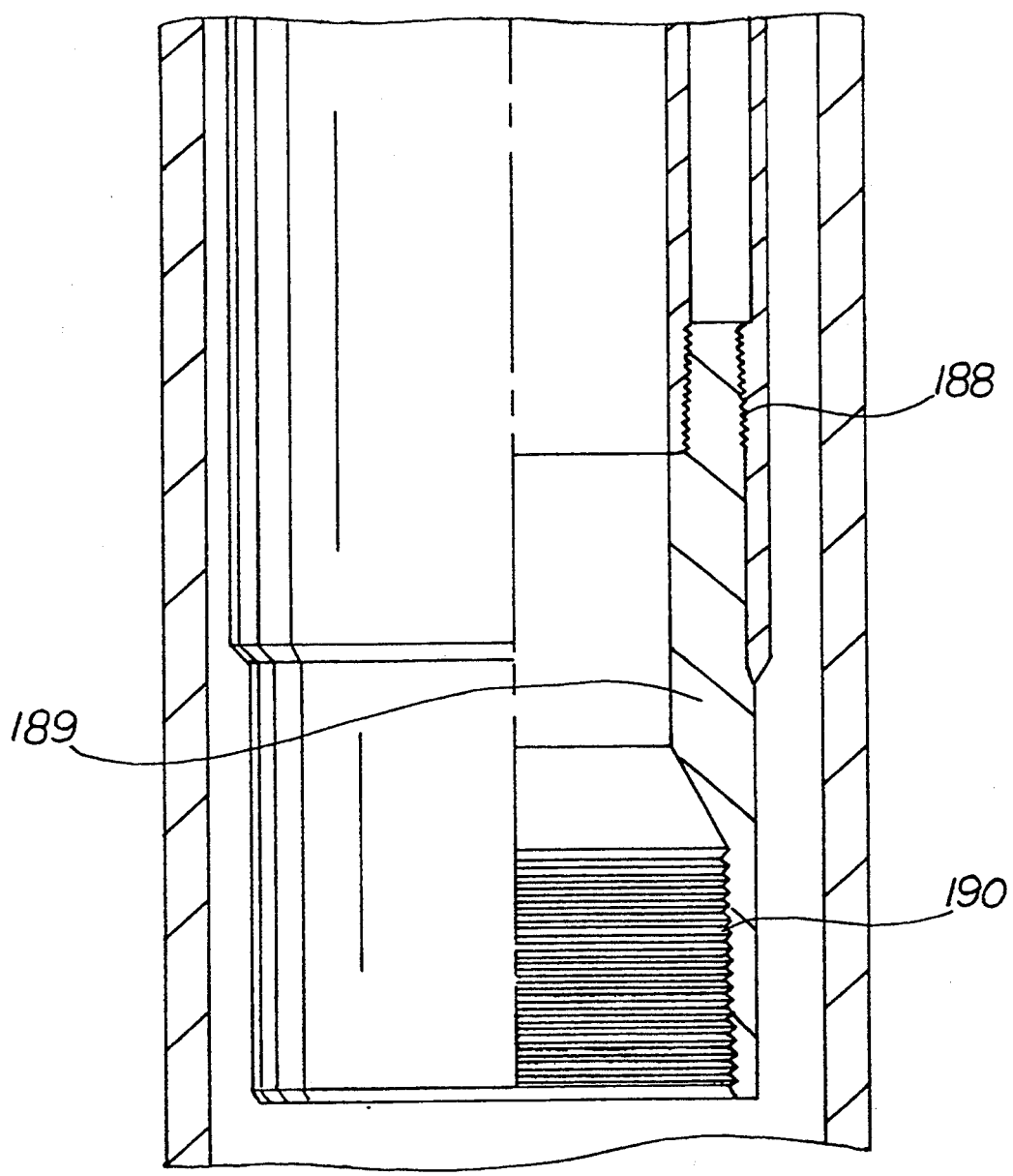

Now referring to FIGS. 2b and 2e, the actuating sleeve 162 extends to the outer ring portion 161 at its uppermost end and is secured at threads 163 to a piston mandrel 164. The piston mandrel 164 has a series of elastomeric or metallic seal members 166 to prevent fluid communication between the piston mandrel 164 and the member 19.

At the lowermost end of the piston mandrel 164 is an enlarged piston head 165 having seal members 165a thereon. The piston mandrel 164 is secured at threads 169 to a lock sleeve 191 which has at is lowermost end (FIG. 2d) a locking dog secured in place within a groove 178 profiled in the member 19 (of FIGS. 1a and 1b) to prevent relative movement between the lock sleeve 191 and the member 19 prior to actuation, as discussed below.

Above the piston head 165 is an atmospheric chamber 168 which extends between the seal members 167 and 165a.

Below the seal member 165a on the piston head 165 is a nitrogen chamber 171. Nitrogen is emplaced in the chamber 171 through filler passage 172 which is capped at 173 subsequent to the filling procedure which is performed prior to introduction of the apparatus into the wall.

A cylinder housing 170 is secured at threads at its uppermost end to the piston mandrel 164 and at threads 173a to an actuator housing 174 there below. The nitrogen chamber 171 is defined between the seals 165a in the piston head 165 and a series of similar seals 175 in the cylinder housing 170.

Housed within the cylinder housing 170 at its uppermost end and the actuator housing is a master control spring 176 carried exteriorly of a spring housing 179.

Below the lowermost end of the spring housing 179 is a non-magnetic solenoid member 180, of conventional construction, which is secured above a ferro-magnetic core member 181. The solenoid member 180 is in communication electronically with the strain gauge 183 through a microprocessor 185 by means of circuit lines 182, 183. The strain gauge 183 is secured to the outer wall of the member 19, such that the given condition on the wall of the conduit member 19 is sensed by the gauge 183.

Below the strain gauge 183 and communicating therewith by electric lines 182a is a microprocessor 185 which may be pre-programmed prior to introduction of the apparatus into the well to detect and generate instructions relative to the solenoid member 180 and the strain gauge 183 in known fashion.

A battery 187 provides electrical energy through lines 186 to the microprocessor 185.

The cylindrical housing 170 is secured at threads 188 to a lower sub 189 which, in turn, is secured by threads 190 to another short section of production tubing, or the like, or may be simply bull-plugged and thus defining the lowermost end of the production conduit 12 (of FIGS. 1a and 1b). Alternatively, an auxiliary tool may be disposed below the actuation controls 16 (of FIGS. 1a and 1b), such as the perforating gun 18 (of FIGS. 1a and 1b).

Figures 4A, 4B:
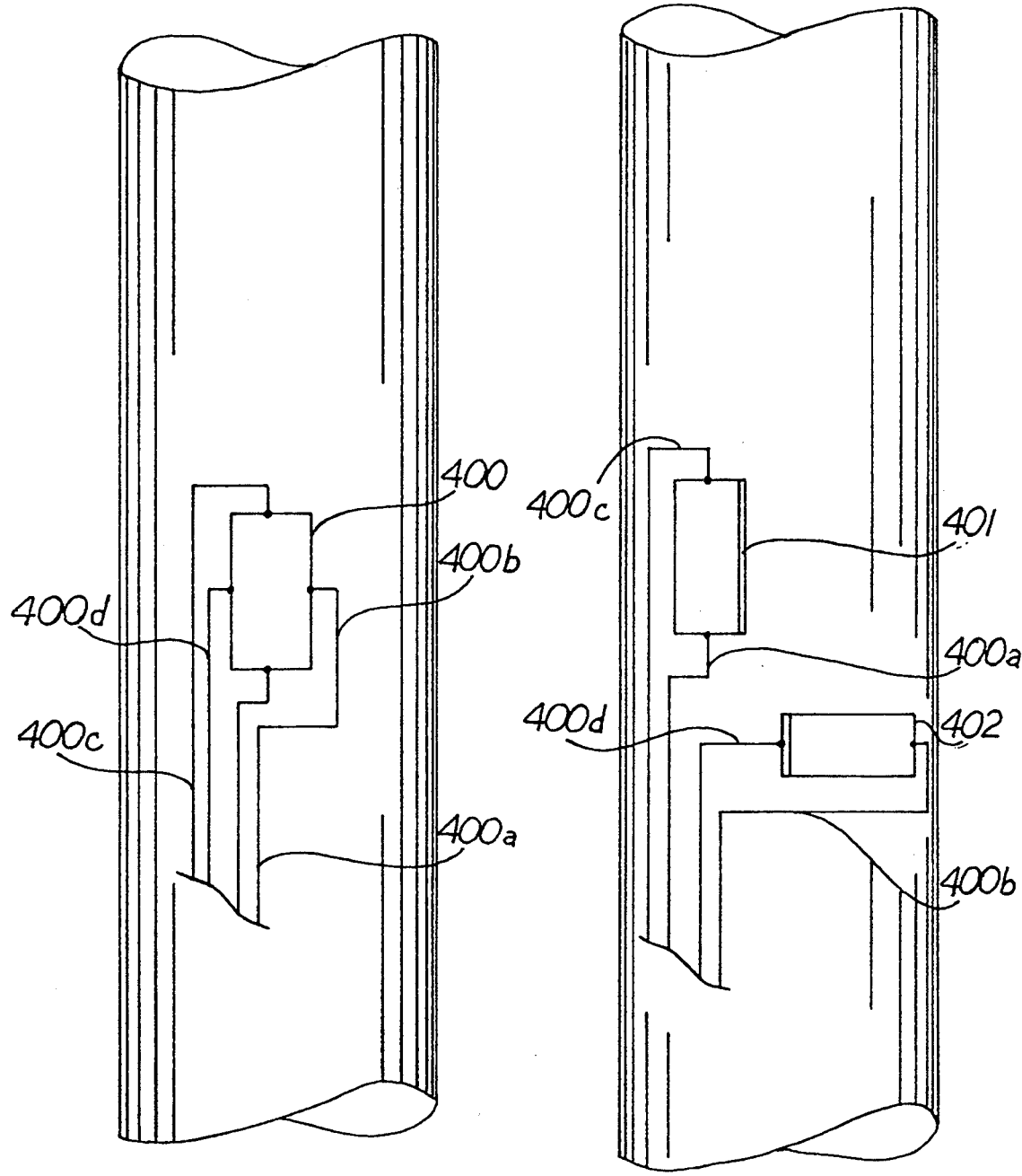
FIGS. 4a and 4b schematically illustrate alternative connections to stain gauges to detect changes in axial and/or circumferential stresses in a production conduit.

The downhole signal generating means embodying this invention comprises a strain gauge 400 applied to the wall of the production conduit which will change its resistance in response to significant changes in the stresses existing in the conduit wall to which it is attached. Strain gauge 400 may be of rectangular configuration as shown in FIG. 4a with connectors 400a, 400b, 400c and 400d respectively connected to the mid points of each side of the strain gauge 400. Thus connectors 400a and 400c will detect changes in the resistance due to changes in axial stress in the conduit. Connectors 400b and 400c will detect changes in resistance due to changes in circumferential stress in the conduit. Connectors 400a, 400b, 400c and 400d thus provide signal inputs to the microprocessor 410 which will generate an activating voltage for operating a downhole tool, such as the packer 14.

The second strain gauge 402 is circumferentially secured to the conduit and has connectors 400b and 400d secured to its opposite ends to indicate axial stresses in the conduit.

As set forth above as can be seen in FIGS. 1a and 1b, the apparatus of the present invention is run into the well interior of the casing 15 and below the wellhead 11, with the production conduit 12 carrying well tools, such as the safety valve 13, packer 14, screen 17 and perforating gun 18. The actuation controls 16 are shown in positioned below the packer 14 on the production conduit 12. However, it will be appreciated that such a control 16 may be positioned either above or below the packer 14, or other well tool on the production conduit 12.

When it is desired to set the well packer 14, the production conduit 12 may either be set down, picked up, or rotated, either clockwise or counterclockwise. The microprocessor 185 has been preprogrammed to detect a predetermined sequence of strain caused thereby, which is, in turn, detected by the strain gauge 183. The battery 187 delivers energy power through line 186 to the microprocessor 185 which, in turn, governs the strain gauge 183.

As the strain gauge 183 detects the stresses defined through the production conduit, a signal is sent through line 182 to the magnetic solenoid member 180 which, in turn, actuates a trigger to shift the spring housing 179 such that the locking dog 177 may be removed from the groove 178 of the lock sleeve 191 which, in turn, permits the control spring 176 to act as a booster upon the piston head 165. Accordingly, the energy in the nitrogen chamber 171 moves the piston head 165 against the atmospheric chamber 168 to urge the piston mandrel 164 upwardly and move the sleeve 162 upwardly such that the lower slip 157 moves on the ramp 155 to urge the teeth 158 of the lower slip 157 out into biting engagement with the internal wall of the casing 15. Contemporaneously with such movement, the energy transmitted through the actuation of the piston head 165 is transmitted such that the upper cone 148 moves relative to the upper slips 145 to permit the teeth 146 of the upper slip 145 to engage the casing 15. Correspondingly, the seal element 152 is compressed and the seals 151, 152 move into sealing engagement with the interior wall of the casing 15. Contemporaneously, the lock ring 160 ratchets relative to the threads 159 and the outer ring 161 to secure the packer actuation in place.

It will be appreciated that the actuation controls 16 have a member 19 thereon which is not ported, such that the dynamic seals 165a, 166 do not come into fluid communication with the fluid either in the atmospheric chamber 168 or in the interior of the production conduit 12, nor do such seals contact or communicate directly with fluid in the annulus between the casing 15 and the production conduit 12.

Figure 5:
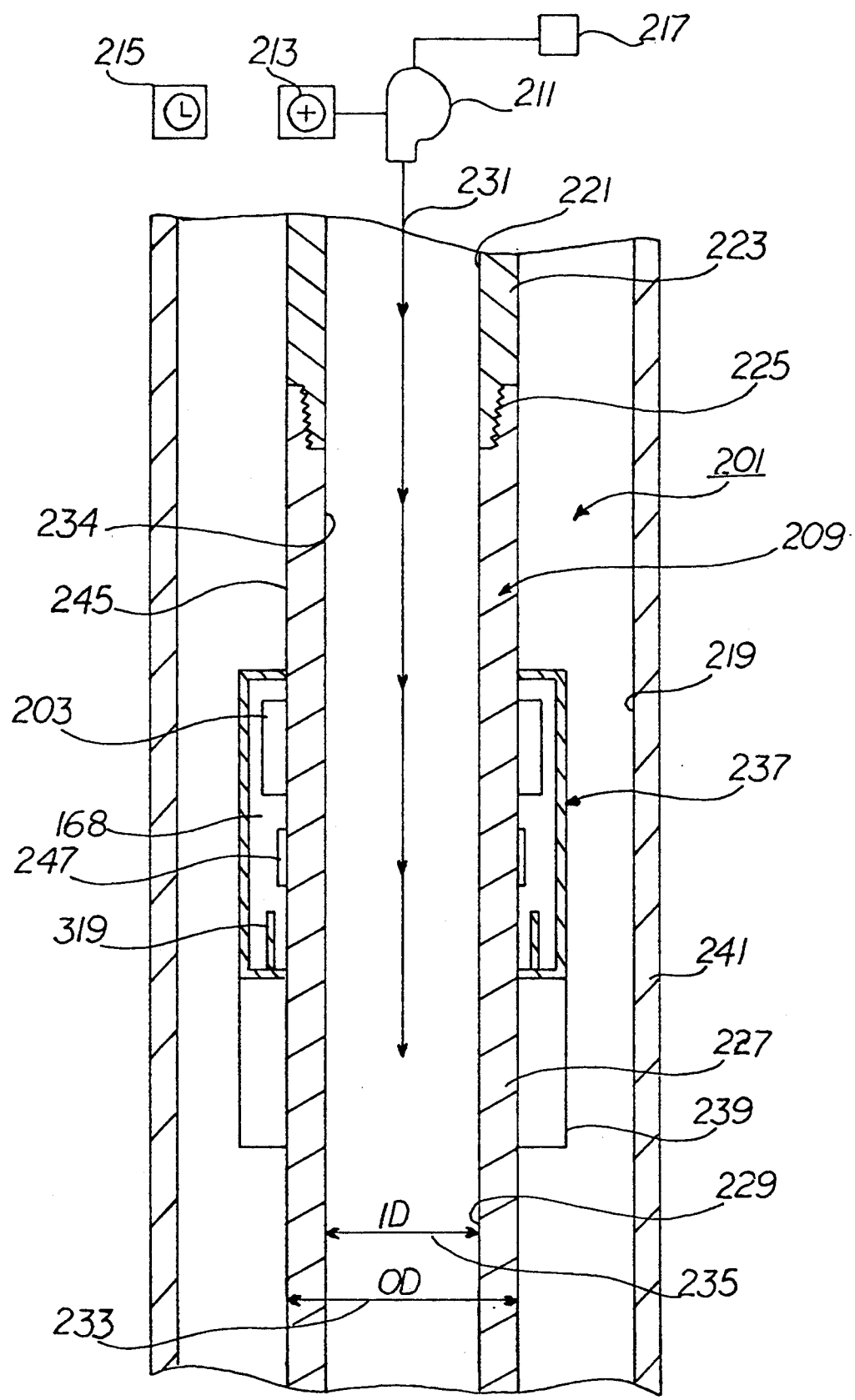
FIG. 5 is a longitudinal section view, in simplified form, of the wellbore communication device of the present invention.

FIG. 5 depicts wellbore communication device 201 in longitudinal section view, and in simplified form. Wellbore communication device 201 includes a source of pressurized fluid, such as fluid pump 211, which may be disposed at either the earth's surface, or within the wellbore. Fluid pump 211 may comprise standard surface pumping equipment, such as triplex pumps which are used to provide pressurized fluid for tubing testing, for setting inflatable packers, or for firing perforating guns.

Preferably, fluid pump 211 should have sufficient capacity to provide fluid pressurized to a selectable amount in the range of zero pounds per square inch to twenty-thousand pounds per square inch, and should preferably have an output capacity of between six to twenty gallons per minute. Also, preferably, fluid pump 211 is coupled to pressure gauge 213, which is a conventional pressure gauge which is used to monitor the pressure amplitude of the output of fluid pump 211. Fluid pump 211 operates to provide pressurized wellbore fluid in a predetermined fluid pressure pattern, which is representative of a coded message. Preferably, the coded message is composed of a plurality of fluid pressure segments of predetermined pressure amplitude and duration.

Pressure gauge 213 facilitates operator monitoring of the pressure amplitudes, and changes in pressure amplitudes. Pressure gauge 213 is used in combination with timing device 215. In its most rudimentary form, timing device 215 may comprise a standard clock which is not coordinated in operation with fluid pump 211. In the preferred embodiment, the pressure amplitude of the output of fluid pump 211 is manipulated by the operator by actuation of pressure amplitude control 217, which serves to allow the operator to vary the pressure amplitude of the fluid produced at the output of fluid pump 211 over the range of operating pressures.

In the preferred embodiment, a human operator physically monitors and controls fluid pump 211, pressure gauge 213, timing device 215, and pressure amplitude control 217, to achieve, with respect to time, a desired predetermined fluid pressure pattern which is representative of coded messages which are to be directed downward into wellbore 219. Fluid pump 211 is in communication with central bore 221 of wellbore tubular conduit string 223, which extends a selected distance downward into wellbore 219 to a desired location. Typically, wellbore tubular conduit string 223 comprises a plurality of steel tubular members which are mated together, and which serve as either production tubing for wellbore 219, or, alternatively, as a temporary workstring which is suspended within wellbore 219.

Wellbore tubular conduit string 223 may also comprise coiled tubing strings, high pressure hoses, or other substitutes for wellbore workstrings. In the embodiment shown in FIG. 5, wellbore tubular conduit string 223 is a steel production tubing string which is permanently disposed within wellbore 219, and which is coupled by threads 225 to conduit member 209. Conduit member 209 has an imperforate wall 227 which at least in-part defines a fluid flow path 229 which is in communication with wellbore tubular conduit string 223, for receiving pressurized fluid, which is represented in FIG. 5 by arrow 231, which is passed downward within wellbore 219 through wellbore tubular conduit string 223.

As shown in FIG. 5, conduit member is a cylindrical, tubular wellbore conduit which is disposed about a central axis, and includes a central bore which forms fluid flow path 229. However, it is not necessary that conduit member 209 be cylindrical in shape. Nor is it necessary that fluid flow path 229 be a central bore disposed within the conduit member, since it is possible for conduit member 209 to include a number of fluid flow paths, of differing shapes and dimensions, for a variety of purposes.

In the preferred embodiment, conduit member is formed of 4140 steel, which has a modulus of elasticity of thirty million pounds per square inch, and a Poisson ratio of 0.3 pounds per square inch. Also, in the preferred embodiment, conduit member 209 is cylindrical in shape, having an outer diameter 233 of 5.5 inches, and an inner diameter 235 of 4.67 inches. In the preferred embodiment, conduit member 209 serves as a mandrel which carries a variety of concentrically disposed assemblies along its outer surface. Such assemblies include pressure sensing assembly 237 and tool 239, both of which are shown schematically in FIG. 5. (FIGS. 2a, 2b, 2c, 2d, 2e, 3a, 3b, 3c, 3d and 3e depict these subassemblies more realistically.) Wellbore tool 239 may comprise a packing device which sealingly and grippingly engages casing 241 of wellbore 219. However, wellbore tool 239 could include other wellbore tools which are operable between a plurality of operating modes, including perforating guns, valves, and the like.

In the preferred embodiment, conduit member 209 includes imperforate wall 227 which defines interior surface 243 and exterior surface 245, with interior surface 243 in communication with pressurized fluid from fluid pump 211. Exterior surface 245 at least in-part defines atmospheric chamber 168 which houses the components which comprise pressure sensing assembly 237. In broad terms, pressure sensing assembly 237 includes sensor means 247, which is coupled to exterior surface 245 of conduit member 209, for detecting forces from pressurized fluid 231 which act upon conduit member 209. This detection is made through imperforate wall 227, from the exterior surface 245 of conduit member 209. Sensor means 247 produces at least one output signal corresponding to the strains acting on conduit member 209. Also, in broad terms, the pressure sensing assembly 237 includes processor means 203 which receives the at least one output signal from the sensor means 247, which corresponds to strains from pressurized fluid 231 or axial force, or some combination thereof, which act upon conduit member 209.

As will be set forth in more detail below, processor means 203 determines a profile of at least the amplitude of pressurized fluid 231 with respect to time, to detect a predetermined fluid pressure pattern which is imposed upon pressurized fluid 231 by human operation and monitoring of fluid pump 211, pressure gauge 213, timing device 215, and pressure amplitude control 217 to produce a predetermined fluid pressure pattern.

Since atmospheric chamber 168 is maintained at atmospheric pressure, high pressure fluid in the annular region between conduit member 209 and wellbore 219 will have no significant impact on the region of conduit member 209 which is monitored by the sensor means. Thus, the amplitudes of the fluid pressure within fluid flow path 229 of conduit member 209 will be determined in absolute pressure values. Essentially, atmospheric chamber 168 provides a reference pressure from which absolute pressure values can be calculated for the fluid within conduit member 209, irrespective of the force from the fluid pressure amplitude of the wellbore fluid exterior of conduit member 209 in the annular space between conduit member 209 and the wellbore surface (if in an uncased, openhole portion of a wellbore) or casing (if in a cased portion of a wellbore). Atmospheric chamber 168 protects at least the portion of conduit member 209 which is monitored by the sensor means, so that portion of the conduit member 209 is not subjected to mechanical stress from wellbore fluid in the annular space between fluid conduit member 209 and the wellbore.

Figure 6:
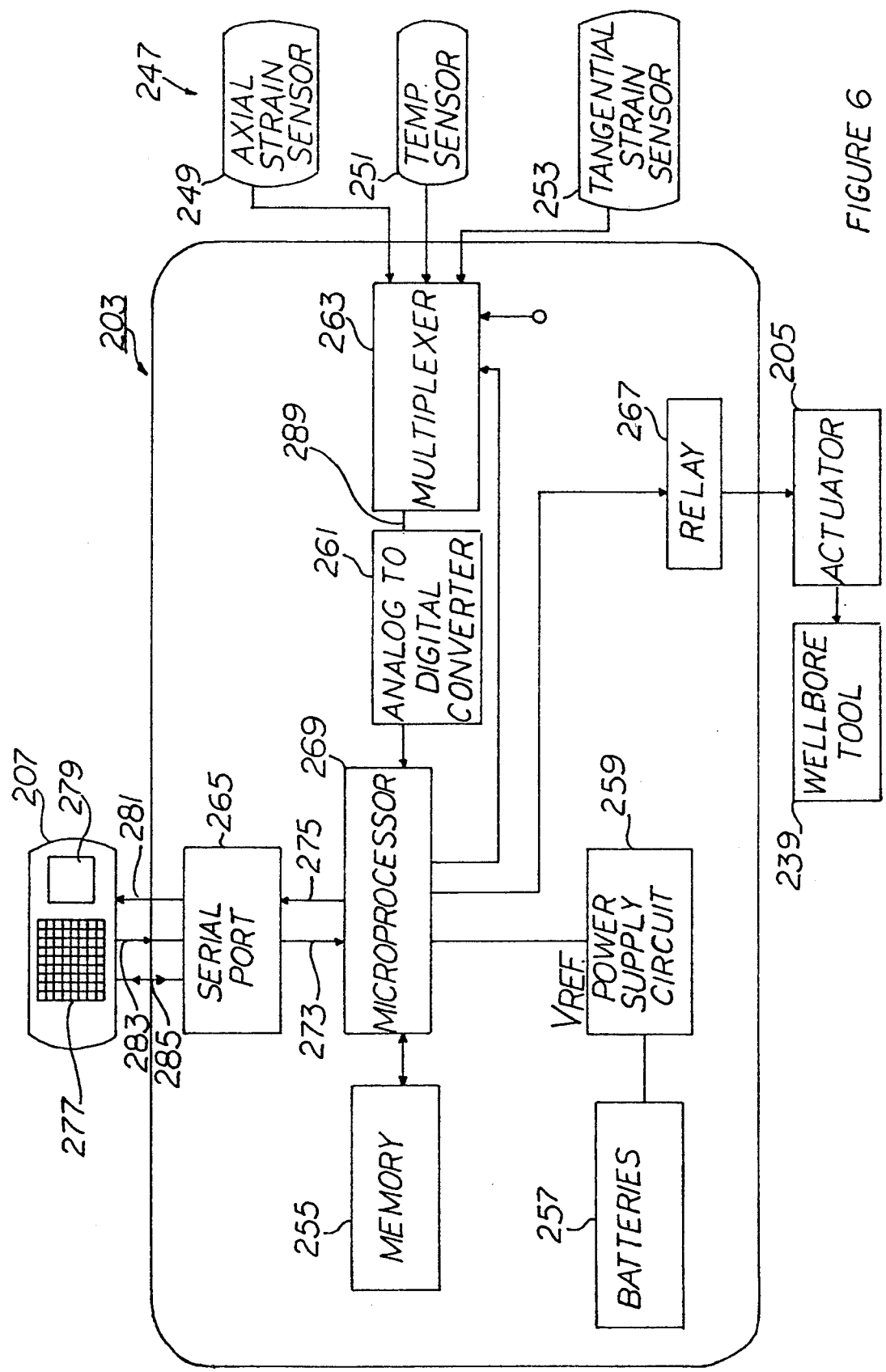
FIG. 6 is a block diagram view of the preferred processor of the present invention coupled to a programming device, sensors, and a well tool actuator.

FIG. 6 is a block diagram schematic view of the preferred sensor means 247 and processor 203 of the preferred embodiment of the present invention. As shown, sensor means 247 includes three sensor elements: axial strain sensor 249; temperature sensor 251; and tangential strain sensor 253. Axial strain sensor 249 and tangential strain sensor 253 provide signals indicative of axial strain and tangential strain, respectively, and are discussed herebelow more fully in connection with FIGS. 7a, 7b, and 8. Temperature sensor 251 is disposed within atmospheric chamber 168, and provides a signal indicative of the temperature within atmospheric chamber 168. In the preferred embodiment, temperature sensor 251 comprises a temperature sensor manufactured by Analog Devices, which is identified by Model No. AD590.

Sensor means 247 provides three output signals to processor 203, which is also shown schematically in FIG. 6. Processor 203 includes a number of components which cooperate together to receive the output signals from sensor means 247 and to determine pressure amplitudes and durations of the pressurized fluid within conduit member 209. These components include: microprocessor 269, memory 255, batteries 257, power circuit 259, analog-to-digital converter 261, mutliplexer 263, serial port 265, and relay 267. Processor 203 communicates with programming unit 207 through serial port 265. Processor 203 also communicates to wellbore tool actuator 205 which serves to selectively actuate wellbore 239.

In the preferred embodiment, microprocessor 269 comprises a sixteen bit microprocessor which is manufactured by National Semiconductor, and identified as the HPC Microcontroller, Model No. HPC 1600 3V20. Microprocessor 269 includes serial input 273 and serial output 275 for receiving and sending serial binary data. Serial input and serial outputs 273, 275 of microprocessor 269 communicate through serial port 265 to programming unit 207 which is releasably coupled to processor 203, and which includes alphanumeric keypad 277 and LCD display 279 (which is a liquid crystal diode display, having two lines for displaying alphanumeric characters).

In the preferred embodiment, serial port 265 comprises a standard TTL (transistor-to-transistor logic) serial interface, of any type which is suitable for use with the selected microprocessor. Also, in the preferred embodiment, programming unit 207 comprises a hand-held bar code terminal which is manufactured by Computerwise of Olathe, Kans., and which is identified further by Model No. TT7-00. Programming unit 207 includes alphanumeric keypad 277 which contains all human-readable characters which have an ASCII counterpart. Programming unit 207 operates to serially transmit and serially receive eight bit ASCII characters which are separated by a carriage return character.

In the preferred embodiment, program unit 207 includes three pins which are releasably coupleable to processor 203 through serial port 265, including: input pin 281, output pin 283, and ground pin 285. Programming unit operates in a transmitting mode of operation to produce at output pin 283 serial, eight-bit, ASCII characters corresponding to a particular key depressed by the operator on alphanumeric keypad 277. In a receiving mode of operation, programming unit 207 operates to display at LCD display 279 all serial, eight-bit, ASCII characters received at input pin 281 from serial port 265. LCD display 279 preferably includes at least two lines, and is capable of generating alphanumeric characters in a human-readable format.

In the preferred embodiment, programming unit 207 is a "dumb terminal", and relies entirely upon processor 203 for generation of human-readable messages which are displayed on LCD display 279. However, in alternative embodiments, it may be desirable to include a microprocessor, or personal computer, in lieu of the "dumb terminal" programming unit 207. In the preferred embodiment, even though programming unit 207 depends upon processor 203 for its computing power and "intelligence", the combination of program unit 207 and processor 203 make available to the operator a variety of user options which are discussed more fully herebelow in connection with FIG. 17.

It is important to bear in mind that programming unit 207 is releasably coupleable to processor 203, and is not carried downward within wellbore 219. Instead, program unit 207 is electrically coupled through terminals to processor 203 when wellbore communication device 201 of the present invention is disposed exteriorly of the wellbore, and may be used either in a laboratory environment or in the field prior to running conduit member 209 downward within wellbore 219.

In the preferred embodiment, microprocessor 269 is coupled to memory 255 which is conventional random access memory (RAM) which serves to store a computer program which receives, records, and manipulates data which is transmitted from programming unit 207 to processor 203. In addition, the computer program memory 255 receives, records, and manipulates sensor output signals from sensor means 247. The program resident in memory 255 manipulates signals from program unit 207 and sensor signals from sensor means 247 to determine pressure amplitudes and durations for the pressurized fluid contained within fluid flow path 229 of conduit member 209.

Output signals from axial strain sensor 249, temperature sensor 251, and tangential strain sensor 253 are provided to input pins of multiplexer 263. The amplitude of the output voltage (Vref) of power supply circuit 259 is also provided to multiplexer 263 so that calculations performed by the computer program resident in memory 255 can be adjusted to accommodate voltage fluctuation as well as the inevitable diminishment of power as batteries 257 are drained over time.

In the preferred embodiment, multiplexer 263 comprises an eight-channel multiplexer manufactured by Maxim, and is further identified by Model No. DG508ACWE. Multiplexer 263 receives a control signal via control line 287 from microprocessor 269, and switches its output 289 in accordance with the control signal from control line 287 to selectively provide as an output a selected one of the output signals of axial strain sensor 249, temperature sensor 251, and tangential strain sensor 253, or the amplitude Vref of the output voltage of power supply circuit 259.

Output 289 of multiplexer 263 is provided to the input of analog-to-digital converter 261. In the preferred embodiment, analog-to-digital converter 261 comprises a voltage-to-frequency converter which receives a voltage level from multiplexer 263 at its input, and produces as an output a signal having a frequency which is proportionate to the voltage level at the input. Preferably, a National Semiconductor voltage-to-frequency converter is employed, which is further identified as Model No. LM 231N.

Processor 203 further includes batteries 257 and power supply circuit 259. Preferably, batteries 257 include a plurality of three volt alkaline batteries, such as those commercially available for consumer goods, and offered for sale under the "EverReady" or "Duracell" trademarks. Batteries 257 provide unregulated voltage to power supply circuit 259. Power supply circuit 259 provides a regulated positive and negative 2.5 volt output, which powers all electrical components within processor 203 which require electrical power, including microprocessor 269, analog-to-digital converter 261 and multiplexer 263. However, for purposes of simplicity of exposition, power circuit 259 is shown in FIG. 6 connected only to microprocessor 269.

In the preferred embodiment, microprocessor 269 includes at least one output pin which is coupled to relay 267. Relay 267 operates to selectively switch actuator 205 between modes of operation. In the preferred embodiment, relay 267 comprises an N-channel, field-effect transistor (FET) switch, which is manufactured by Siliconix, and further identified by Model No. SMP 60 N05. Relay 267 is coupled to actuator 205, and provides an excitation current thereto.

Preferably, actuator 205 includes a pyrotechnic igniter, which includes a black powder charge, which is commonly used for explosive devices. A nickle-chromium wire, which functions as a filament, is embedded in the pyrotechnic igniter, and is heated by current provided through relay 267. Once a sufficient level of heat is obtained in the pyrotechnic igniter, the black powder discharges, creating an electrical match which ignites a secondary charge. The secondary charge sustains sufficient burn temperature to ignite a conventional fuel/oxidizer gas generating propellant generally known as a "power charge". This is used in setting of a variety of conventional and well known wellbore tools. Gases released from the chemical reaction drive a piston which sets a packer, as described in the discussion of FIGS. 2 and 3.

Figure 7A:
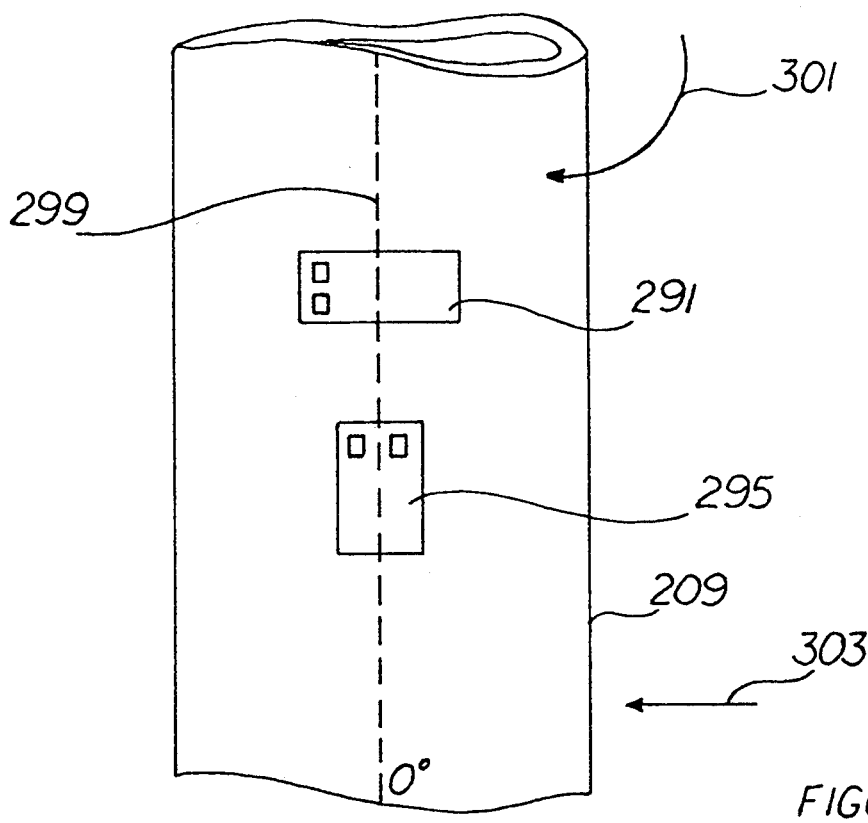
FIGS. 7a and 7b are simplified fragmentary views of opposite sides of the preferred conduit member of the present invention with strain sensors positioned thereon.
Figure 7B:
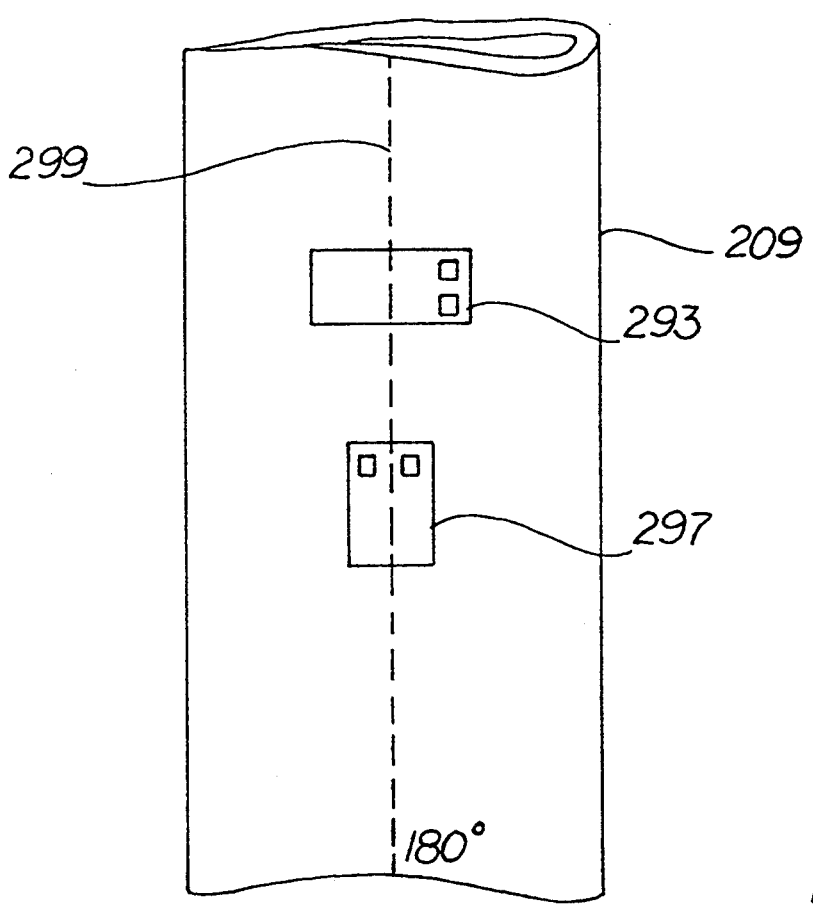

FIGS. 7a and 7b depict the placement of axial strain sensor elements 295, 297 of axial strain sensor 249 of FIG. 6, and tangential strain sensor elements 291, 293 of tangential strain sensor 253 of FIG. 6. As shown, tangential stain sensor elements 291, 293 are placed substantially traverse to the longitudinal axis 299 of conduit member 209, and axial strain sensor elements 295, 297 are disposed substantially parallel with the longitudinal central axis 299 of conduit member 209. FIGS. 7a and 7b depict opposite sides of conduit member 209. Therefore, tangential strain sensor element 291 is displaced from tangential strain element 293 by 180 degrees. Likewise, axial strain sensor element 295 is displaced from axial strain sensor element 297 by 180 degrees.

For purposes of exposition, in FIG. 7a, the central longitudinal axis 299, which is shown bisecting tangential strain sensor 291 and axial strain sensor element 295, indicates zero degrees in position in a cylindrical coordinate system. In contrast, longitudinal axis 299, in FIG. 7b, which bisects tangential strain sensor element 293 and axial strain sensor element 297, corresponds to 180 degrees in a cylindrical coordinate system. Thus, FIGS. 7a and 7b show opposite sides of conduit member 209, and demonstrate that tangential and longitudinal sensor elements 291, 293, 295, 297 are displaced from one another by 180 degrees of separation in a cylindrical coordinate system.

Figure 8:
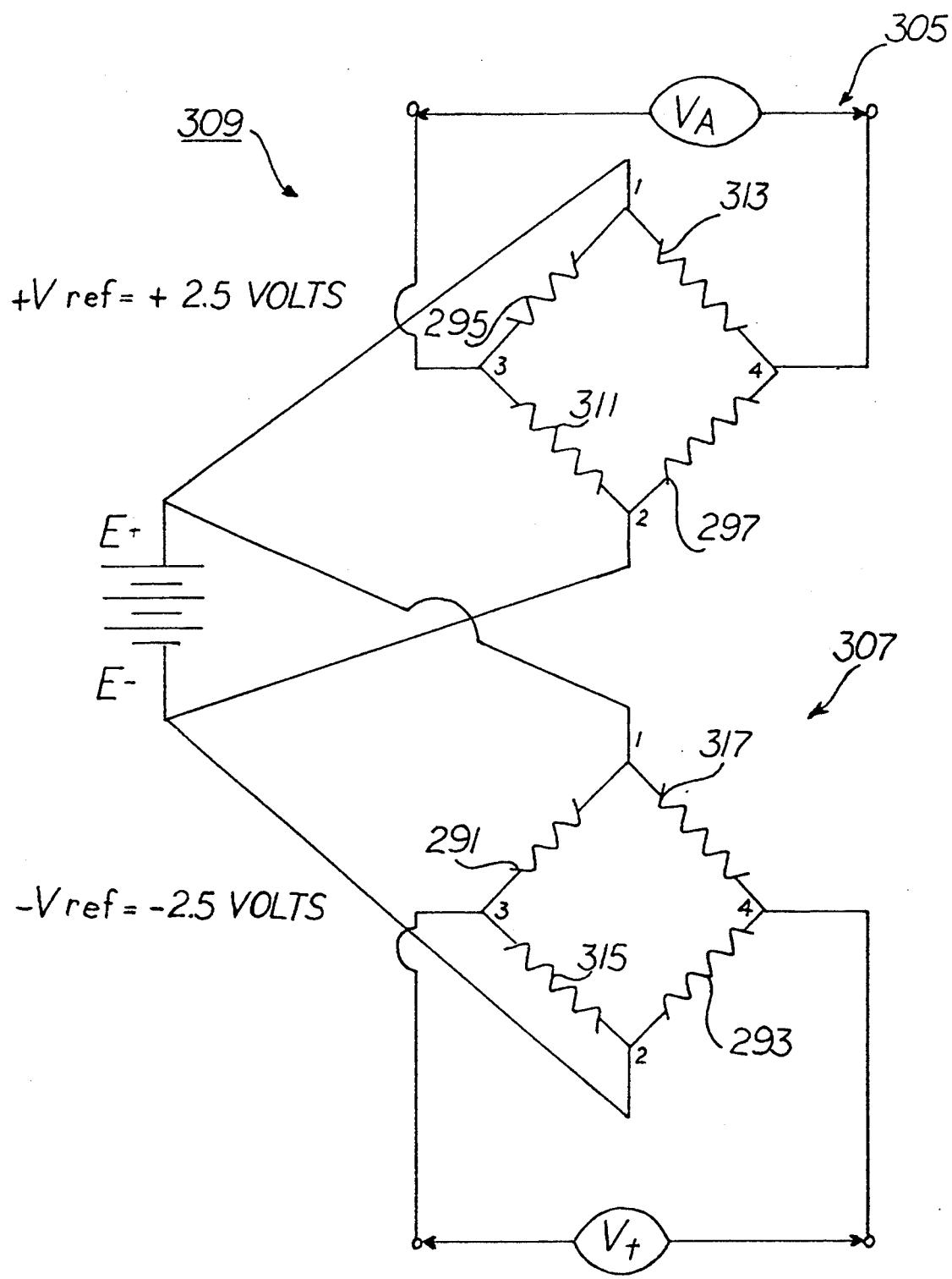
FIG. 8 is an electrical circuit schematic of the preferred strain gauge circuit of the present invention.

This particular geometric configuration of sensor elements relative to conduit member 209 and to one another has been determined, by laboratory testing, to be extremely advantageous since it eliminates by cancellation torsion and bending forces 301, 303 which are detected by tangential and longitudinal strain sensor elements 291, 293, 295, 297 which act on conduit member 209. When conduit member 209 is subjected to bending forces, one side of conduit member 209 is in tension, and the opposite side (that is, the side 180 degrees displaced) is in compression. Therefore, equal and opposite signals are generated by the tangential and axial strain sensor elements 291, 293, 295, and 297 which cancel each other when the sensor elements are mounted on opposite ends of a half-bridge circuit arrangement (as shown in FIG. 8). The same appears to be true for torsion forces which are applied to conduit member 209. Particularly, the strain gauge elements are flexed into a trapezoid shape, in equal and opposite directions, thus generating (in a half-bridge circuit) equal and opposite signals corresponding to the torsion effects, which cancel each other out.

Testing has confirmed this cancellation of torsion and bending forces 301, 303. Laboratory tests were conducted with strain gauge elements coupled in the geometric configuration of FIGS. 7a and 7b, to a test mandrel. The mandrel was subjected to: (a) pure bending forces 303, (b) a combination of torsion forces 301 and bending forces 303, and (c) pure torsion forces 301.

FIG. 8 is an electrical schematic view of the preferred strain sensor circuit 309, which includes axial half-bridge 305 and tangential half-bridge 307. Axial and tangential half-bridges 305, 307 each include four strain gauge sensor elements, two of which are used to detect stress, and two of which are used to detect, and compensate for, temperature variations. More specifically, axial half-bridge 305 includes axial strain sensor element 295 and axial strain sensor element 297. As discussed above in connection with FIGS. 7a and 7b, axial strain sensor 295 is placed on the exterior surface 245 (of FIG. 5) of conduit member 209 (of FIG. 5) at zero degrees in a cylindrical coordinate system, while axial strain sensor 297 is positioned at 180 degrees in the same cylindrical coordinate system.

In axial half-bridge 305, axial strain sensor 295 and axial strain sensor 297 are placed opposite from one another in a "half-bridge" arrangement. Temperature compensation strain sensor elements 311, 313 are placed in the remaining two legs of the bridge circuit. In FIG. 8, axial strain sensors 295, 297 are represented as electrical resistive components. Likewise, temperature compensation strain sensor elements 311, 313 are depicted as electrical resistive components. As shown, axial strain sensor element 295 is coupled between nodes 1 and 3 of axial half-bridge 305. Axial strain sensor 297 is coupled between nodes 2 and 4 of axial half-bridge 305. Temperature compensation strain element 311 is coupled between nodes 2 and 3 of axial half-bridge 305. Temperature compensation sensor element 313 is coupled between nodes 1 and 4 of axial half-bridge 305. Positive 2.5 volts is applied to node 1 of axial half-bridge 305. Negative 2.5 volts is applied to node 2 of axial half-bridge 305.

Temperature compensation strain sensor elements 311, 313 are not coupled to conduit member 209. In fact, temperature compensation sensor elements 311, 313 do not sense any strain whatsoever. Instead, they are placed on carrier member 319 (of FIG. 5) which is disposed within atmospheric chamber 168, but not subjected to any stress. Preferably, the unstressed carrier member 319 is composed of the same material which forms conduit member 209, and has the same metallurgy, including the same thermal expansion coefficient, modulus of elasticity, and Poisson ratio. Temperature compensation sensor elements 311, 313 keep the system balanced during thermal cycling, cancelling any thermal effects on strain sensor circuit 309.

The "active" axial strain sensor elements 295, 297 will change electrical resistance in response to physical strain. Axial strain sensor elements 295, 297 are bonded to the exterior surface 245 of conduit member 209, and experience strain when conduit member 209 is subjected to axial stress. The voltages applied to nodes 1 and 4 cause current to flow in axial half-bridge 305. The resulting voltage developed between nodes 3 and 4 of axial half-bridge 350 is represented in FIG. 8 by $V_a$, which identifies the voltage representative of the axial strain detected by axial half-bridge 305.

Tangential half-bridge 307 includes tangential strain sensor element 291 and tangential strain sensor element 293. As discussed above in connection with FIGS. 7a and 7b, tangential strain sensor 291 is placed at zero degrees in a cylindrical coordinate system, while tangential strain sensor 293 is positioned at 180 degrees in the same cylindrical coordinate system. In tangential half-bridge 307, tangential strain sensor 291 and tangential strain sensor 293 are placed opposite from one another in a "half-bridge" arrangement. Temperature compensation strain sensor elements 315, 317 are placed in the remaining two legs of a full bridge circuit.

In FIG. 8, tangential strain sensors 291, 293 are represented as electrical resistive components. Likewise, temperature compensation strain sensor elements 315, 317 are depicted as electrical resistive components. As shown, tangential strain sensor element 291 is coupled between nodes 1 and 3 of tangential half-bridge 307. Tangential strain sensor 293 is coupled between nodes 2 and 4 of tangential half-bridge 307. Temperature compensation strain element 315 is coupled between nodes 2 and 3 of tangential half-bridge 307. Temperature compensation sensor element 317 is coupled between nodes 1 and 4 of tangential half-bridge 307. Positive 2.5 volts is applied to node 1 of tangential half-bridge 307. Negative 2.5 volts is applied to node 2 of tangential half-bridge 307.

Temperature compensation strain sensor elements 315, 317 are not coupled to conduit member 209. In fact, temperature compensation sensor elements 315, 317 do not sense any mechanical strain whatsoever. Instead, they are placed on carrier member 319 (of FIG. 5) which is disposed within atmospheric chamber 168, and not subjected to any mechanical stress. Preferably, the unstressed carrier member 319 is composed of the same material which forms conduit member 209, and has the same metallurgy, including the same thermal expansion coefficient, modulus of elasticity, and Poisson ratio. Temperature compensation sensor elements 315, 317 keep the system balanced during thermal cycling, cancelling any thermal effects on strain sensor circuit 309.

The "active" tangential strain sensor elements 291, 293 will change electrical resistance in response to mechanical strain. Tangential strain sensor elements 291, 293 are bonded to the exterior surface 245 of conduit member 209, and experience strain when conduit member 209 is subjected to tangential stress. The voltages applied to nodes 1 and 4 cause current to flow in tangential half-bridge 307. The resulting voltage developed between nodes 3 and 4 of tangential half-bridge 307 is represented in FIG. 8 by $V_t$, which identifies the voltage representative of the tangential strain detected by tangential half-bridge 307.

Since the voltages used to bias nodes 1 and 2 of axial and tangential half-bridges 305, 307 will vary slightly over time, it is prudent to "normalize" the output of axial and tangential half-bridges 305, 307 in all subsequent operations which depend upon an accurate presentation of the strains operating on conduit member 209. In the preferred embodiment, the output of axial and tangential half-bridges 305, 307 are normalized by microprocessor 269 and the computer program contained in memory 255, wherein the voltage levels $V_t$ and $V_a$ are divided by the output of power supply circuit 295, which is represented by Vref. Typically, the output of axial and tangential half-bridges 305, 307, is in millivolts (approximately between zero and thirty millivolts in the preferred embodiment), and Vref is in volts (approximately 2.5 volts in the preferred embodiment). Therefore, the "normalized" output of axial and tangential half-bridges 305, 307 is measured in units of millivolts per volt (mV/V).

In the preferred embodiment, tangential and axial strain sensor elements comprise Bonded Foil Strain Gauges, manufactured by Micro Measurements, of Raleigh, N.C., and is further identified as Model No. SK-06-250BF-10c, with each element providing 1,000 ohms of electrical resistance to current flow.

In the preferred embodiment of the present invention, processor 203 operates to receive sensor data relating to the temperature within atmospheric chamber 168 and the strain on tangential and axial strain sensor elements 291, 293, 295, and 297. In the present invention, processor 203 will accurately calculate the internal pressure of the pressurized fluid within fluid flow path 229 (of FIG. 5) of conduit member 209 (of FIG. 5), as will now be described with reference to FIGS. 9, 10a, 10b, 10c, 10d, 11a, and 11b.

Figure 9:
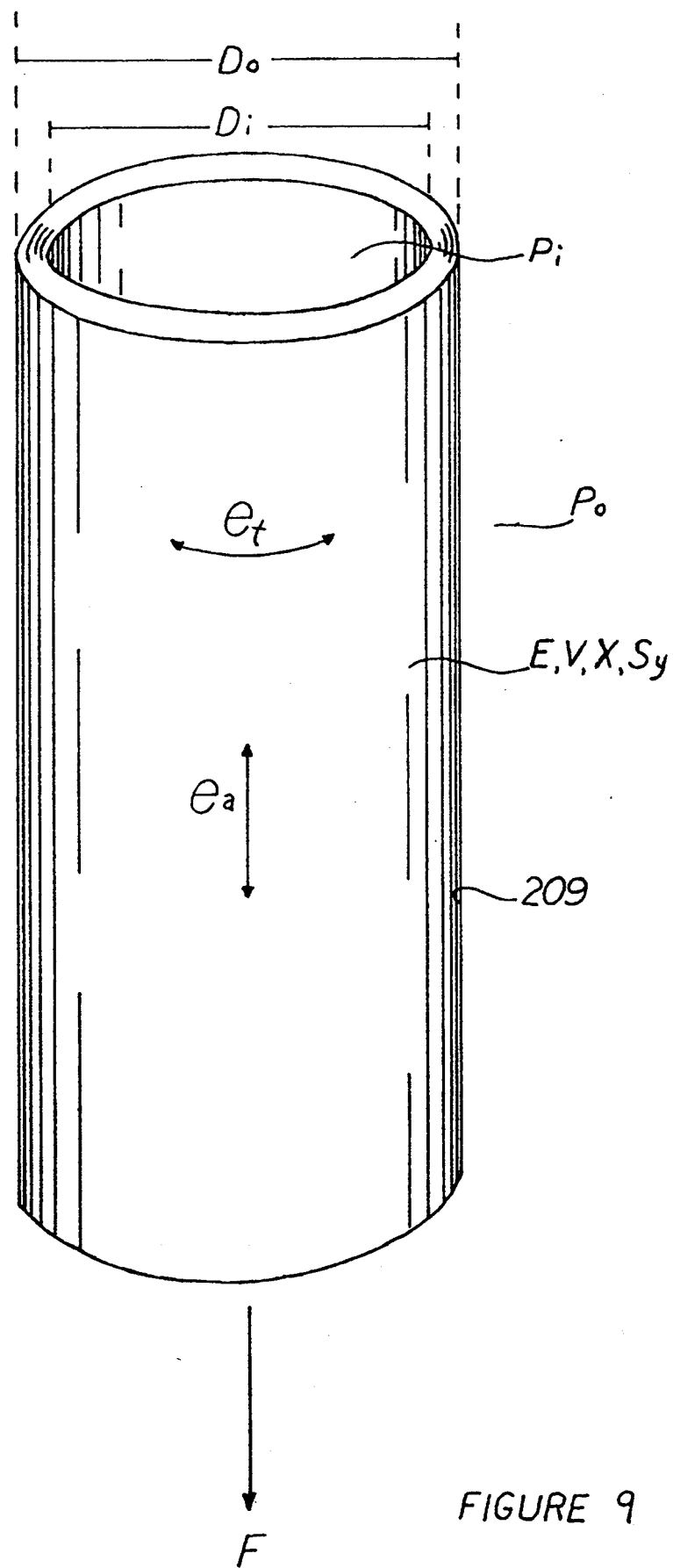
FIG. 9 is a perspective view of a cylindrical pressure vessel which is used to describe the preferred method of calculating internal pressure from stresses acting on the conduit member.

FIG. 9 is a perspective view of a cylindrical pressure vessel, which will be used to describe the preferred method of calculating internal pressure from stresses and strains acting on the vessel. As shown in FIG. 9, $D_o$ is representative of the outer diameter of conduit member 209. $D_i$ is representative of the inner diameter of conduit member 209. Conduit 209 is composed of material which is defined by a number of known properties including a modulus of elasticity, Poisson ratio, a coefficient of thermal expansion, and a yield strength. As shown in FIG. 9, $P_i$ represents the pressure amplitude of pressurized fluid within conduit member 209. $P_O$ is representative of the pressure external to conduit member 209. Tangential strain on the outer diameter of conduit member 209 is represented by "$e_t$". Axial strain is graphically represented in FIG. 9 as "$e_a$". The load (or axial force) acting on conduit 209 is graphically represented in FIG. 9 as "F".

In the present invention, processor means 203 senses tangential and axial strain ($e_t$, and $e_a$, respectively) and calculates internal pressure $P_i$ of the fluid within conduit member 209. The mathematical proof disclosed herebelow demonstrates that internal pressure $P_i$ can indeed be calculated from two strain values. Table No. 1, set forth below, sets forth definitions of the variables which are present in the mathematical proof set forth below.

TABLE NO. 1

| DESCRIPTION | NAME | UNITS |
| --- | --- | --- |
| 1. Modulus of Elasticity | E | pounds per square inch |
| 2. Possion Ratio | v | inch/inch |
| 3. Coefficient of Thermal Expansion | α | inch/inch/ degree Fahrenheit |
| 4. Inner Diameter | $D_i$ | inches |
| 5. Outer Diameter | $D_o$ | inches |
| 6. Axial Load (+ for tension; − for compression) | F | pounds of force |
| 7. Temperature Change | T | degrees Fahrenheit |
| 8. External Pressure | $P_o$ | pounds per square inch |
| 9. (Calculated) Internal Pressure | $P_i$ | pounds per square inch |
| 10. Yield Strength | $S_y$ | pounds per square inch |
| 11. (Sensed) Tangential strain on Outer Diameter | $e_t$ | inches per inch |
| 12. (Sensed) Axial Strain on Outer Diameter | $e_a$ | inches per inch |
| 13. Radial Strain on Outer Diameter | $e_r$ | inches per inch |
| 14. Tangential Stress on on Outer Diameter | $S_t$ | pounds per square inch |
| 15. Axial Stress on Outer Diameter | $S_a$ | pounds per square inch |
| 16. Radial Stress on Outer Diameter | $S_r$ | pounds per square inch |

The following derivation demonstrates that internal pressure $P_i$ of conduit member 209 can be determined from measured axial and tangential strains $e_a$, $e_t$, provided the following assumptions are made:

(1) The axial load F on conduit member 209 is unknown;

(2) Temperature induced strain components can be compensated for by the axial and tangential half-bridges 305, 307 (of FIG. 8); and (3) No torsion forces are present, or, in the alternative, torsion forces are cancelled out by the geometric configuration of the axial and tangential half-bridges 305, 307 (of FIG. 8), and in particular by the placement of temperature compensation strain sensor elements 311, 313, 315, and 317 (of FIG. 8).

The following equation numbers 1, 2, and 3 are set forth in "Introduction to Mechanics of Solids", by Crandel et al., Second Edition, pages 289, 295, 296 and 316, and set forth radial, tangential, and axial strains $e_r$, $e_t$, and $e_a$ as a function of radial, axial, and tangential stress $S_r$, $S_a$, and $S_t$, the modulus of elasticity E, and the Poisson ratio v. The radial, tangential, and axial strains $e_r$, $e_t$, $e_a$, are also a function of temperature change, and the coefficient of thermal expansion. The stress equations are:

$$e_r = \frac{1}{E}[S_r - \nu(S_t + S_a)] + \alpha\Delta T \quad (1)$$

$$e_t = \frac{1}{E}[S_t - \nu(S_a + S_r)] + \alpha\Delta T \quad (2)$$

$$e_a = \frac{1}{E}[S_a - \nu(S_a + S_t)] + \alpha\Delta T \quad (3)$$

Since change in temperature is assumed to be zero, T is eliminated from the three equations. Since $e_r$ cannot be measured with exterior strain gauges, we will attempt, to solve without it, so formulas No. 2 and No. 3 can be rewritten as follows:

$$e_t = \frac{1}{E}[S_t - \nu(S_a + S_r)] \quad (4)$$

$$e_a = \frac{1}{E}[S_t - \nu(S_a + S_r)] \quad (5)$$

The book entitled "Introduction to Mechanics of Solids", by Crandel et al, Second Edition, pages 289, 295, 296 also sets forth three equations for radial, tangential, and axial stress $S_r$, $S_t$, $S_a$, as a function of a plurality of the constants and variables set forth above in Table No. 1, wherein D is equal to the desired depth of investigation:

$$S_r = \frac{P_i \times [(D_o/D)^2 - 1] + P_o[(D_o/D_i)^2 - (D_o/D)^2]}{(D_o/D_i)^2 - 1} \quad (6)$$

$$S_t = \frac{P_i[(D_o/D)^2 + 1] - P_o[(D_o/D_i)^2 - (D_o/D)^2] + (D_o/D)^2]}{(D_o/D_i)^2 - 1} \quad (7)$$

$$S_a = \frac{F}{(\pi/4)(D_o^2 - D_i^2)} \quad (8)$$

Since tangential and axial strain gauge sensor elements 291, 293, 295, and 297 are disposed on exterior surface 245 of conduit member 209, it is fair to assume that stresses of interest occur at diameter D which is equivalent to $D_o$. Therefore, in equation numbers 6, 7, and 8, D is set to $D_o$, and the formulas for stress of equation numbers 6, 7, and 8 can be rewritten, respectively, as follows:

$$S_r = -P_o \quad (9)$$

$$S_t = \frac{2P_i - P_o[(D_o/D_i)^2 + 1]}{(D_o/D_i)^2 - 1} = \frac{2P_iD_i^2 - P_o(D_o^2 + D_i^2)}{(D_o^2 - D_i^2)} \quad (10)$$

$$S_a = \frac{1.273F}{(D_o^2 - D_i^2)} \quad (11)$$

Next, equation numbers 4 and 5 can be solved simultaneously for $S_t$ as follows in the steps of equation numbers 12 through 19, as set forth below.

Equation number 4 can be rewritten as follows by multiplying both sides of the equation by E and subtracting the right hand portion of the equation from the left hand portion of the equation as set forth in equation number 12:

$$E\,e_t - S_t + \nu S_a + \nu S_r = 0 \quad (12)$$

Equation number 12 can be solved for $S_a$, as set forth in equation number 13.

$$S_a = \frac{S_t - Ee_t - \nu S_r}{\nu} \quad (13)$$

Equation number 5 above can be solved for $S_a$, as set forth in equation number 14.

$$Ee_a + \nu S_r + \nu S_t = S_a \quad (14)$$

Equation numbers 13 and 14 can be combined, as set forth in equation number 15.

$$\frac{S_t - Ee_t - \nu S_r}{\nu} = Ee_a + \nu S_r + \nu S_t \quad (15)$$

As set forth in equation number 16, 17, and 18, terms can be eliminated and consolidated to solve the equation for $S_t$, as set forth in equation number 19.

$$S_t - E\,e_t - \nu S_r = E\nu e_a + \nu^2 S_r + \nu^2 S_t \quad (16)$$

$$S_t - \nu^2 S_t = E\nu e_a + \nu^2 S_r + E e_t + \nu S_r \quad (17)$$

$$S_t(1-\nu^2) = E(e_t + \nu E_a) + \nu S_r(1+\nu) \quad (18)$$

$$S_t = \frac{E(e_t + \nu e_a) + \nu S_r(1 + \nu)}{1 - \nu^2} \quad (19)$$

Equation numbers 9 and 19 above can be substituted into equation number 19, and terms can be cancelled and rearranged as set forth in equation numbers 20 and 21, to yield equation number 22 which sets forth internal pressure $P_i$ as a function of known constants, such as modulus of elasticity E and Possion ratio $\nu$, the geometry, such as the outer diameter $D_o$ and the inner diameter $D_i$, and the external pressure $P_o$ (which is established at atmospheric pressure in the present invention), and two variables: tangential strain $e_t$, and axial strain $e_a$.

$$\frac{2P_iD_i^2 - P_o(D_o^2 + D_i^2)}{(D_o^2 - D_i^2)} = \frac{E(e_t + \nu e_a) - \nu P_o(1 + \nu)}{1 - \nu^2} \quad (20)$$

$$\frac{2P_iD_i^2}{(D_o^2 - D_i^2)} = \frac{E(e_t + \nu e_a)}{1 - \nu^2} - \frac{\nu P_o(1 + \nu) + P_o(D_o^2 + D_i^2)}{(D_o^2 - D_i^2)} \quad (21)$$

$$P_i = \frac{D_o^2 - D_i^2}{2D_i}\left[\frac{E(e_t + \nu e_a) - \nu P_o(1 + \nu)}{1 - \nu^2}\right] + \frac{P_o(D_o^2 + D_i^2)}{2D_i} \quad (22)$$

Therefore, equation number 22 establishes that the internal pressure $P_i$ of conduit member 209 can be calculated with only strain gauge data for axial and tangential strain. Tangential strain $e_t$ is referred to by other names, including "hoop strain".

In the preferred embodiment of the present invention, processor 203 (of FIG. 6) is especially adapted for monitoring of particular conduit members, and is programmed with mathematical constants which are specific to the particular conduit member which carries a particular processor 203 (of FIG. 6) within wellbore 219 (of FIG. 5). The mathematical constants which pertain to a particular conduit member are derived during a calibration mode of operation, in which the particular conduit member is subjected to axial force and internal fluid pressure over a range of selected forces and pressures. The calibration mode of operation will now be described with reference to FIGS. 10a, 10b, 10c, and 10d.

In a calibration mode of operation, a particular conduit member 209 (of FIGS. 5 and 9) is subjected first to axial forces, then to internal pressure from pressurized fluid, over a range of selected forces and pressures. During the calibration mode of operation, the voltage outputs of axial half-bridge 305 (of FIG. 8) and tangential half-bridge 307 (of FIG. 8) are recorded.

Figure 10A:
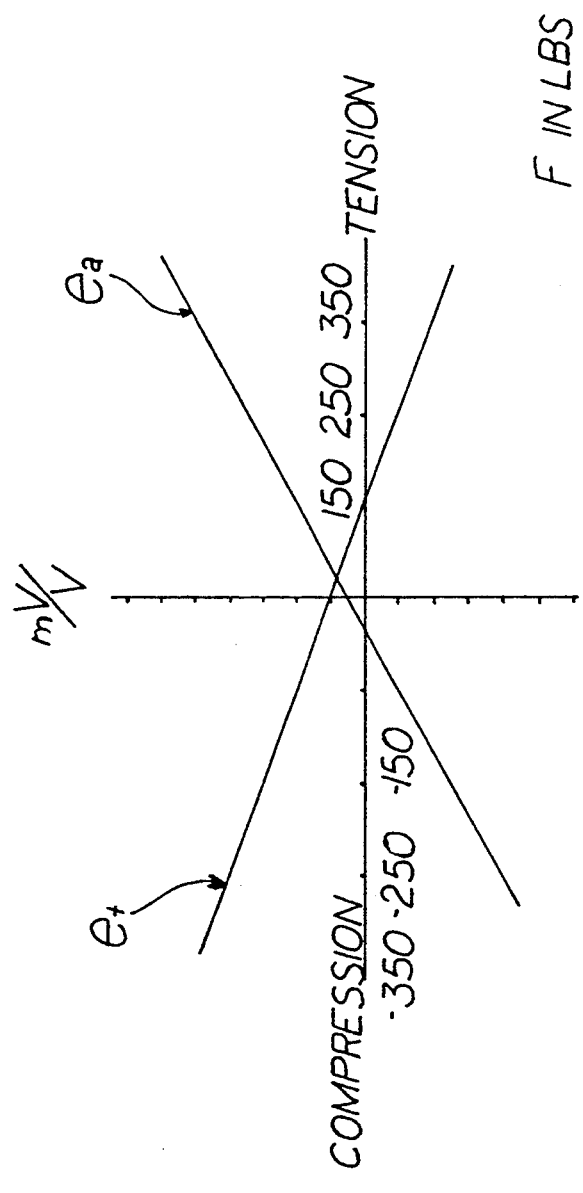
FIGS. 10a, 10b, 10c, and 10d are graphs of strain gauge sensor responses to internal pressure and axial forces, and are used to describe the technique of calculating internal pressure from strain gauge data.

In FIG. 10a, a graph is provided which plots the voltage outputs of axial and tangential half-bridges 305, 307 (of FIG. 8) as a function of axial force exerted on conduit member 209 (of FIGS. 5 and 9), with no fluid pressure acting on interior surface 243 of conduit member 209 (of FIG. 5). In the graph, the X-axis is representative of axial force F acting on conduit member 209 (of FIGS. 4 and 9). The Y-axis is representative of the output of both axial and tangential half-bridges 305, 307 (of FIG. 8), in millivolts per volt (that is, normalized for the value of Vref, as discussed above).

As shown, two lines are generated in FIG. 10a with respect to the X-axis and Y-axis, representative of tangential and axial strains $e_t$, $e_a$. During the calibration activities associated with FIG. 10a, no fluid is provided within conduit member 209 (of FIGS. 5 and 9), so internal pressure $P_i$ is maintained at zero pounds per square inch. Conduit member 209 (of FIGS. 5 and 9) is subjected to a plurality of force levels in pounds. The left-half of the graph of FIG. 10a represents compression of conduit member 209 (of FIGS. 5 and 9), while the right half of the graph of FIG. 10a represents conduit member 209 (of FIGS. 5 and 9) under tension.

In the preferred embodiment, conduit member 209 (of FIGS. 5 and 9) is subjected to forces in the range of one hundred thousand pounds of compression to three hundred and fifty thousand pounds of tension, in fifty thousand pound increments of force. Therefore, datapoints are collected at one hundred thousand pounds of compression, fifty thousand pounds of compression, fifty thousand pounds of tension, one hundred thousand pounds of tension, one hundred and fifty thousand pounds of tension, two hundred thousand pounds of tension, two hundred and fifty thousand pounds of tension, three hundred thousand pounds of tension, and three hundred and fifty thousand pounds of tension. Altogether, eighteen datapoints are gathered, nine from the tangential strain sensor, and nine from the axial strain sensor. The readings of the tangential strain sensor define a line with a negative slope, while the readings of the axial strain sensor define a line with a positive slope.

Figure 10B:
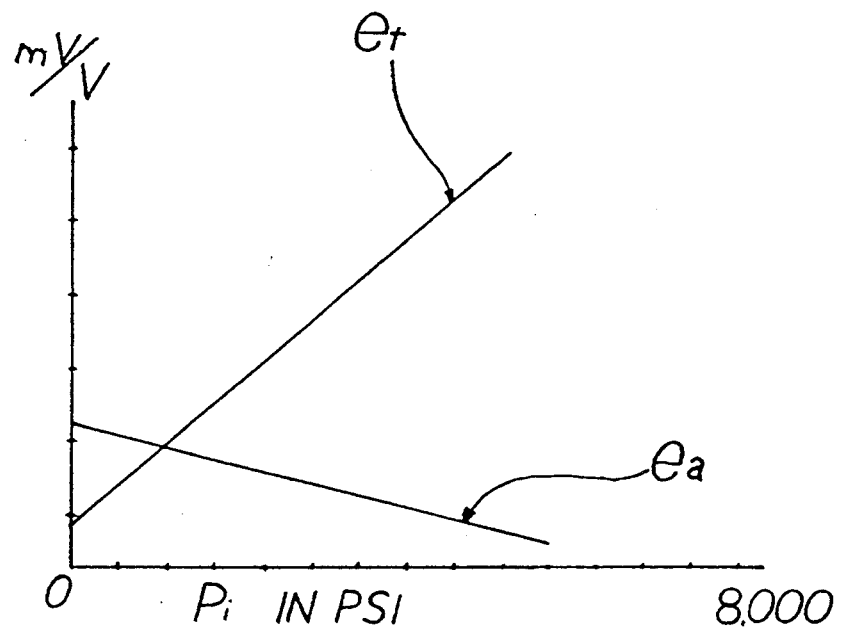

The next calibration function is represented by FIG. 10b, which plots the output of the tangential and axial strain sensors as a function of internal fluid pressure $P_i$, with axial forces maintained at zero (F=0). As shown, the X-axis is representative of the internal fluid pressure $P_i$ of the fluid within conduit member 209 over a range of fluid pressures from between zero pounds per square inch to approximately eight thousand pounds per square inch. The Y-axis of FIG. 10b is representative of the output of the tangential and axial strain sensors, and represent tangential and axial strain $e_t$, $e_a$, in units of millivolts per volt (which normalizes the output of the stain sensors, as discussed above). During this calibration procedure, axial force acting on conduit member 209 (of FIGS. 5 and 9) is maintained at zero, and the pressure of fluid in the central bore of conduit member 209 (of FIGS. 5 and 9) is increased incrementally over a range of pressures from zero to eight thousand pounds per square inch of force.

It will be recognized that in FIGS. 10a and 10b the tangential and axial strains $e_t$, $e_a$ are very nearly linear, so they can be modeled as such, using the equation: Y=MX+B. Of course, FIG. 10a can be rewritten as V=MP+B, and the functions of FIG. 10b can be rewritten as V=MF+B, wherein:

V equals voltage in millivolts per volt;
P equals internal pressure;
M equals slope; and
B equals the y-intercept.

Figure 10C:
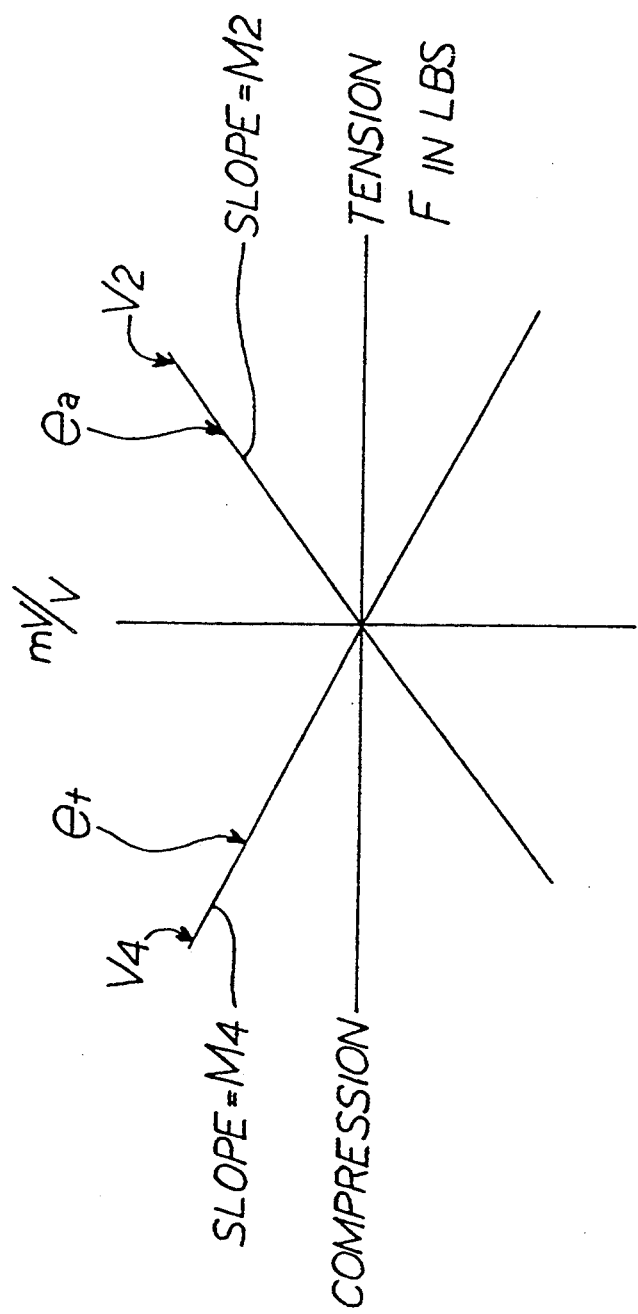
Figure 10D:
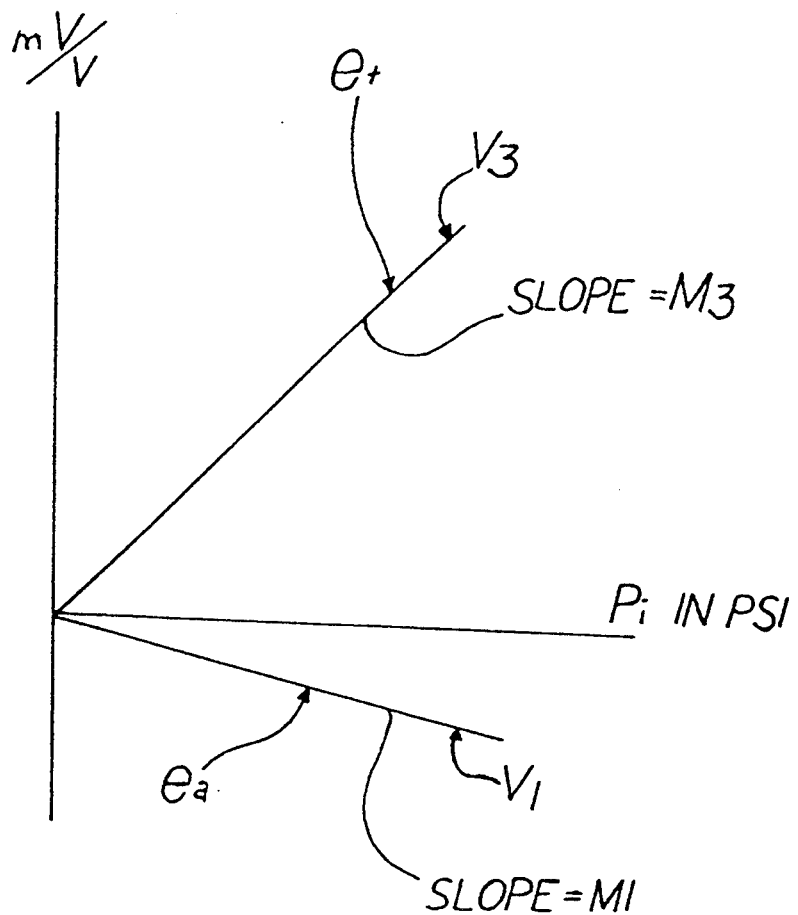

As shown in FIGS. 10c and 10d, the functions of FIGS. 10a and 10b can be "zeroed out" at the origin by subtracting an offset value at start-up. Therefore, when B is set to zero, the functions of FIGS. 10a and 10b can be redrawn, respectively, as shown in FIGS. 10c and 10d. From the data gathered during the calibration operations, four functions can be defined in terms of pressure P and force F, as follows:

$$V_1 + M_1 P \tag{23}$$

$$V_2 + M_2 P \tag{24}$$

$$V_3 + M_3 P \tag{25}$$

$$V_4 + M_4 P \tag{26}$$

Equations 23 and 24 are representative of the axial strain sensors' response to changes in pressure and force, and equation numbers 25 and 26 are representative of the tangential strain sensors' response to changes in pressure and force.

Assuming that the modulus of elasticity E is constant within conduit member 209 (of FIGS. 5 and 9), then tangential strain $e_t$ due to either pressure $P_i$ or force F is additive, so the total voltage output of tangential strain sensors, $V_T$, is additive. Thus, the total voltage $V_T$ is equal to the sum of $V_3$ and $V_4$, as set forth below in equation number 27. The same is true for axial strains. Assuming that the modulus of elasticity E is constant within conduit member 209 (of FIGS. 5 and 9), then the total voltage output of the axial strain sensors, $V_A$, due to either internal pressure $P_i$ or force F are additive. Thus, the total voltage from the axial strain sensors $V_A$ is equal to the sum of voltages $V_1$ and $V_2$, as set forth below in equation number 28.

$$V_T = V_3 + V_4 \tag{27}$$

$$V_A = V_1 + V_2 \tag{28}$$

Combining equation numbers 23 through 28 yields the following equation numbers 29 and 30:

$$V_T = M_3 P + M_4 F \tag{29}$$

$$V_A = M_3 P + M_2 F \tag{30}$$

Equation number 29 can be solved for F, and substituted into equation number 30 to yield equation number 31, as follows:

$$V_A = M_1 P + M_2 \left[ \frac{V_T - M_3 P}{M_4} \right] \quad (31)$$

Equation number 31 can be solved for pressure P to yield equation number 32, which sets forth pressure P (that is, internal pressure $P_i$) as a function of the output of the tangential and axial strain sensors $V_T$, $V_A$, and the constants $M_1$, $M_2$, $M_3$, $M_4$, as follows:

$$P = \frac{V_A - \frac{M_2}{M_4} V_T}{M_1 - \frac{M_2 M_3}{M_4}} \quad (32)$$

Equation number 32 can be combined with equation number 29 to yield equation number 33 which sets forth the axial force F acting on conduit member 209 (of FIGS. 5 and 9) as a function of the output of the tangential and axial strain sensors $V_T$, $V_A$, as well as the constants $M_1$, $M_2$, $M_3$, and $M_4$, as follows:

$$F = \frac{V_T - M_3 \left[ \dfrac{V_a - \frac{M_2}{M_4} V_T}{M_1 - \frac{M_2 M_3}{M_4}} \right]}{M_4} \quad (33)$$

Therefore, the preferred calibration procedure of the present invention allows an operator to obtain all constants necessary for use with equation numbers 32 and 33, which allow processor 203 (of FIG. 6) to calculate axial force F or internal pressure $P_i$ acting on conduit member 209 (of FIGS. 5 and 9), as a function solely of the output of the tangential and axial strain sensors.

Figure 11A:
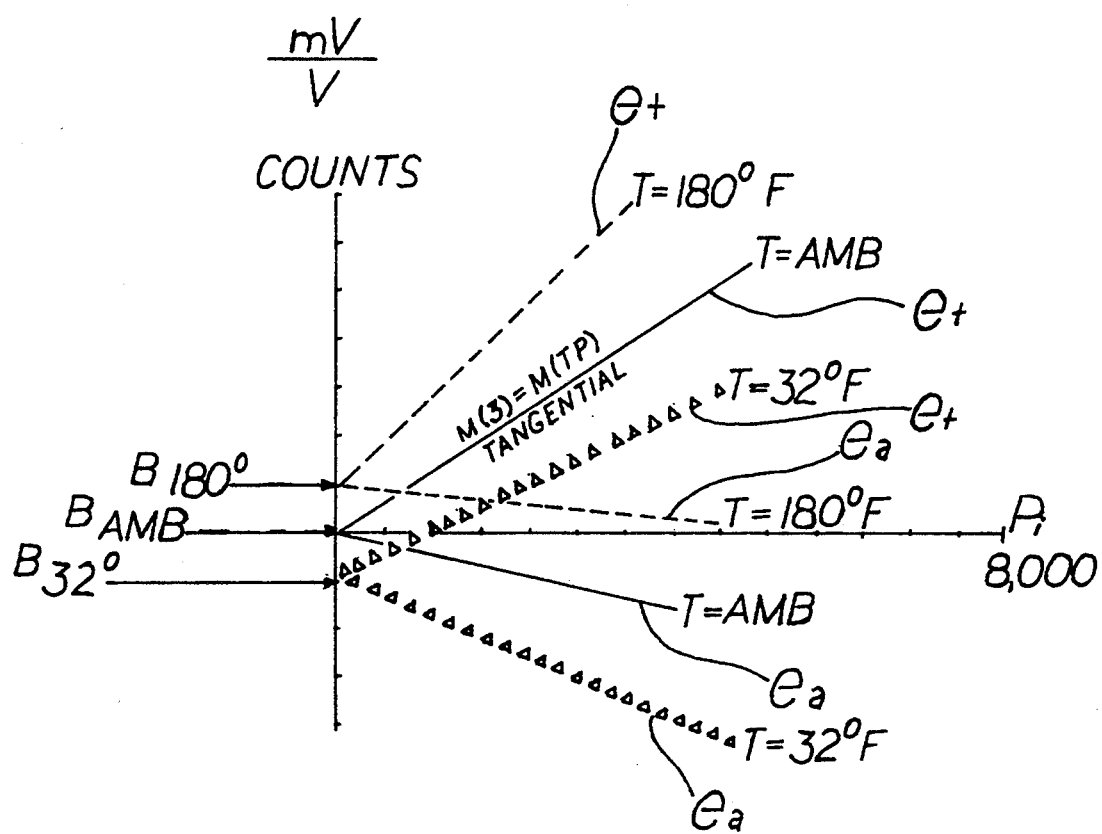
FIGS. 11a and 11b are graphs which illustrate the temperature sensitivity of the preferred wellbore communication device of the present invention.

A third calibration operation may be performed to allow for accurate calculations of either internal pressure $P_i$ or axial force F, irrespective of the effects on temperature changes on the electronic components which make up processor 203 (of FIG. 6), and which were described above in detail. Even with temperature compensated axial and tangential half-bridges 305, 307 (of FIG. 8), the thermal response of the entire electronics system may require correction. The problem is illustrated by FIG. 11a which is similar to FIG. 10d, but is a plot of the tangential and axial strains $e_t$, $e_a$ at three different temperatures: ambient temperature (70 degrees Fahrenheit), 180 degrees Fahrenheit, and 32 degrees Fahrenheit. It is clear from FIG. 11a that each set of tangential and axial strains $e_t$, $e_a$ has a different y-intercept, due solely to the effects of temperature variation on the electronics of processor 203 (of FIG. 6). The functions of FIG. 10c would vary in a similar fashion, since the tangential and axial strains $e_t$, $e_a$ likewise have different y-intercepts, as temperature varies. In the present invention, this problem is resolved by performing the calibration procedures, which are graphically depicted in FIGS. 10a and 10b, over a selected range of temperatures between 32 degrees Fahrenheit and 180 degrees Fahrenheit.

Preferably, each test of the response of the tangential and axial strains sensors to axial force F and fluid pressure $P_i$ is performed at five different temperatures: 32 degrees Fahrenheit, 70 degrees Fahrenheit, 105 degrees Fahrenheit, 135 degrees Fahrenheit, and 180 degrees Fahrenheit. For each test of response to axial force F and internal fluid pressure $P_i$, slope values are derived, and plotted with respect to temperature, as set forth by example in FIG. 11b.

Figure 11B:
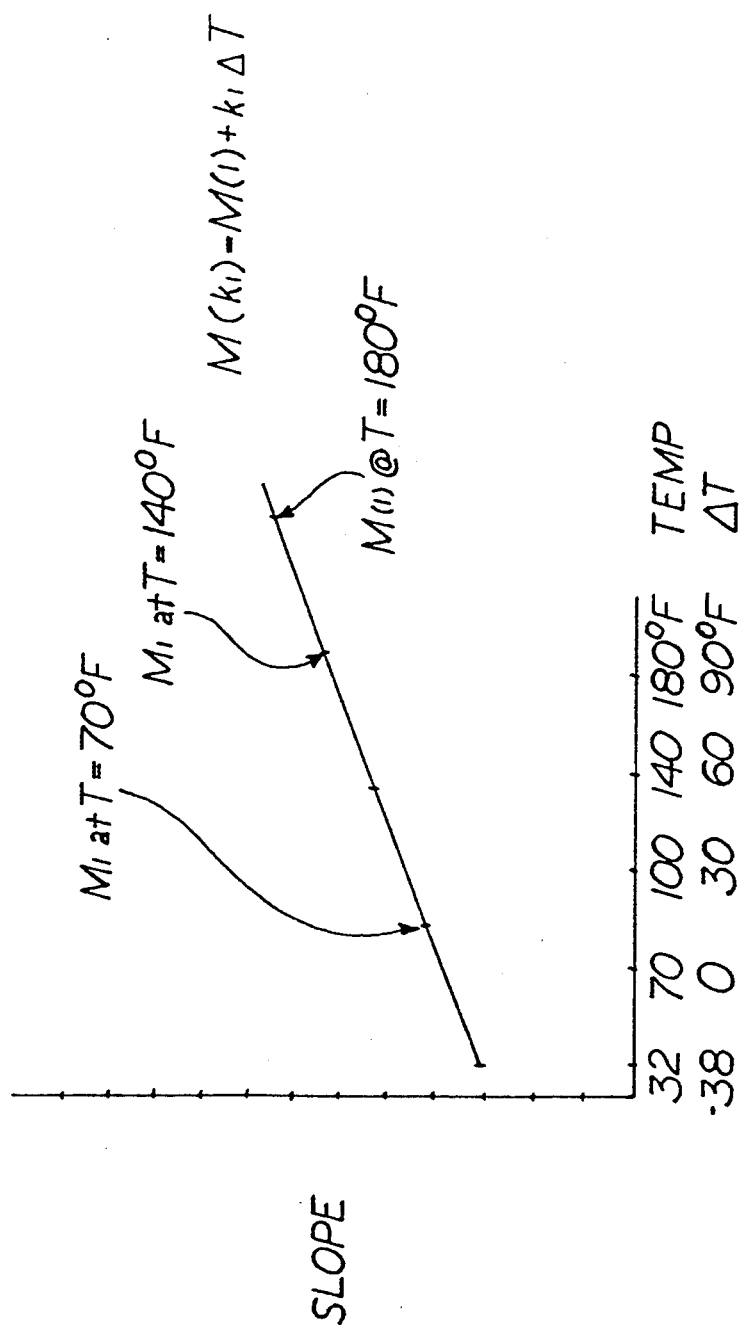

In FIG. 11b, the X-axis is representative of temperature in degrees Fahrenheit, and the Y-axis is representative of the slope values $M_1$ of equation number 23, over the selected testing temperature range. Each particular slope $M_1$ is plotted as a function of temperature. Similar plots may be generated for $M_2$, $M_3$, and $M_4$ slope values. The function of slope value with respect to temperature is essential linear; therefore, the temperature effect on slope at points other than the discrete testing temperatures can be calculated by equation numbers 34, 35, 36, and 37, as set forth below, wherein $\Delta T$ corresponds to the difference between ambient temperature (70 degrees Fahrenheit) and the testing temperature of processor 203; wherein $k_1$, $k_2$, $k_3$, and $k_4$ correspond to the slope of the graphic representation of slope versus temperature; and wherein $M_1$, $M_2$, $M_3$, and $M_4$ represent the slopes which are calculated at ambient temperature:

$$M(k_1) = M_1 + k_1 \Delta T \quad (34)$$

$$M(k_2) = M_2 + k_2 \Delta T \quad (35)$$

$$M(k_3) = M_3 + k_3 \Delta T \quad (36)$$

$$M(k_4) = M_4 + k_4 \Delta T \quad (37)$$

In order to calculate internal fluid pressure $P_i$, or axial fluid force F, at temperatures other than ambient temperature (70 degrees Fahrenheit), equation numbers 32 and 33 are modified by replacing $M_1$ with $M(k_1)$, $M_2$ with $M(k_2)$, $M_3$ with $M(k_3)$, and $M_4$ with $M(k_4)$. The result of such substitution will yield modified equations for internal pressure $P_i$ and axial force F, which will take into account the impact of temperature variation upon the accuracy of determination of internal pressure P or axial force F.

Figure 12:
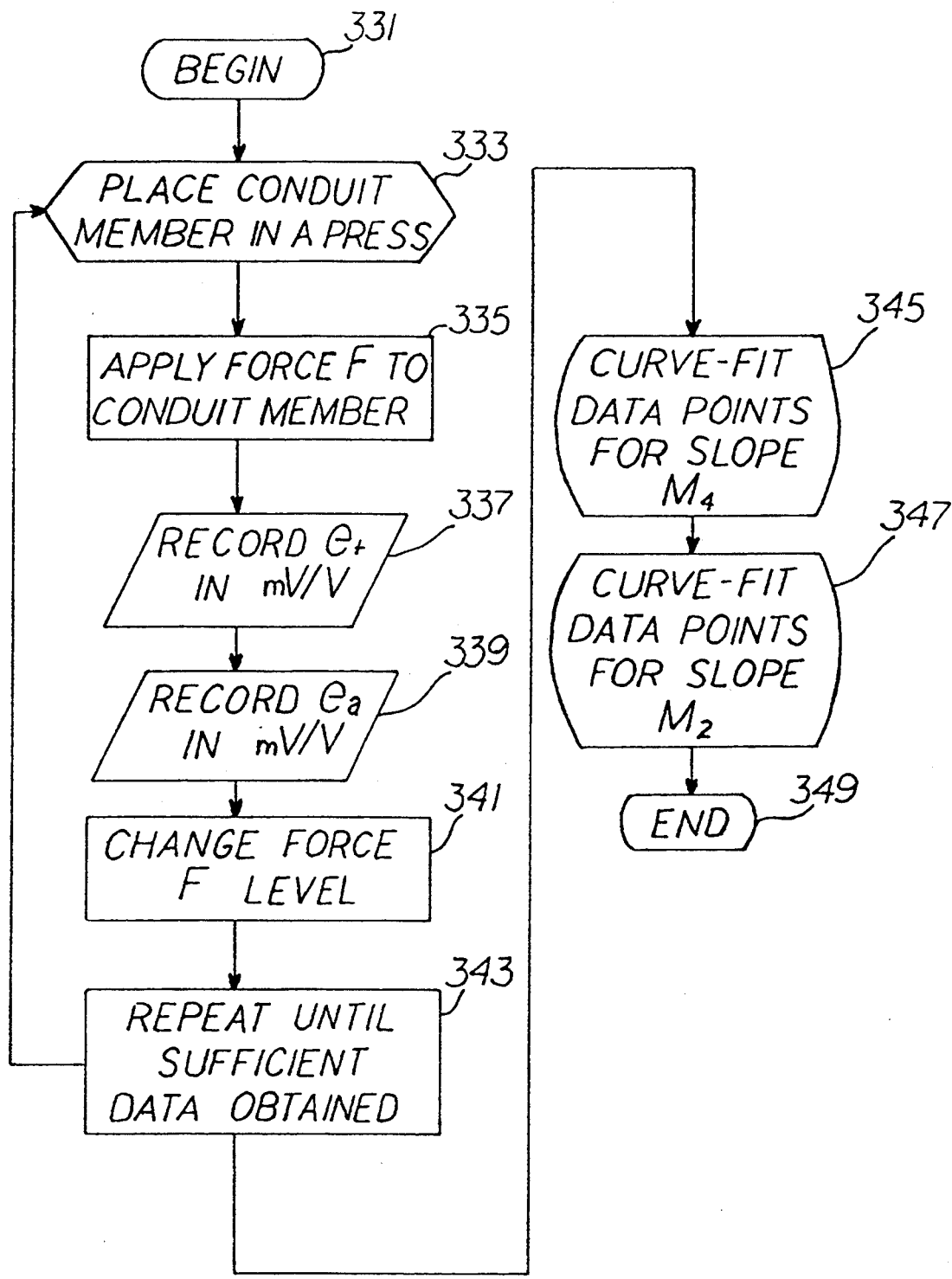
FIGS. 12, 13, and 14 are flow chart representations of the preferred calibration of the present invention.
Figure 13:
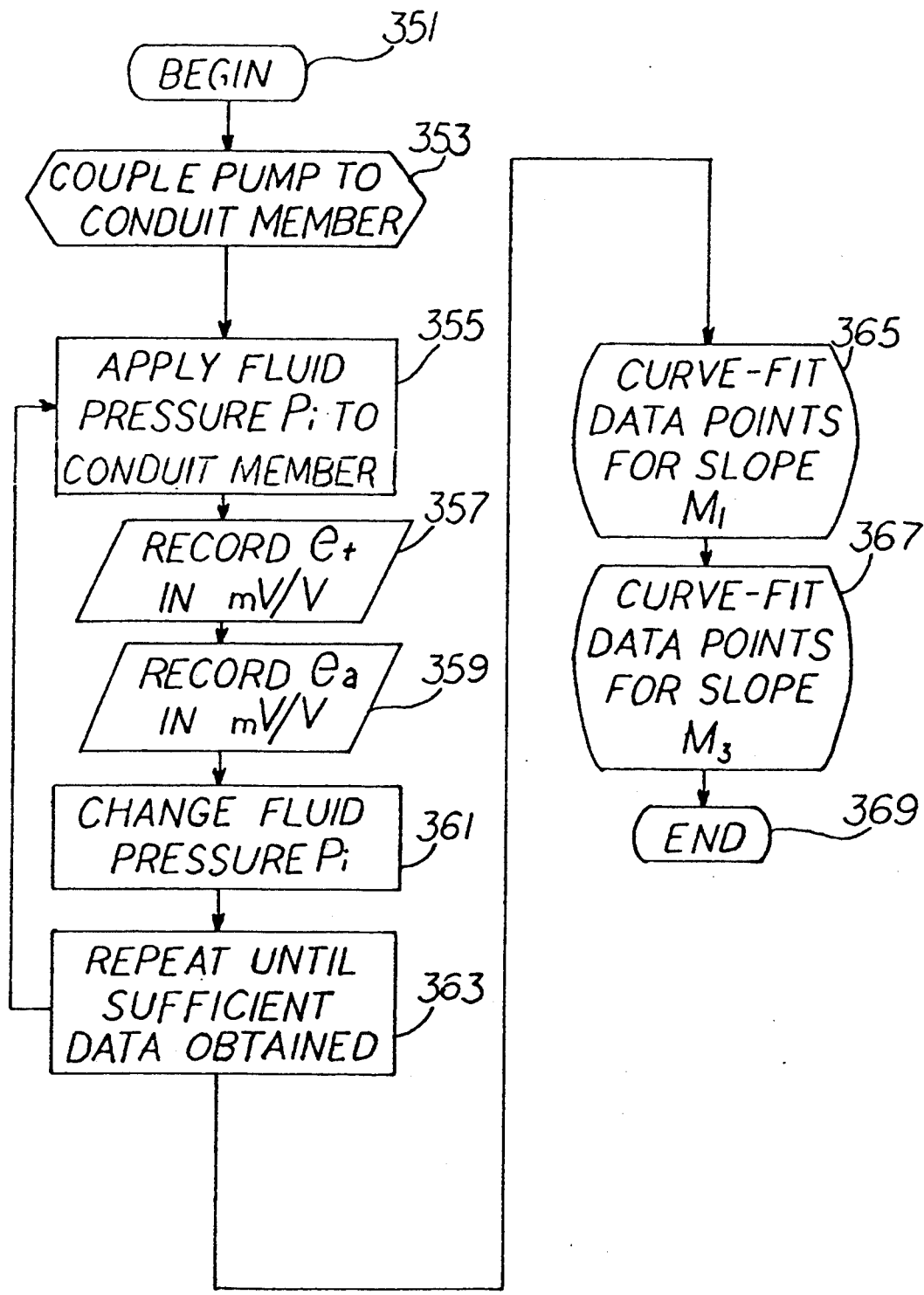
Figure 14:
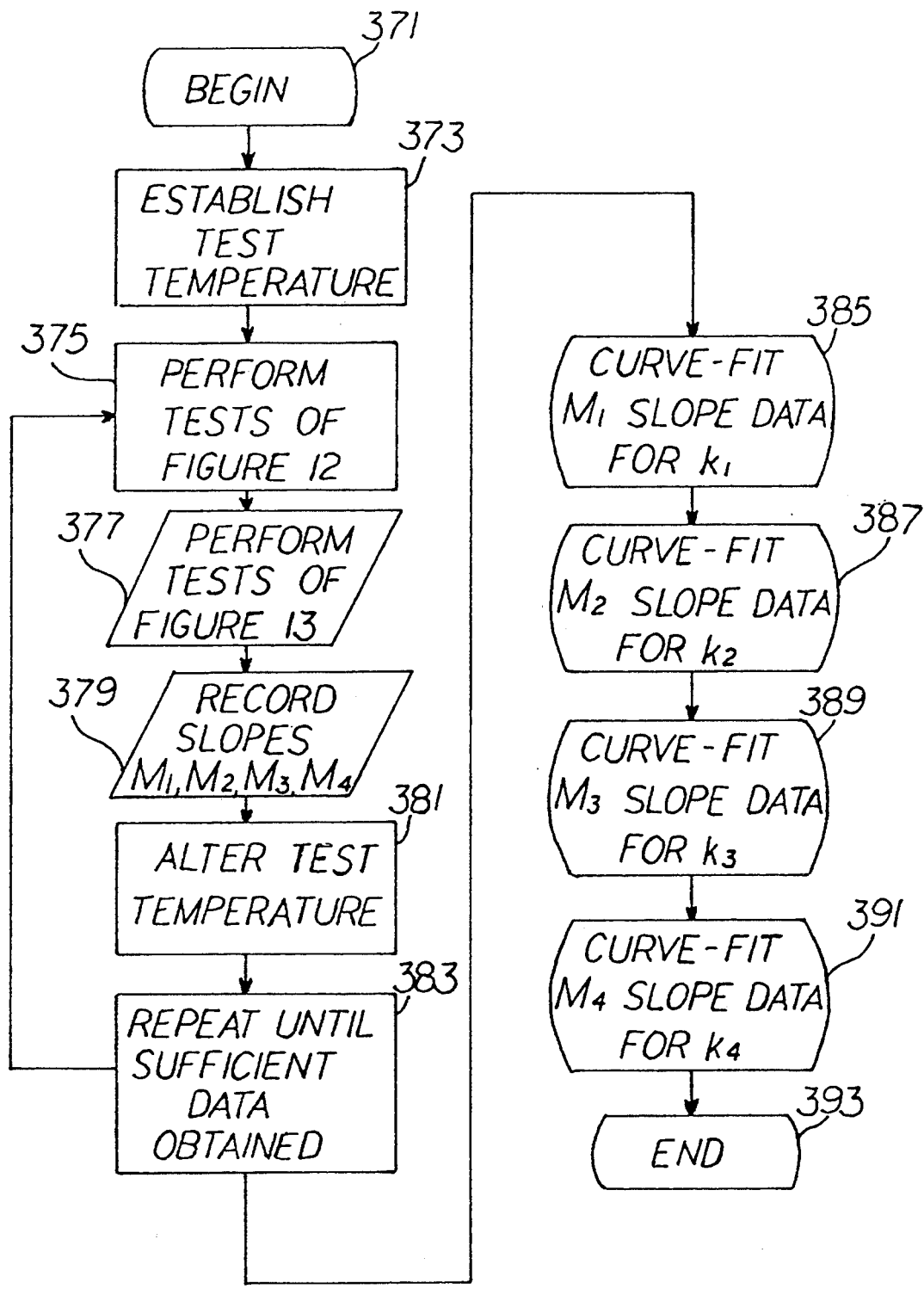

FIGS. 12, 13, and 14, depict, in flowchart form, the preferred calibration operations of the present invention. The flowchart of FIG. 12 corresponds to the graphs of FIGS. 10a and 10c. The flowchart of FIG. 13 corresponds to the graphs of FIGS. 10b and 10d. The flowchart of FIG. 14 corresponds to the graphs of FIGS. 11a and 11b.

With reference first to FIG. 12, the process begins at step 331. Conduit member 209 is placed in a press device, which is capable of exerting both tension and compression axial force F on conduit member 209. This step is represented by flowchart block 333. In step 335, a predetermined amount of force, either compression or tension, is applied to conduit member 209. In steps 337, and 339, the outputs of the tangential and axial strain sensors $V_T$, $V_A$ are recorded in "normalized" form in units of millivolts per volt. In step 341, the axial force level is changed to another, different predetermined force level. As set forth in flowchart block 343, the process is repeated until sufficient data is obtained. In the preferred embodiment, at least nine different readings of tangential and axial strains $V_T$, $V_A$ are recorded. It is possible that in alternative embodiments fewer or greater readings may be taken.

In step 345, the tangential strain datapoints are mathematically analyzed utilizing a conventional least-squares polynomial curve fitting technique to determine the best linear equation ($Y = mX + b$) which corresponds to the datapoints. The least-squares curve fitting technique will determine the slope of the line, which is $M_4$.

In step 347, the process is repeated for axial strain datapoints. A least-squares polynomial curve-fitting technique is applied to the datapoints which are the "normalized" output voltage readings $V_A$ of the axial strain sensor. Solving for the "best" linear function will yield slope $M_2$. This first stage of the calibration technique ends at step 349.

The preferred calibration technique of the present invention continues in the flowchart of FIG. 13, which corresponds to the graphs of FIGS. 10b, and 10d. The process begins at step 351. In step 353, a pump is coupled to conduit member 209. The opposite end of conduit 209 is bull-plugged, so that conduit member 209 becomes a pressure vessel. In step 355, a predetermined amount of fluid pressure $P_i$ is applied to conduit member 209. In steps 357, 359 the "normalized" output voltages $V_T$, $V_A$ of the tangential and axial strain sensors are recorded. In step 361, the amplitude of fluid pressure $P_i$ is altered to another, different predetermined pressure level. This process is repeated, according to step 363, until a sufficient number of datapoints are obtained.

In step 365, a least-squares polynomial curve fitting technique, of conventional nature, is applied to the datapoints of the "normalized" output voltage of the axial strain sensors $V_A$. The least-squares technique will yield slope $M_1$.

In step 367, this process is repeated for the "normalized" output voltage datapoints of the tangential strain sensor $V_T$. The least-squares polynomial curve-fitting technique is applied to the datapoints to define the "best" line (Y=mX+b) which represents the accumulated datapoints of the normalized output voltage of the tangential strain sensor. The process ends at step 369.

The preferred calibration technique of the present invention continues in FIG. 14, which is a flowchart representation of the technique employed to compensate slopes $M_1$, $M_2$, $M_3$, and $M_4$ for the effects of temperature variation, and corresponds to the graphs of FIGS. 11a, and 11b. The process begins at step 371. A temperature-controlled testing chamber is provided, for which a predetermined temperature level is established, according to step 373. In step 375, the calibration steps of the flowchart of FIG. 12 are performed at the selected test temperature. In step 377, the calibration steps which are represented in flowchart form in FIG. 13 are performed at the predetermined test temperature. The slope values $M_1$, $M_2$, $M_3$, and $M_4$ are recorded for future use. In step 381, the test temperature is altered to another, different predetermined test temperature. In step 383, the process of steps 375 through 381 is repeated until sufficient data is obtained. In the preferred embodiment, the calibration steps represented in flowchart form in FIGS. 12 and 13 are repeated over four or five predetermined temperature levels. However, in alternative embodiments, it may be desirable to obtain more datapoints by testing at other temperatures.

In step 385, the slope values $M_1$ determined above empirically are plotted with respect to time, as shown in FIG. 11b. A least-squares polynomial curve fit is applied to the $M_1$ slope data to determine $k_1$, which is the temperature adjustment constant for the electronics of processor 203 over a range of operating temperatures.

In step 387, the $M_2$ datapoints are subjected to a least-squares curve fitting to determine the constant $k_2$, to allow compensation for the effects of temperature variation on the performance of the electronics within processor 203.

In step 389, the $M_3$ slope datapoints which were derived empirically in the preceding steps, are subjected to a least-squares curve fitting technique, which determines the constant $k_3$ which allows for compensation of temperatures effects on processor 203 over a range of operating temperatures.

In step 391, the $M_4$ datapoints obtained empirically above, are subjected to a least-squares curve fit to determine the constant $k_4$, which allows for temperature compensation for the effects of temperature on the electronics in processor 203 over a range of operating temperatures. The temperature calibration process ends at step 393.

In the preferred embodiment of the present invention, the slope values $M_1$, $M_2$, $M_3$, and $M_4$ which are obtained empirically at ambient temperature (70 degrees Fahrenheit), and the temperature compensation constants $k_1$, $k_2$, $k_3$, $k_4$ are stored in memory 255 of processor 203 (of FIG. 6) for use by the computer program maintained in computer memory 255 during operation of communication device 201. Preferably, the calibration steps are performed as part of the manufacturing process for the wellbore communication device 201 of the present invention, and are not done in the field.

Since ambient temperatures vary widely in oil producing regions, from sub-Saharan heat to arctic cold, it is advisable to obtain the output voltages for the tangential and axial strain sensors at the well site with no internal fluid pressure $P_i$ or axial force F applied to the conduit member. The voltage readings obtained correspond to the y-intercept of the functions of FIGS. 10a and 10b, at ambient temperature, with no internal fluid pressure $P_i$ applied to conduit member 209, and with no axial force F applied to conduit member 209. These readings are obtained in a "zeroing" mode of operation discussed below in connection with FIGS. 17a, 17b, 17c, 17d and 17e.

In the preferred embodiment, with reference as FIG. 5, wellbore communication device 201 is adapted for communicating messages within wellbore 219 by using fluid pump 211 to provide a predetermined fluid pressure pattern which is representative of a coded message. The predetermined fluid pressure pattern is detected by sensor means 247, and recognized by processor means 203. In the preferred embodiment, processor means 203 is coupled to a wellbore tool which is operable between a plurality of modes of operation. In its simplest form, wellbore tool may comprise a packer which is operable between a radially-reduced running mode of operation and a radially-expanded setting mode of operation. Alternatively, the wellbore tool may comprise a perforating gun which is operable between a loaded running condition of operation, and a firing condition of operation.

In the present invention, in a monitoring mode of operation, which will be described in greater detail below with reference to FIGS. 5, 18, 19a and 19b, sensor means 247 continually monitors the temperature within atmospheric chamber 168, as well as the tangential and axial strains on conduit member 209. This data is provided to processor 203 which calculates the internal pressure $P_i$ of the pressurized wellbore fluid within conduit 209 as a function of constants (including $M_1$, $M_2$, $M_3$, $M_4$, $k_1$, $k_2$, $k_3$, $k_4$, and the y-intercepts obtained at well site ambient temperature during a "zeroing" function) and the voltage outputs of axial half-bridge 305, and tangential half-bridge 307 (which are voltages levels $V_a$, $V_t$, which are normalized for fluctuation in the power supply voltage Vref).

At the surface of the wellbore, a human operator manipulates the output of fluid pump 211 to provide a predetermined fluid pressure pattern to conduit member 209, which is detected by sensor means 247, and recognized by processor 203. Of course, processor 203 is programmable to recognize any of a plurality of predetermined fluid pressure patterns.

FIG. 15 depicts one selected fluid pressure pattern which is used in the present invention, relative to a graph, with the X-axis representative of the time, and the Y-axis representative of internal fluid pressure $P_i$ in pounds per square inch of pressure.

With reference to FIGS. 5, 6 and 15, the predetermined fluid pressure pattern is defined with respect to three pressure amplitude levels (hydrostatic pressure, threshold X, and threshold Q) and three time periods (time period Y, time period Z, and time period R). The hydrostatic pressure level is the "ambient" fluid pressure exerted against conduit member 209 due to the weight of the column of fluid within conduit member 209 and the wellbore tubular conduit string 223. Together, conduit member 209 and wellbore tubular conduit string 223 may constitute several thousand feet of wellbore tubing, thus providing a substantial column of fluid which establishes the "base line" pressure of the hydrostatic pressure level.

Pressure thresholds X and Q are operator selectable, and may be programmed into processor 203 using programming unit 207. These pressure levels are obtained within conduit member 209 by operation of fluid pump 211. Typically, threshold X may be in the range of 2,000 thousand pounds per square inch of internal fluid pressure $P_i$ within conduit member 209. Typically, pressure threshold Q may be in the range of 8,000 pounds per square inch of internal fluid pressure $P_i$ in conduit member 209. The operator can obtain these pressures by operation of pressure amplitude control 217 and simultaneous monitoring of pressure gauge 213 (both of FIG. 5).

Preferably, time periods Y, Z, and R are sufficiently long in duration to avoid the effects of unintentional ambient fluid pressure fluctuation within conduit member 209, which are typically of a short duration. For example, pressure surges may occur due to manipulation of wellbore tubular conduit string 223, or from connection and disconnection of fluid pump 211 to wellbore tubular conduit string 223. Generally, these brief surges in pressure last less than one minute. In the present invention, time period Z is typically set to be in the range of one hour, while time period Y is set to be in the range of two to twenty minutes. Time period R may also be set by the user to be in the range of ten to twenty minutes. Therefore, the wellbore communication device 201 of the present invention is insensitive to ambient fluid pressure level fluctuations within the wellbore tubular conduit 209 and wellbore tubular conduit string 223, thus preventing the false "detection" of coded messages.

Figure 16A:
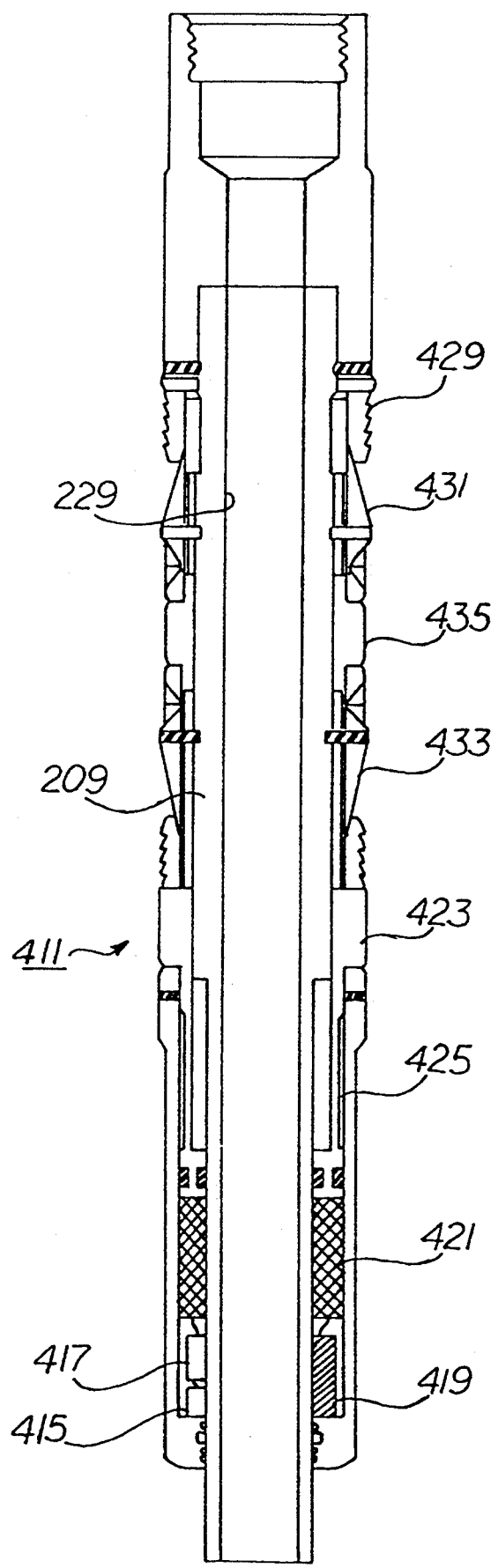
FIGS. 16a, 16b, 16c, 16d, 16e, 16f, 16g, 16h, and 16i depict the use of the preferred wellbore communication device of the present invention to actuate multiple wellbore tools.

Turning now to FIGS. 16a through 16f, 16g, 16h, 16i, the use of the present invention to remotely and selectively activate wellbore tools will be described. Wellbore tools 411 and 413 are shown in FIGS. 16a through 16f, 16g, 16h, 16i, both of them have the features which are shown in FIG. 16a, which depicts wellbore tool 411. Wellbore tool 411 includes conduit member 209 which has an imperforate wall which at least in-part defines fluid flow path 229 which receives pressurized wellbore fluid from fluid pump 211 (of FIG. 5) at the earth's surface. Sensor means 415 are provided on the exterior surface of conduit member 209. Microprocessor 419 is also provided on the exterior of wellbore conduit 209. Battery 417 is provided for powering microprocessor 419. Microprocessor 419 is in communication with power charge 421. When power charge 421 is actuated by microprocessor 419, gases are discharged during an explosion, which fill cylinder 425, and urge setting piston 423 upward. The mechanical force provided by setting piston 423 drives anchoring members 427, 429 over tapered rings 433, 431, respectively. Force is also applied to elastomeric element 435. Anchoring members 427, 429, and elastomeric element 435 are urged into gripping and sealing engagement with a wellbore surface.

As discussed above, sensor 415 detects stain on conduit member 209 due to forces, including the force of pressurized fluid which acts on the imperforate wall of conduit member 209. Sensor 415 provides at least one signal to microprocessor 419, which is used to derive the amplitude of the internal fluid pressure level $P_i$ within conduit member 209. Microprocessor 419 is programmed to provide a firing signal to power charge 421 upon detection of a predetermined fluid pressure pattern. Preferably, microprocessor 419 is programmed at the earth's surface before being loaded into the wellbore. If microprocessor 419 does not detect the predetermined fluid pressure pattern, power charge 421 is not energized, and the packer is not set. However, once the predetermined fluid pressure pattern is detected, microprocessor 419 provides a firing signal to power charge 421, which drives setting piston to set the packer elements 427, 429, and 435.

Figure 16B:
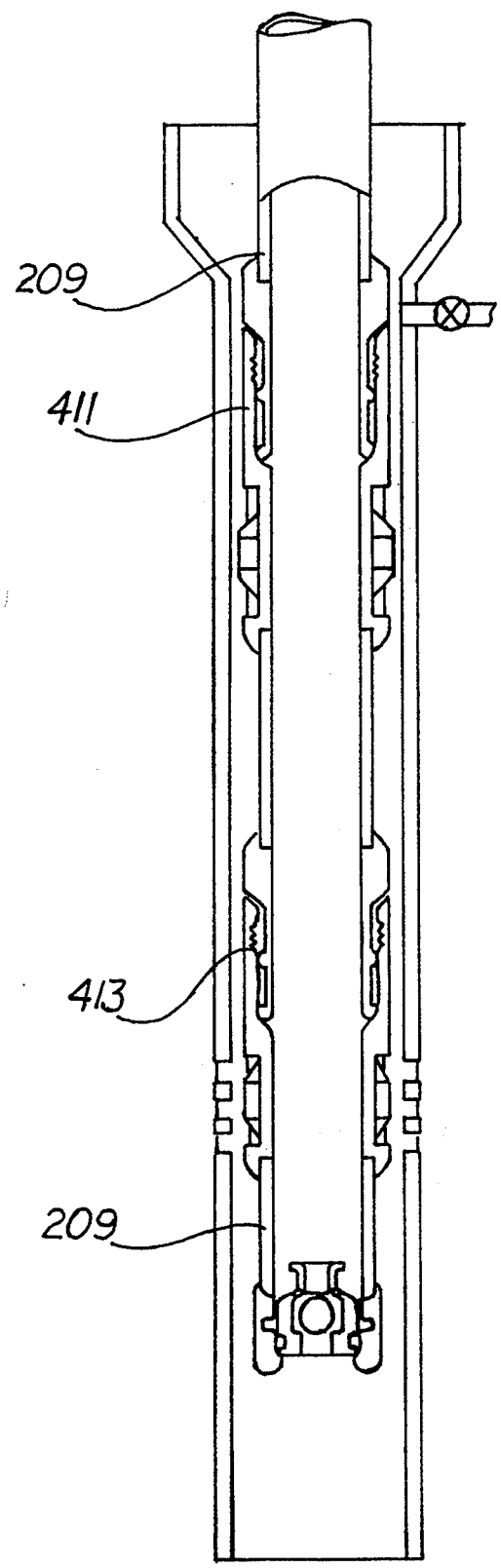
Figure 16F:
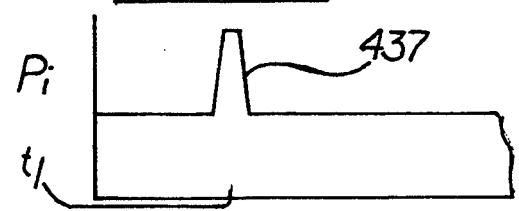
Figures 16C, 16G:
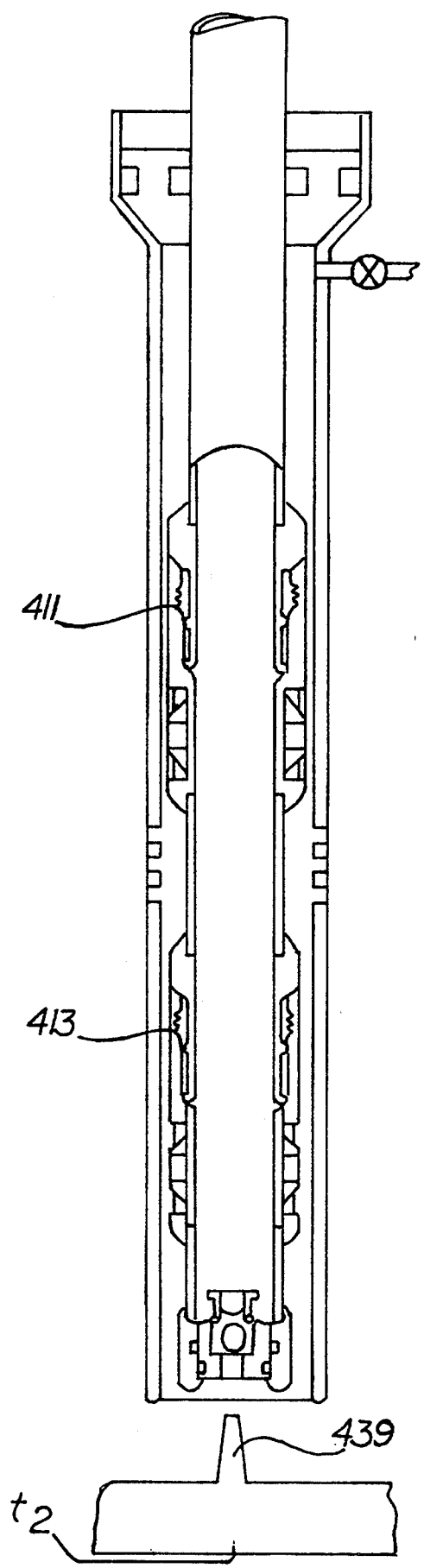

As shown in FIG. 16b, a plurality of conduit members 209 may be provided, each carrying a wellbore tool, such as a packer. FIG. 16b depicts wellbore tools 411 and 413 coupled together. However, it is possible to separate wellbore tools 411 and 413 by substantial lengths of wellbore tubular conduit, and these wellbore tools 411, 413 may be separated in distance by thousands of feet.

Figure 16D:
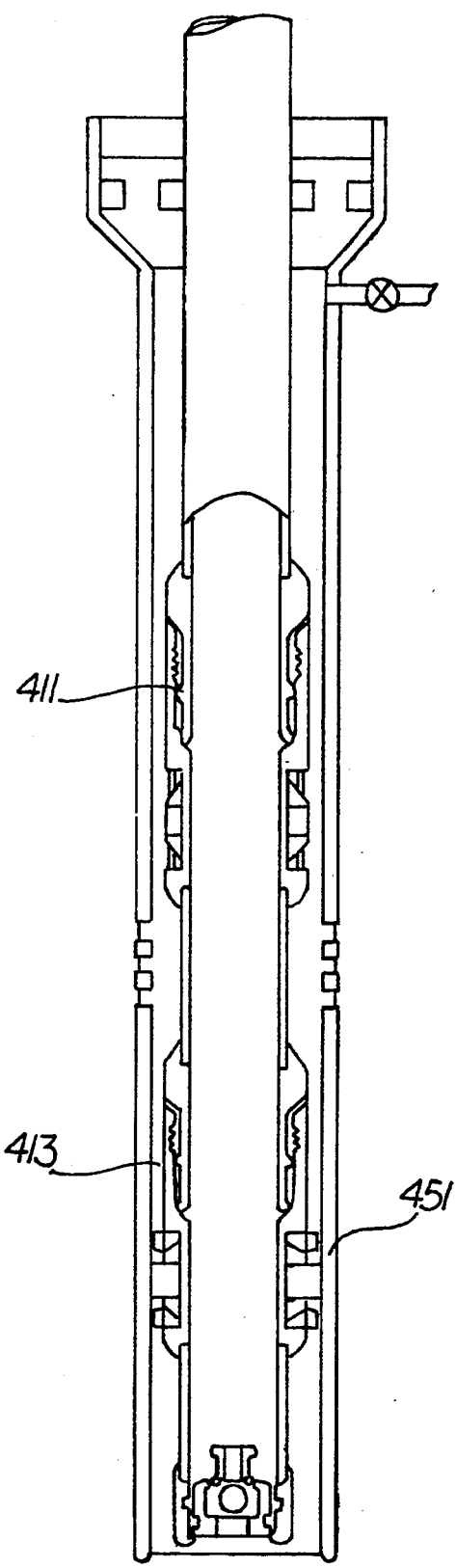
Figure 16H:
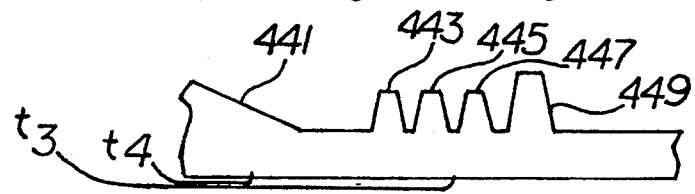
Figure 16E:
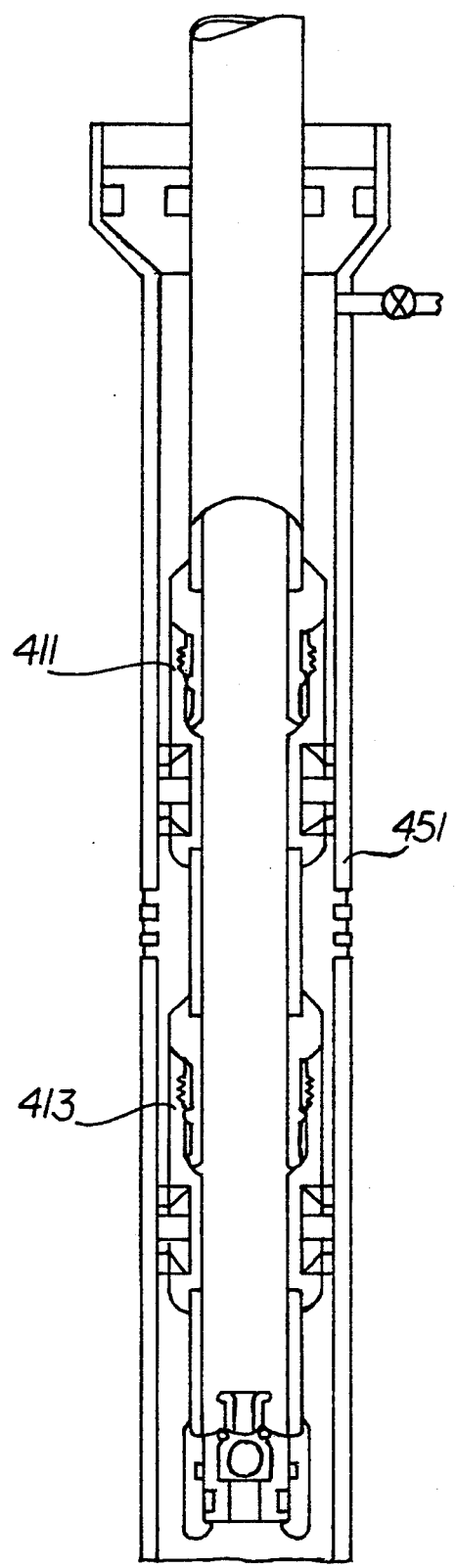
Figure 16I:
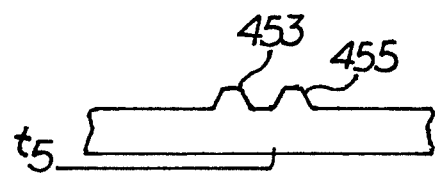

FIGS. 16f, 16g, 16h, 16i provides a graph of internal fluid pressure $P_i$ with respect to time. FIGS. 16b, 16c, 16d, and 16e are aligned with the graph of FIGS. 16f, 16g, 16h, 16i to visually depict the response of wellbore tools 411, 413 to changes in internal fluid pressure $P_i$ over time. FIG. 16b corresponds generally to the time period of $t_1$ shown in FIGS. 16f, 16g, 16h, 16i. FIG. 16c corresponds generally with time period $t_2$ shown in FIGS. 16f, 16g, 16h, 16i. FIG. 16d corresponds generally with time period $t_4$ shown in FIGS. 16f, 16g, 16h, 16i. FIG. 16e corresponds generally to time period $t_5$ shown in FIGS. 16f, 16g, 16h, 16i.

As shown, at time period $t_1$ shown in FIGS. 16f, 16g, 16h, 16i, the tubing and packers are tested for operating integrity by applying pressure surge 437 thereto. Since neither wellbore tool 411, nor wellbore tool 413, are programmed to respond to a single pressure surge, microprocessors 413 therein do not actuate power charges 421. At time period $t_2$ shown in FIGS. 16f, 16g, 16h, 16i, the liner hanger is tested, and the tubing and packers are retested by application of pressure surge 439. Wellbore tools 411, 413 are not actuated by the single pressure surge. During time period $t_3$ shown in FIGS. 16f, 16g, 16h, 16i, the tubing and casing are displaced from one another, causing a loss of pressure 441.

During time period t₄ shown in FIGS. 16f, 16g, 16h, 16i, three pressure surges 443, 445, and 447 of predetermined amplitude and duration are provided within a predetermined time period. Thereafter, another pressure surge 449 is provided within a second time period, and obtains a different pressure amplitude. The microprocessor of wellbore tool 413 is programmed to recognize this pattern, and thus provides a actuating signal to power charge 421 which sets the lower packer against casing 451. Since microprocessor 419 of wellbore tool 411 has not been programmed to respond to the pressure surge pattern of pressure surges 443, 445, 447, and 449, it is not actuated, and does not pack-off against casing 451.

During time period t₅ shown in FIGS. 16f, 16g, 16h, 16i, pressure surges 453, and 455 are provided within a predetermined time period, with each having a predetermined pressure amplitude and duration. Since Microprocessor 419 of wellbore tool 411 is programmed to respond to the predetermined fluid pressure pattern of pressure surges 453, 455, wellbore tool 411 is actuated to set the packer against casing 451. Other wellbore tools provided upward or downward from wellbore tool 411 will not be actuated by the predetermined pressure pattern of pressure surges 453, 455, unless programmed to do so.

These characteristics described above are identified in the industry as "selectivity" features. The present invention allows one or more wellbore tools to be remotely controlled and switched between operating modes, without any inadvertent actuation of other wellbore tools within the wellbore. This is a very attractive feature which allows a single workstring or wellbore tubular production string to carry a number of wellbore tools which are intended for sequential operation. For example, wellbore tools can be provided to selectively pack-off certain segments of tubing, and perforate the adjoining casing. The present invention may be used with valves to selectively valve fluid between selected annular regions between the tubing string and the casing string.

In the preferred embodiment, the predetermined fluid pressure pattern includes two stages: an arming sequence, and a firing sequence. With reference again to FIGS. 5, 6 and 15, the arming sequence comprises the three pressure surges above the X pressure threshold, each having duration of at least Y time units, and each arising in the time interval of duration Z time units. These three pressure surges operate to switch processor means 203 between "unarmed" and "armed" positions. Once armed, a software timer having a duration of R time units is initiated. Internal pressure $P_i$ within conduit member 209 is monitored during the duration of R time units for a pressure surge in excess of the Q threshold. In the preferred embodiment, this final pressure surge is identified as a "firing" surge. If the "firing" surge is not received within the duration of the R time period, the system will disarm. If, however, the firing surge is received before the expiration of the R time period, then processor 203 will provide an actuating signal to the wellbore tool within R time units of the return of internal pressure $P_i$ below pressure threshold Q.

The identifying characteristics of any allowable predetermined pressure threshold may be programmed into processor 203 by use of programming unit 207 (of FIG. 6). As discused above, programming unit 207 includes alphanumeric keypad 277 and LCD display 279, both of which are used during a programming mode of operation to program processor 203 with the identifying characteristics of an allowable predetermined fluid pressure pattern.

In the preferred embodiment, a plurality of the alphanumeric keys of alphanumeric keypad 277 (of FIG. 6) are dedicated for particular uses, which are graphically represented in FIGS. 17a, 17b, 17c, 17d and 17e. In the preferred embodiment, alphabetic characters are dedicated for calling up a variety of differing modes of operation when programming unit 207 is coupled to processor 203. In the preferred embodiment, the operating modes include those set forth herebelow, each of which is entered by depressing a dedicated keypad character key, as also shown herebelow:

| KEYPAD CHARACTER | OPERATING MODE | KEYPAD LABEL |
| --- | --- | --- |
| a | board testing mode | BOARD TESTS |
| b | zeroing mode | ZERO |
| d | disable switch mode | DISABLE SWITCH |
| e | firing mode | FIRE |
| f | kill mode | KILL |
| g | read tangential strain Vt mode | TANG |
| h | read axial strain Va mode | AXIAL |
| i | read temperature mode | TEMPERATURE |
| j | read pressurized $P_i$ mode | PRESSURE |
| k | ROM check mode | ROM CHECK |
| l | playback mode | PLAYBACK |
| m | initialize system mode | INITIALIZE SYSTEM |
| n | read force F | FORCE |

As shown, particular keypad characters (such as a, b, d, and e) are dedicated for initiating differing modes of operation. For example, depressing keypad character "a" initiates the "board testing" mode of operation. For alternative example, depressing keypad character "f" initiates the "kill mode" of operation. To simplify use of programming unit 207, labels are provided on the keypad characters. For example, the label "BOARD TESTS" is placed over the keypad character for "a". For alternative example, the label "ROM CHECK" is placed over the keypad character for "k". In this manner, as set forth in the table above, particular alphabetic keypad characters are dedicated for initiating a plurality of operating modes when programming unit 207 is coupled to processor 203.

With reference now to FIGS. 6 and 17a, 17b, 17c, 17d, and 17e, the board test mode of operation is entered by depressing key 461 which is masked with the label "BOARD TESTS". An ASCII character corresponding to the letter "a" will be sent through serial port 265 to processor 203. Processor 203 will send an ASCII message back through serial port 265 which is displayed on LCD display 279. The message is set forth in block 487 of FIG. 17a. Basically, the message solicits the operator to depress "1" for testing of the current drawn by the system, or "2" for testing of the battery voltage. If "1" is depressed, processor 203 determines the total current drawn by the system, and provides a message back through serial port 265, which is displayed on LCD display 279 which states "system draws equals ###ma" as shown in block 489 in FIG. 17a. If the operator depresses "2" on the alphanumeric keypad 277, processor 203 will determine the total voltage provided by batteries 257, and send a message back through serial port 265 to LCD display 79. The message which is displayed at LCD display 279 is set forth in block 491 of FIG. 17a. The message states "battery voltage=####mv". Of course, "####" represents four numbers which are representative either the current drawn by the system, or the output of batteries 257.

The zeroing mode of operation is entered by depressing key 463 which corresponds to alphabetic character "b" of alphanumeric keypad 277. When this key is depressed, an ASCII character corresponding to alphabetic "b" is directed from programming unit 207 to processor 203. Upon receipt of this ASCII character, processor 203 performs mathematical calculations based upon the voltage reading from the strain gauge sensors to determine the y-intercept values of the curves, which are discussed above in connection with FIGS. 10a, 10b, 10c, and 10d. The computed values are directed from processor 203, through serial port 265, to LCD display 279 of programming unit 207. The message is set forth in block 495 of FIG. 17a. When the calculations are completed, the message in block 495 states "zero complete a=### t=###", thus displaying the axial data y-intercept and the tangential data y-intercept.

Figure 17A:
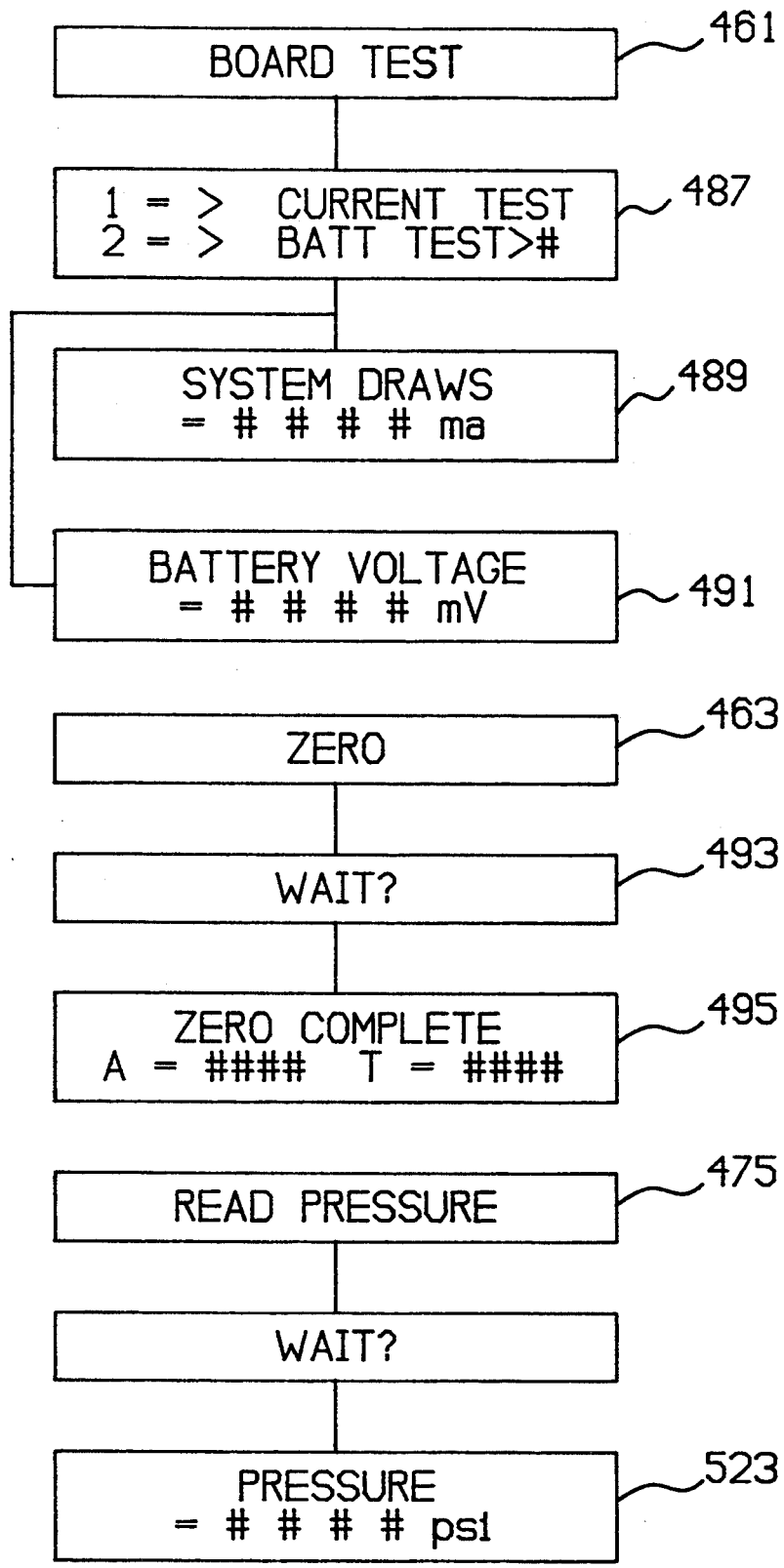
Figure 17B:
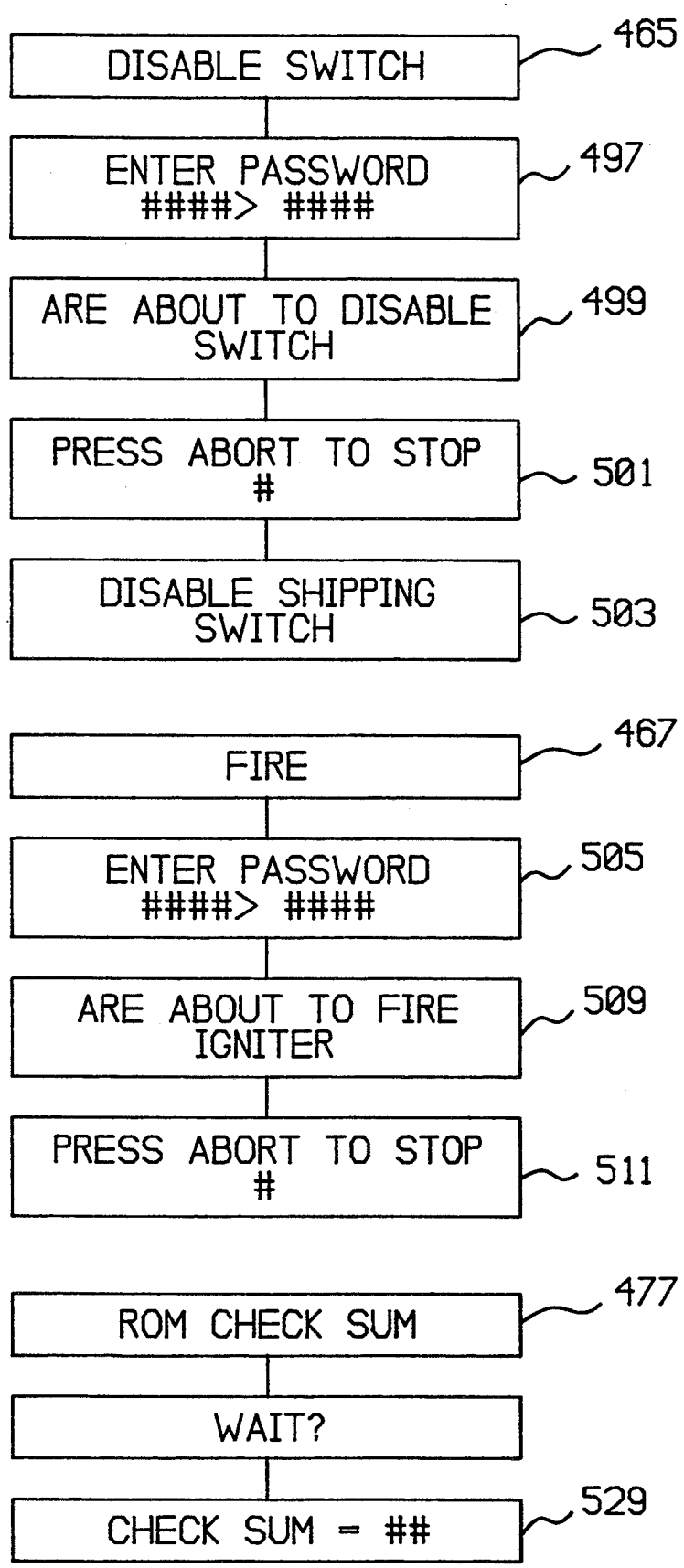

As is shown in FIG. 17b, the disable mode of operation is entered by depressing key 465, which corresponds to the alphabetic character "d" on alphanumeric keypad 277. When this key is depressed, an ASCII character corresponding to alphabetic "d" is passed through serial port 265 to processor 203. The disable mode of operation operates to cause processor 203 to apply current to fuses in serial port 265 which disconnect microprocessor 269 from serial port 265. This operation minimizes the chance that shorts will occur in serial port 265, which cause operating failure in microprocessor 269. Since processor 203 will be lowered into the wellbore, and exposed to high pressure fluids, the disable switch mode of operation is merely a precautionary measure to prevent failures due to electrical shorting.

When the "disable switch" key is depressed, processor 203 prompts the operator at LCD display 279 with the message of block 497 to enter a password. If the correct password is entered, processor 203 prompts the operator through LCD display 279 with a message of block 499 which states "you are about to disable switch". Processor 203 affords the operator an opportunity to abort the disable switch mode of operation, and transmits the message of block 501 which states "press abort to stop". Finally, if the operator does not exercise his or her opportunity to abort, processor 203 sends a final message, as shown in block 503, stating "disabling shipping switch". Thereafter, processor 203 blows fuses in serial port 265 to prevent any further communication with processor 203 through programming unit 207.

Figure 17C:
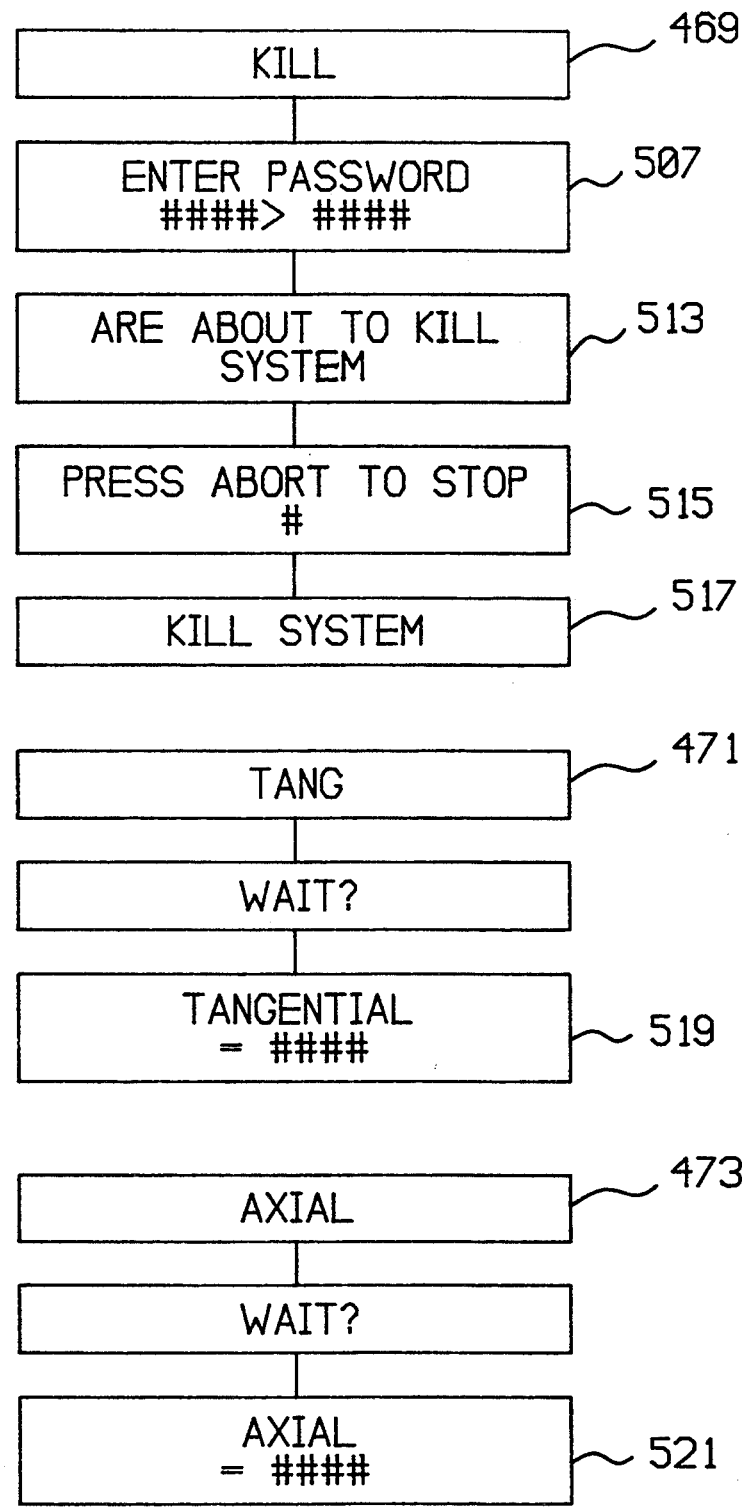
Figure 17E:
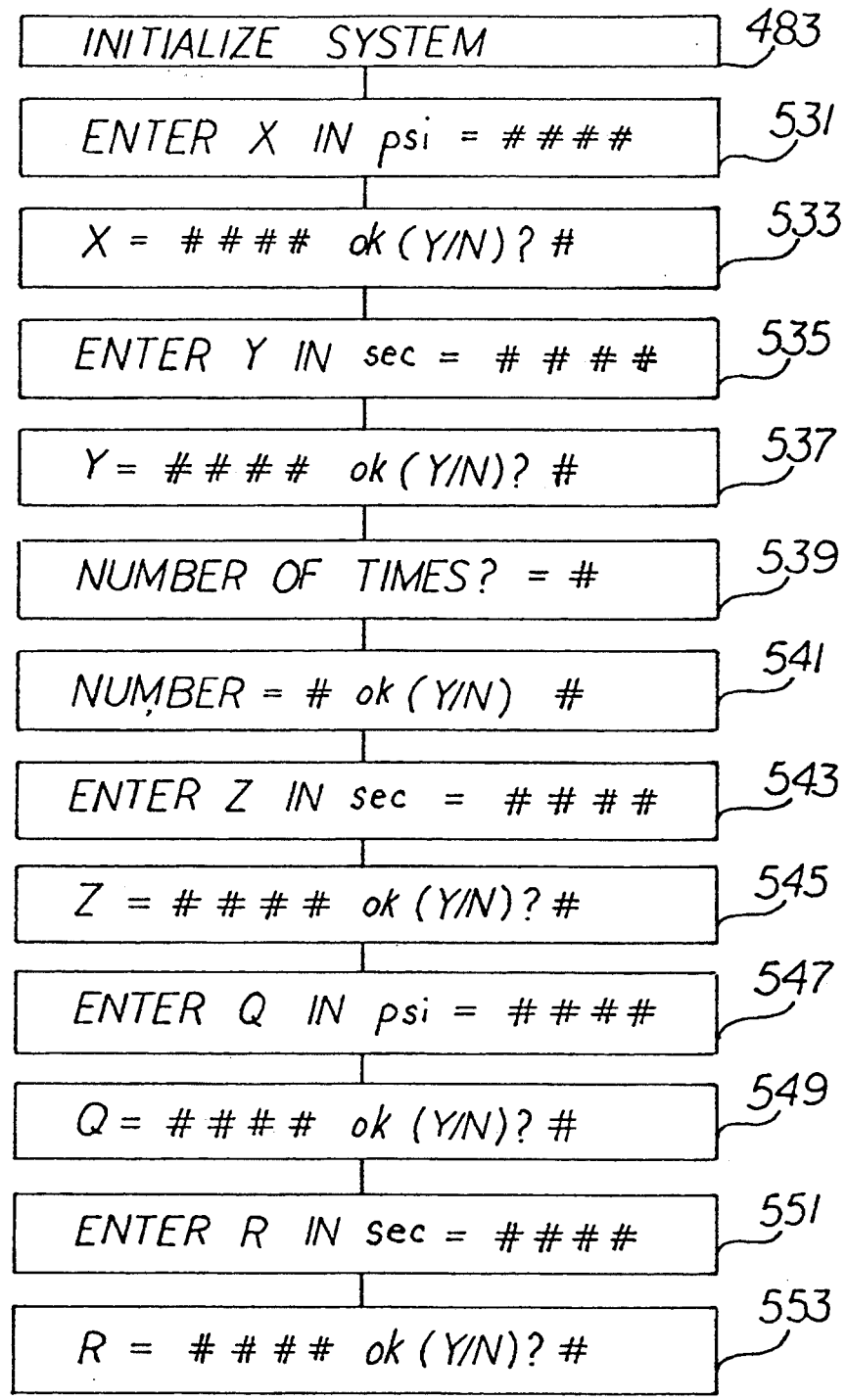

The fire and kill modes of operation are primarily used in laboratory testing of the present invention. As shown in FIGS. 17b and 17c, the fire mode of entry is entered by depressing key 467. The kill mode of operation is entered by depressing key 469, which is labeled "kill". The "fire" mode of operation allows the operator to provide an actuation signal to switch the wellbore tool between modes of operation, without requiring the provision of the preselected fluid pressure pattern. The "kill" mode of operation disconnects the electronics of processor 203 (of FIG. 6) from batteries 257 (of FIG. 6), and thus prevents any use of the present invention in the wellbore. Entry into these modes are controlled by passwords, as shown in blocks 505, 507. Warnings are given, as set forth in blocks 509, 513. An opportunity is provided in each mode of operation to abort, as set forth in blocks 511, 515, and 517.

In the preferred embodiment of the present invention, a plurality of operating modes are provided which are useful both in the laboratory, in quality control, and at the well site prior to lowering wellbore communication device 201 downward into wellbore 219. These operating modes include: the read tangential strain $V_t$ mode, the read axial strain $V_a$ mode, the read temperature T mode, the read pressure $P_i$ mode, and the read force F mode. The functions are depicted in FIGS. 17c and 17d, and are discussed with reference to those figures and FIG. 6. Depressing key 471, which is labeled "TANG" causes processor 203 to display the voltage amplitude sensed by the tangential strain sensors on LCD display 279, as shown in block 519. Depressing key 473, which is labeled "AXIAL" causes processor 203 to display the voltage amplitude of the axial strain sensors, as shown in block 251, on LCD display 279. Depressing key 475, which is labeled "READ PRESSURE", causes processor 203 to display the amplitude of internal fluid $P_i$ in pounds per square inch, as shown in block 523, on LCD display 279. Depressing key 479, which is labeled "TEMP", causes processor 203 to display the temperature sensed by temperature sensor 251, as shown in block 525, via LCD display 279. Depressing key 485, which is labeled "READ FORCE", causes processor 203 to display the axial force, as shown in block 525, via LCD display 279. A ROM check mode of operation also provided for checking the memory of microprocessor 269, and is entered by depressing key 477, which is labeled "ROM CHECK SUM". Processor 203 then displays the number of bits of ROM memory used, as shown in block 529, via LCD display 279.

The "initialize system" mode of operation allows the operator to program processor 203 with the identifying characteristics of the predetermined fluid pressure pattern which distinguish a particular fluid pressure pattern from others. The preferred initialize system mode of operation is best understood by simultaneous reference to FIGS. 15 and 17. Hereinafter, FIGS. 17a, 17b, 17c, 17d, and 17e will be collectively identified as FIG. 17 to facilitate description. The initialize system mode of operation is entered by depressing key 483 of alphanumeric keypad 277. Programming unit 207 will generate an ASCII character corresponding to the alphabetic character "m", and transmit this ASCII character string serially to processor 203 through serial port 265.

Upon receipt of the ASCII character string representative of the alphabetic character "m", processor 203 enters a subroutine which prompts the operator to enter values for pressure thresholds Q and X; the length of time periods Y, Z and R; and the number of pressure surges of Y duration which must be received to switch wellbore communication device 201 of the present invention between "unarmed" and "armed" modes of operation. The initialize system mode of operation set forth in FIG. 17 is specific to the predetermined fluid pressure pattern of FIG. 15. However, in alternative embodiments, differing identifying characteristics may be used to identify other predetermined fluid pressure patterns which differ significantly from the specific embodiment shown in FIG. 15. Therefore, the initialize system mode of operation set forth in FIGS. 17a, 17b, 17c, 17d, and 17e could differ significantly in those other embodiments.

As set forth in FIGS. 17a, 17b, 17c, 17d, and 17e, upon entry of the initialize system mode of operation, processor 203 prompts the operator, by displaying the message of block 531, to enter a user-selected value for pressure threshold X, in pounds per square inch of pressure. More specifically, processor 203 generates a string of ASCII characters which are serially transmitted through serial port 265 to programming unit 207. Program unit 207 receives the serial ASCII characters representative of the message of block 531, and displays the message at LCD display 279. Next, the operator keys in the appropriate numeric value for pressure threshold X by depressing selected keys of alphanumeric keypad 277. Then the operator depresses a send key.

Processor 203 responds to the receipt of ASCII characters representative of the numeric value for pressure level X by prompting the user to verify the accuracy of the numeric value, as set forth in block 553. The operator responds to the prompt of block 553 by depressing dedicated "YES" or "NO" keys on alphanumeric keypad 277.

Once the operator confirms that the numeric value of pressure threshold X is correct, processor 203 prompts the operator to enter the numeric value for the duration of time period Y, in selected time units. As shown in block 355, the message provided to the operator at LCD display 279 requires the operator to enter the duration of time period Y in seconds. In alternative embodiments, time period Y could be entered in time units of minutes. As with all of these communications, the operator depresses a "send" key to direct the numeric value from program unit 207 to processor 203. Upon receipt of the ASCII character string representative of the numeric value selected by the operator, processor 203 prompts the user, according to block 357, to confirm the accuracy of the numeric value. The operator should respond by depressing either the "YES" key or the "NO" key.

In the preferred embodiment, the initialized system mode of operation continues in block 359, wherein processor 203 displays another prompt to the operator at LCD display 279 of programming unit 207. This prompt requires the operator to select the number of times a pressure surge of Y time units duration is to be detected before switching the system between "unarmed" and "armed" modes of operation. As shown in block 541, upon selection and transmission of the number, processor 203 responds by prompting the operator to confirm the accuracy of the selection by depressing either the "YES" or "NO" keys.

The initialized system mode of operation continues at block 543, wherein processor 203 prompts the operator to select the duration of time period Z in selected time units. The operator enters his or her selection by depressing numeric keys on alphanumeric keypad 277, and then depressing the "SEND" key. Once again, processor 203 prompts the operator by providing a message at LCD display 279, as set forth in block 545, which prompts the operator to confirm the selected value of the duration of time period Z.

As set forth in block 547, processor 203 further prompts the operator to select a numeric value for pressure threshold Q, in pounds per square inch of pressure. Again, the operator enters the selected value by depressing selected numeric keys of alphanumeric keypad 277. The "SEND" key is depressed to transmit an ASCII character string from programming unit 207 to processor 203 through serial port 269. Processor 203 receives the ASCII character string, and prompts the user, according to block 549, to confirm the accuracy of the selected amplitude value for pressure threshold Q. The operator may confirm the selected value by depressing the "YES" key.

The initialized system mode of operation continues at block 551, wherein processor 203 further prompts the operator to select a duration for time period R, in selected time units. The operator responds to the prompt of block 551 by depressing selected numeric keys of alphanumeric keypad 277 of programming unit 207. The operator then depresses the "SEND" key to direct ASCII characters from programming unit 207 to processor 203 through serial port 265. Once again, processor 203 receives the ASCII characters, and prompts the operator to confirm the accuracy of the selected values. The operator can confirm the accuracy by depressing the "YES" key.

According to this system, an operator may selectively program a plurality of wellbore communication devices 201 of the present invention by providing each with a differing predetermined fluid pressure pattern which is detected by the processor of each wellbore communication device 201. In the preferred embodiment of the present invention, an operator may identify particular predetermined fluid pressure patterns by programming the wellbore communication device 201 in the initialized system mode of operation. The operator may provide differing values for pressure thresholds X and Q. In addition, the operator may provide differing values for time periods Y and Z. Finally, the operator may provide differing values for the number N of surges of time duration Y. Using these operator-selected identifying characteristics, hundreds of predetermined fluid pressure patterns may be generated. Therefore, the present invention may be used to selectively operate a great number of wellbore tools, which are disposed at selected locations along a conduit string suspended within a wellbore.

Figure 18:
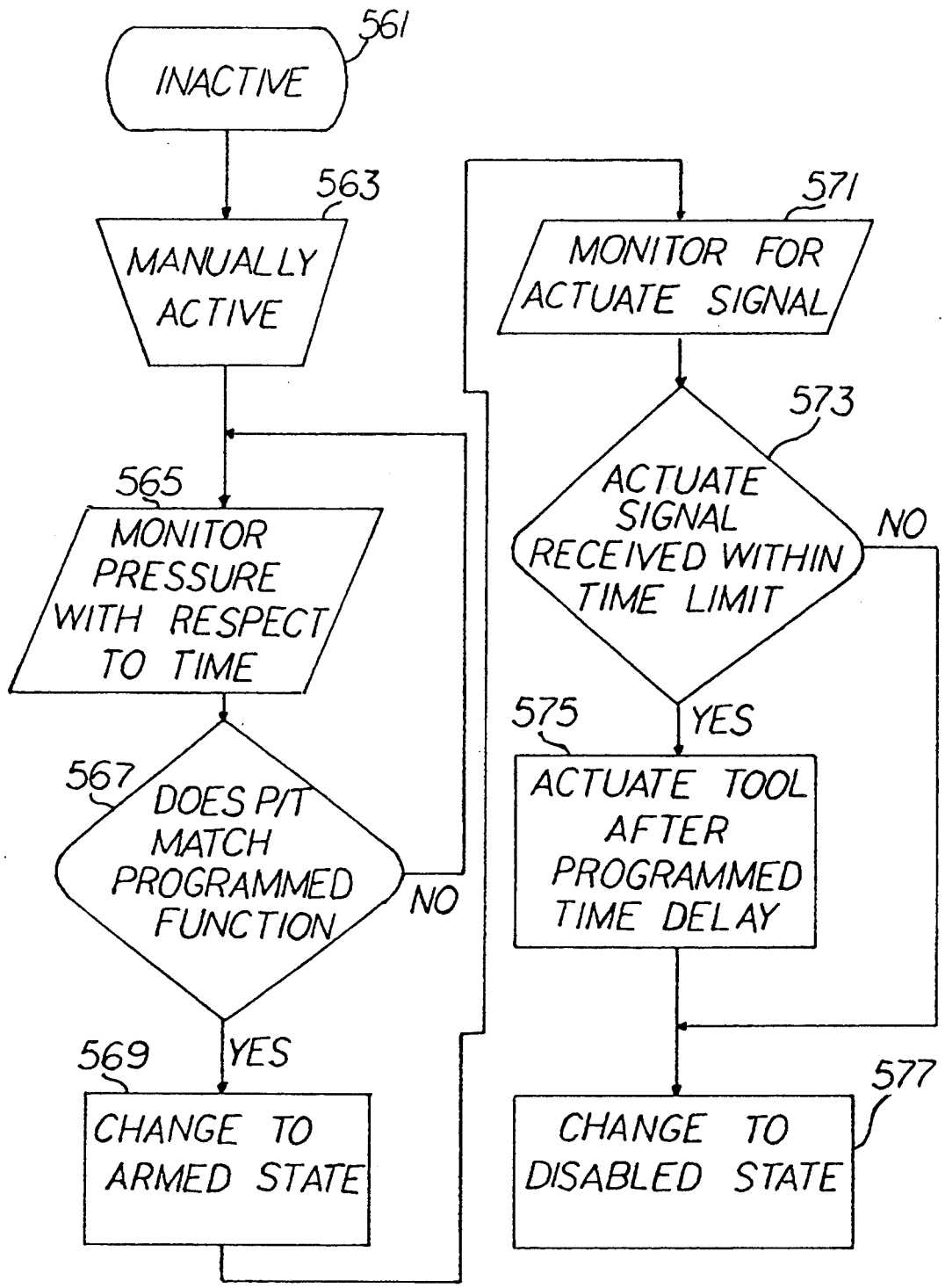
FIG. 18 is a flowchart representation of the monitoring activities of the preferred wellbore communication device of the present invention.
Figure 19A:
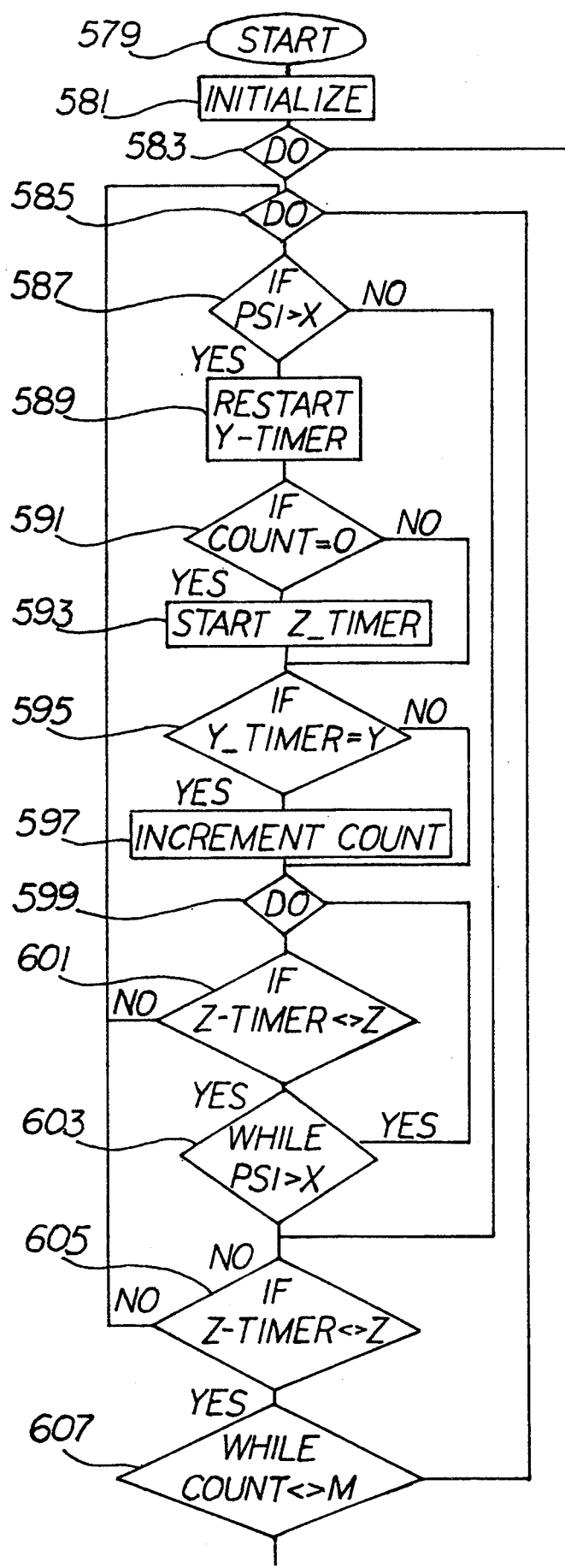
FIGS. 19a and 19b are flowchart representative in more detail than that of FIG. 14, of the preferred monitoring activity of the preferred wellbore communication device of the present invention.
Figure 19B:
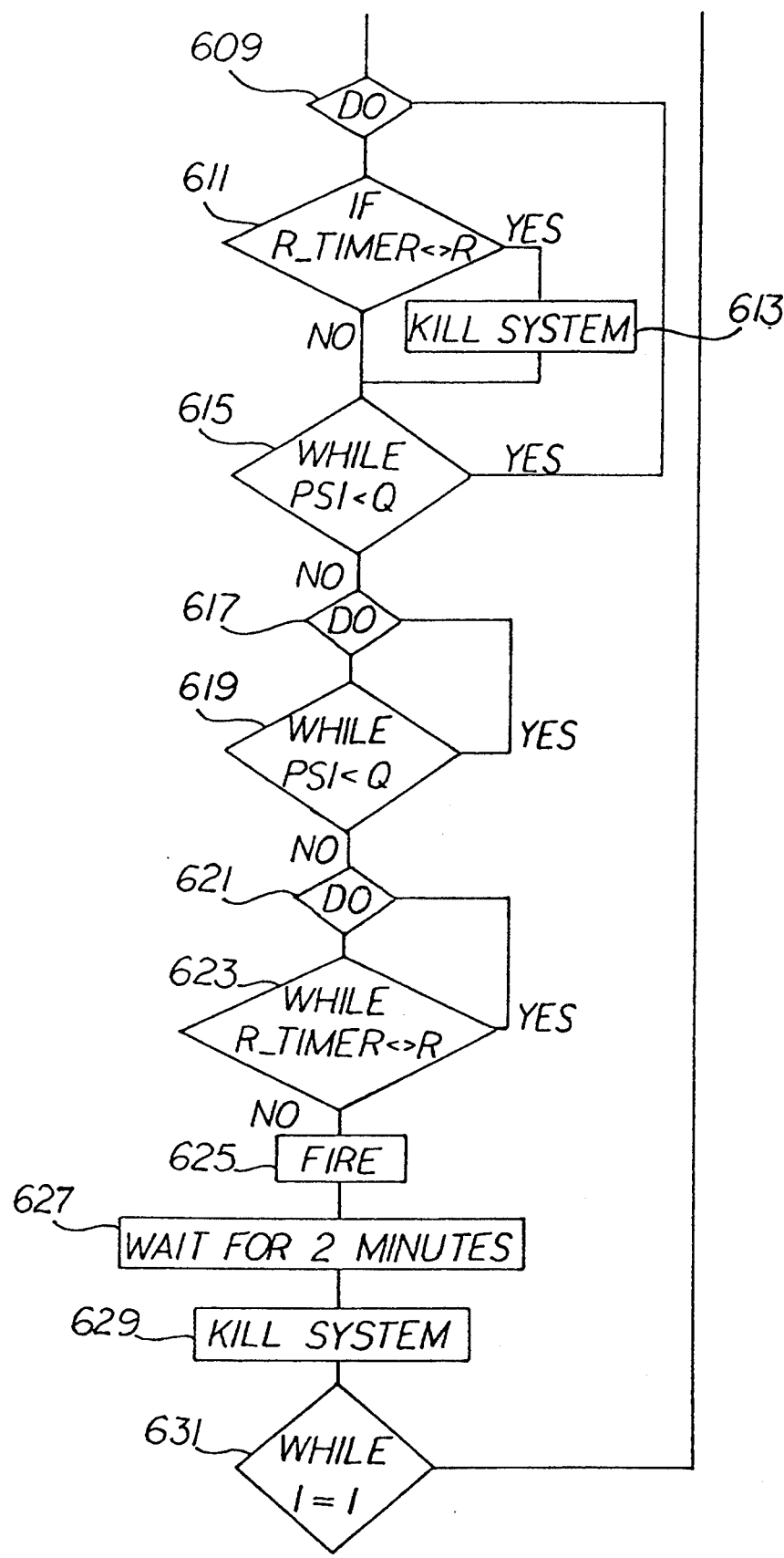

Once programmed, wellbore communication device 211 of the present invention is operable in a monitoring mode of operation. FIGS. 18 and 19 (composed of FIGS. 19a and 19b, which are hereinafter collectively referred to as FIG. 19) are flowchart representations of the monitoring mode of operation of the preferred embodiment of the present invention. The preferred monitoring mode of operation is considered broadly with reference to FIG. 18. The flowchart of FIG. 18 depicts that wellbore communication device 201 in the present invention is operable in five states, including: an inactive state, a monitoring state, an armed state, an actuated state, and a disabled state.

Flowchart block 561 represents the inactive state of operation, when power is not provided to processor 203. A manual switch allows the wellbore communication device 201 to be switched from an inactive state to a monitoring state. Actuation of the manual switch is represented in FIG. 18 by flowchart block 563.

At step 565, processor 203 monitors pressure with respect to time. Processor 203 continually determines if the pressure-temperature profile of the internal fluid pressure $P_i$ corresponds to the identifying characteristics programmed into processor 203 during the initialized system mode of operation discussed above in connection with FIGS. 17a, 17b, 17c, 17d and 17e. If the pressure-temperature profile does not match the program profile, the process continues at step 565, wherein pressure is continually monitored with respect to time. However, if the detected pressure-temperature profile corresponds to the program profile, wellbore communication device 201 is switched to an armed state, as set forth in flowchart block 569.

Once in the armed state, wellbore communication device 201 continually monitors internal pressure within conduit 209 for an actuation signal, as set forth in block 571. Processor 203 determines, in step 573, if the actuate signal is received within the predetermined time interval R. If so, according to step 575, the wellbore tool is actuated after a programmed time delay. If not, wellbore communication device 201 is automatically switched to a disabled state. In addition, after actuation of a wellbore tool in step 575, wellbore communication device 201 is switched to a disabled state.

Therefore, once the system becomes "armed" it will eventually be switched to a disabled state, irrespective of whether an actuation signal is received. This is a safety feature which prevents inadvertent actuation of the wellbore tool, if it fails to respond to an actuation signal. This is an important feature, since if the wellbore communication device 201 of the present invention fails to respond to an actuation signal, it may be necessary to remove it from the wellbore. Accidental actuation of the wellbore tool during removal from the wellbore could cause serious, and perhaps irreparable, problems. For example, inadvertent actuation of a perforating gun during removal from the wellbore could present serious problems, and require recasing of at least a portion of the well.

FIGS. 19a and 19b are more detailed flowchart representations of the monitoring mode of operation. The process begins at step 579, wherein a calibrated processor 203 is provided. In step 581, programming unit 207 is coupled to processor 203, and identifying characteristic values for pressure thresholds Q and X, the duration of time periods Y, and Z, and the number N of pressure surges to "arm" the system are entered by the operator, as discussed above.

For purposes of simplifying and clarifying the flowchart representation of the monitoring mode of operation, "DO WHILE" commands are used in FIGS. 19a and 19b, and are represented by the word "DO" disposed in a programming flowchart decision box. This command requires that all steps in the loop be performed continually while the condition in the decision-type programming block linked by a loop-indicator is satisfied. For example, as shown in FIG. 19, flowchart blocks 583, 631 are linked in a loop. The intervening flowchart operations are performed as long as the condition in block 631 is satisfied. Block 631 states "while 1=1"; therefore, the intervening steps are performed perpetually, since one will always be equal to one.

A plurality of other "DO WHILE" operations are nested between flowchart blocks 583, 631. Flowchart blocks 585, 607 comprise a "DO WHILE" operation, which serves to count pressure surges of duration Y. Flowchart blocks 599, 603 define another "DO WHILE" operation which monitors the elevation of internal fluid pressure above pressure threshold X. The "DO WHILE" operation of blocks 599, 603 state that the intervening steps are performed as long as the internal pressure $P_i$ exceeds the pressure threshold level X. Flowchart blocks 609, 615 define another "DO-WHILE" loop, with the intervening flowchart operations performed as long as the internal pressure level $P_i$ is less than pressure threshold Q. Flowchart blocks 617, 619 define yet another do-while loop, which are performed as long as internal fluid pressure $P_i$ is greater in amplitude than the pressure threshold level of threshold Q. Flowchart blocks 621, 623 define yet another do-while loop, which is continually performed, while the software timer for time interval R is not equal to the value selected for the duration of time interval R.

As stated above, flowchart blocks 583, 631 define a do-while loop, which ensures that processor 203 is perpetually in a monitoring mode of operation. Flowchart blocks 585, 605 cooperate to define a do-while loop, which continually performs the operations of the nested flowchart operations for so long as the value of a counter does not equal to "N". "N" is the operator-selected number which corresponds to the number of fluid pressure surges of Y duration which must be detected within time interval Z in order to switch a system between "unarmed" and "armed" conditions. The preferred computer program of the present invention will not drop out of the do-while loop defined by flowchart blocks 585, 607 until the value of the N-counter equals the value for "N" which has been entered into processor 203 by programming unit 207, during the initialize system mode of operation.

In step 587, the amplitude of internal fluid pressure $P_i$ is compared to the pressure amplitude threshold of threshold X. If $P_i$ exceeds threshold X, the process continues at step 605. If $P_i$ does not exceed the amplitude value of threshold X, the process continues at flowchart block 589. In step 589, the software timer for the Y time interval is restarted. Essentially, flowchart blocks 587, 589 cooperate to start a software timer which has a duration of Y time units, when the amplitude of internal fluid pressure $P_i$ exceeds amplitude threshold X.

The process continues in flowchart block 591, wherein the N-counter is examined to determine if it is equal to zero. If the value in the N-counter is equal to zero, the process continues in flowchart block 593. If, in step 591, it is determined that the value of the N-counter does not equal to zero, the process continues at flowchart block 595. Flowchart block 593 states that the Z-timer is started. The Z-timer corresponds to the time interval in which N number of pressure surges must be detected, each having a duration of Y time units. The Z-timer is started only if no previous pressure surges have been detected. In flowchart block 595, the value of a Y-timer is compared to the Y time interval, which is set by the operator during the initialized system mode of operation. If the value of the Y-timer is equal to the Y time interval set by the operator, the process continues in step 597, wherein the end-counter is incremented. If, in step 595, it is determined that the Y-timer does not equal the value of the Y time interval set by the operator, the process bypasses step 597, and continues at step 599.

Flowchart blocks 599, 603 define a do-loop which is performed continually while the amplitude of internal fluid pressure $P_i$ exceeds the operator selected pressure threshold X. The nested flowchart block 601 continually compares the content of the Z-timer to the Z time interval value which is set by the operator. When the value of the Z-timer equals the time interval Z, the software jumps out of the do-while loop defined by flowchart blocks 599, 603.

The flowchart functions defined by flowchart blocks 585 through 607 essentially operate to continually monitor the amplitude of internal fluid pressure $P_i$ to determine when it exceeds the amplitude threshold of threshold X. Once $P_i$ exceeds threshold X, Y-timer is started, and the software will count consecutive pressure surges which exceed the pressure threshold X during time interval Z. Software will continue at software block 209, if and only if, the predetermined number of pressure surges of sufficient duration are detected within time interval Z. At this point, the system switches between "unarmed" and "armed" conditions.

Once armed, the software continues by performing the do-while loop defined by software blocks 609, 615. The software functions nested between software block 609, 615 will be performed for as long as the amplitude of the internal fluid pressure $P_i$ is less than the Q pressure threshold. In software block 611, the value of the R-timer is compared to the operator selected time interval R. If the value of the R-timer equals the operator selected value of time interval R, the process continues in step 613, and the system is killed. The comparison of the value of the R-timer to the R time interval is continued for as long as the amplitude value of the internal fluid pressure $P_i$ exceeds the operator selected pressure threshold Q.

In other words, in the preferred computer program of the present invention initiates the R-timer when a preselected number N of pressure surges are detected. Thereafter, the software continually monitors the internal pressure $P_i$ to determine if pressure threshold Q is exceeded within time interval R. If pressure threshold Q is not exceeded within time interval R, then the system disarms (that is, the system is "killed"). If, however, a pressure surge in excess of the pressure threshold Q is provided within time interval R, the process continues at step 617.

Software blocks 617, 619 define a do-while loop which essentially provides a "pause" for so long as the amplitude of internal pressure $P_i$ exceeds Q. Once the internal pressure $P_i$ falls below pressure threshold Q, the software continues in software block 621. Software blocks 621, 623 define another do-while loop which essentially provides a pause of the duration of the R-timer. At the expiration of the R-timer, the software continues in block 625, in which the wellbore tool is actuated. In block 627, a pause of two minutes is provided, after which the system is disabled, as set forth in block 629.

Figure 21:
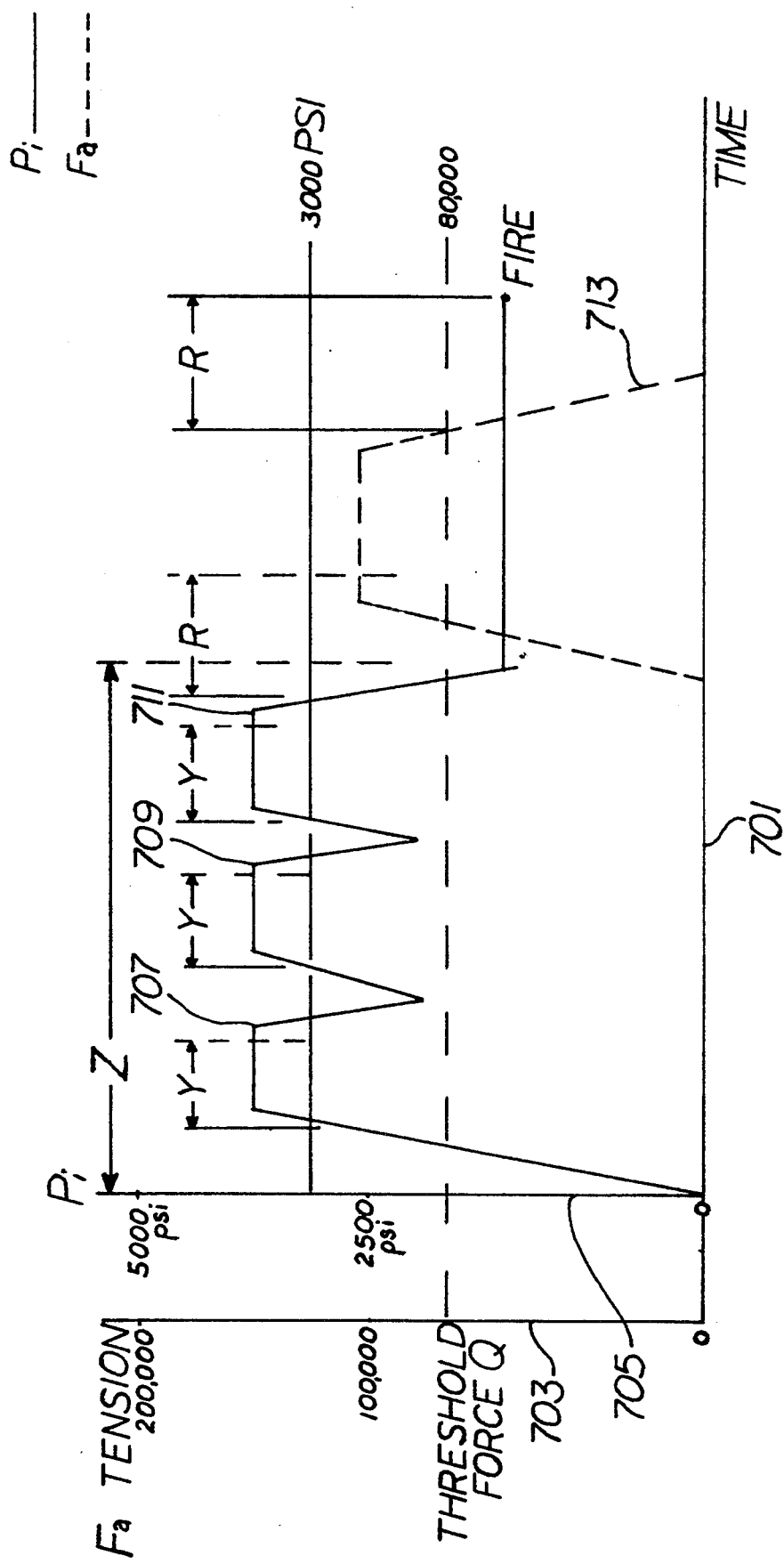
FIGS. 21 through 24 depict alternative message communication techniques of the present invention, which include the use of either axial force, or axial force in combination with fluid pressure to communicate messages.

FIGS. 21 through 24 depict, in graph and flowchart form, alternative embodiments of the present invention for communicating messages, which include the use of either axial force F, or axial force F in combination with fluid pressure $P_i$, to communicate messages in a wellbore. FIG. 21 is a graph depicting a predetermined force profile, which includes selected segments of axial force, in combination with selected segments of internal fluid pressure $P_i$, both of which act on conduit member 209, and which may be detected by sensor means 247. As discussed above, sensor means 247 provides strain readings to processor 203. Processor 203 includes a computer program which is capable of determining axial force $F_a$, and internal pressure $P_i$, as a function of the voltage outputs of the tangential and axial half-bridge circuits 305, 307, using the formulas of equation numbers 32, 33.

In FIG. 21, the X-axis 701 is representative of time, and two Y-axes 703, 705 are provided, with Y-axis 703 representative of axial force $F_a$ and Y-axis 705 representative of internal pressure $P_i$. Y-axis 703 includes values of axial force from zero pounds of force to 200,000 pounds of force. Y-axis 705 is representative of the range of internal fluid pressure $P_i$ from zero pounds per square inch to 5,000 pounds per square inch. A plurality of axial force and internal fluid pressure thresholds are provided with respect to the Y-axes 703, 705. Of course, the force and pressure thresholds may be established by the operator during an initialize system mode of operation, as set forth above.

The predetermined force pattern set forth in FIG. 21 is merely representative of one sample predetermined force pattern which includes segments of internal fluid pressure $P_i$, of selected amplitude and duration, as well as one segment of axial force $F_a$, of selected amplitude. In alternative embodiments, other, different predetermined force patterns may be provided which include fewer or greater segments of either axial force $F_a$ or internal fluid pressure $P_i$. Of course, axial force $F_a$, can be either compression or tension forces which may be applied to wellbore tubular conduit string 223 and conduit member 209. These forces may be applied by any one of a number of conventional well operations which increase or decrease the load placed on wellbore tubular conduits and tools, such as wellbore packers.

In the example of FIG. 21, force threshold Q is established relative to Y-axis 703 during the initialize system mode of operation, and may be set at any operator-selected level, but is depicted in FIG. 21 at 80,000 pounds of tension force. In addition, at least one internal fluid pressure threshold X may be established relative to Y-axis 705. As shown in FIG. 21, pressure threshold X is established relative to Y-axis 705 at any operator-selected value, during the initialized system mode of operation. In the example shown in FIG. 21, internal fluid pressure threshold X is set at 3,000 pounds per square inch of fluid pressure.

As in the preferred embodiment discussed above, during the initialized system mode of operation, the operator may select time duration values for time intervals Y, Z, and R. For the example of FIG. 21, the value of time interval Z establishes a window during which a predetermined number N of fluid pressure surges, above fluid pressure threshold X, must be detected. Time interval Y establishes a minimum duration for each surge N. The plurality of pressure surges 707, 709, and 711 are graphically depicted in FIG. 21, as exceeding the internal fluid pressure threshold X (of 3,000 pounds per square inch), and having a duration in excess of Y time units.

The predetermined force pattern of FIG. 21 further includes an axial force $F_a$ segment 713, which rises in amplitude above axial force $F_a$ threshold Q during time interval R. The predetermined force pattern of FIG. 21 is similar to the predetermined fluid pressure pattern of FIG. 15, insofar as the recognition of three fluid pressure surges 707, 709, 711 during time interval Z, causes the system to move between "unarmed" and "armed" conditions. Upon arming, a software timer which defines time interval R is initiated, and axial force $F_a$ is monitored to detect axial force segment 713, which exceeds axial force $F_a$ threshold Q during time interval R. Axial force $F_a$ segment 713 serves as a "firing" signal, similar to the firing pressure surge of the particular predetermined fluid pressure pattern of FIG. 15.

Upon detection of the "firing" signal, processor 203 continually monitors axial force to determine when axial force $F_a$ falls below axial force $F_a$ threshold Q. Then, a software timer is initiated, which runs for the duration of time interval R. At the expiration of time interval R, an actuation signal is provided by processor 203 to a wellbore tool.

Figure 23:
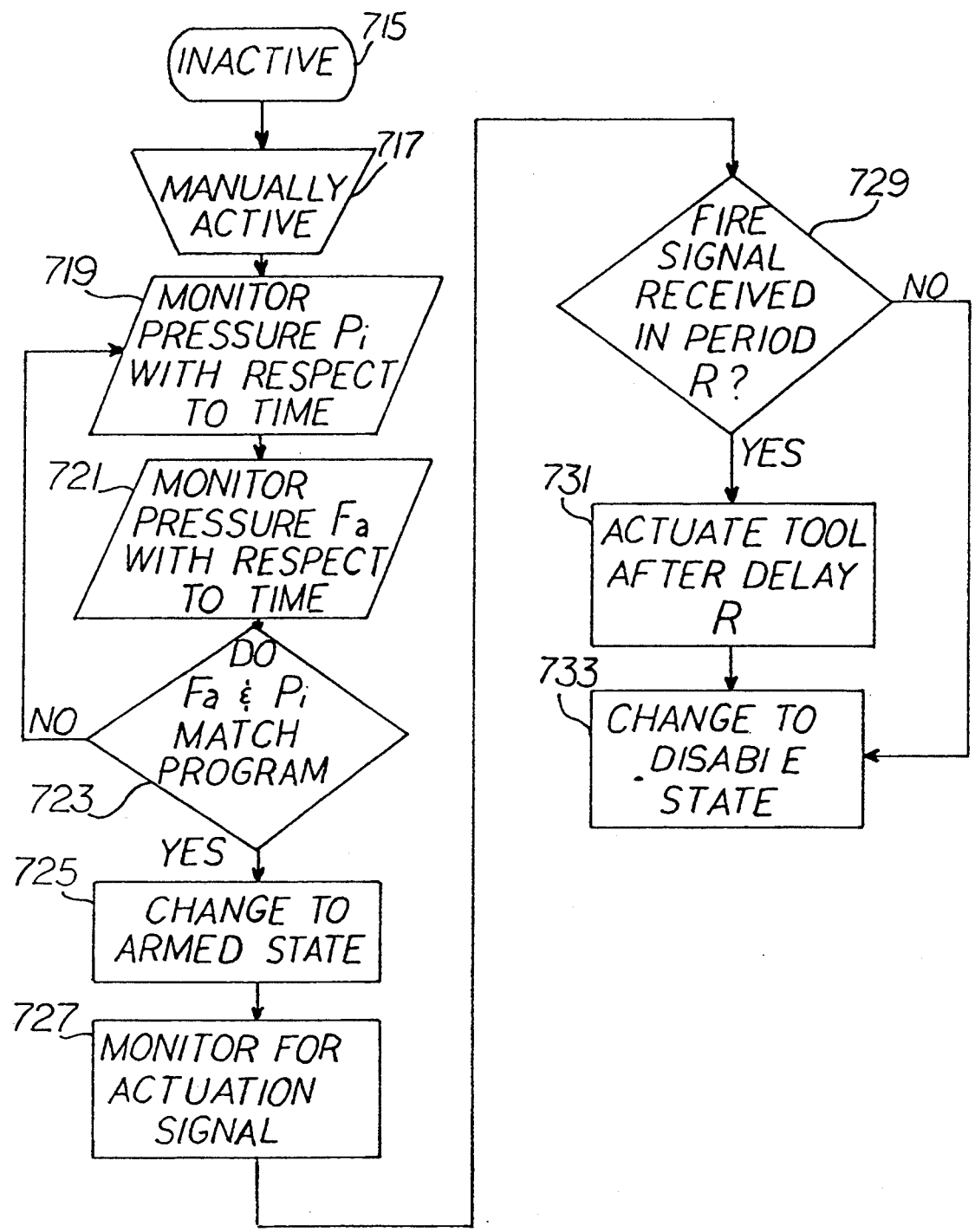

FIG. 23 depicts, in flowchart form, the preferred monitoring mode of operation of processor 203 which corresponds to the predetermined force pattern which is graphically represented in FIG. 21. As shown therein, the process begins in 715, when wellbore communication device 201 in an "inactive" state. In step 717, wellbore communication device 201 is switched to an active state by operator actuation of a manual switch.

In step 719, processor 203 receives sensor data from sensor means 249, and continually calculates internal fluid pressure $P_i$, with respect to time, and continually monitors internal fluid pressure $P_i$. In step 721, processor 203 manipulates the same sensor data from sensor means 247, and calculates axial force $F_a$ with respect to time, and in this respect continually monitors axial force $F_a$ with respect to time. It is interesting to note that processor 203 is able to simultaneously calculate internal fluid pressure $P_i$ and axial force $F_a$ with the same sensor data from sensor means 247. As set forth in step 723, processor 203 determines if the axial force $F_a$ and internal pressure $P_i$ "profile" with respect to time matches the program function, which is operator selected during the initialized system mode of operation. With reference to FIG. 21, processor 203 will continually monitor for three internal fluid pressure surges of amplitude in excess of the X pressure threshold, during the Z time interval. Each pressure surge 707, 709, 711 must have a duration in excess of time interval Y.

Upon receipt of three pressure surges 707, 709, 711, the system is switched between "unarmed" and "armed" conditions, as set forth in step 725. Thereafter, processor means 203 continually monitors data from sensor means 247 to detect an actuation, or "firing", signal.

With specific reference to FIG. 21, axial force $F_a$ surge 713 operates as the actuation signal, which must be received within time interval R after entry into an armed operating condition. Flowchart block 729 is representative of the function of the software and processor 203 of continually monitoring for the presence of an actuation or "fire" signal within time period R. If the actuation signal is received in time, the process continues in steps 731, and the wellbore tool is actuated after a predetermined time delay R. If the actuation signal is not received within time period R, the process continues in step 733, wherein the system is disabled to prevent firing.

Figure 22:
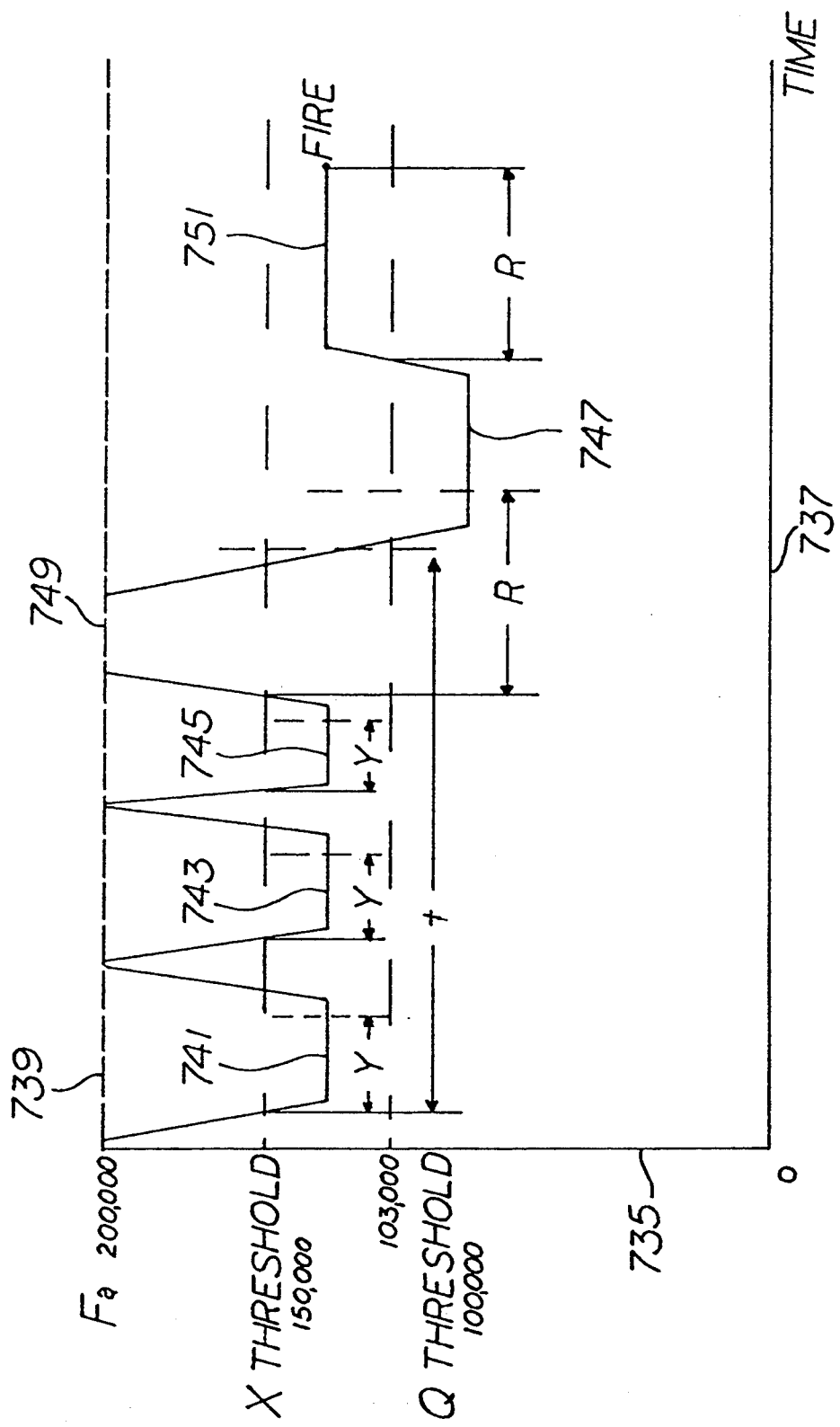

FIG. 22 is a graphic representation of the use of axial force $F_a$ alone to create a predetermined force pattern which may be recognized by processor 203 of the present invention. As shown, X-axis 737 is representative of time, and Y-axis 735 is representative of axial force $F_a$. Y-axis 735 represents a range of axial force levels between zero pounds of force to 200,000 pounds of force. Axial force $F_a$ threshold X is established relative to Y-axis 735. For example, axial force $F_a$ threshold X may be established at 150,000 pounds of axial force. A second axial force level Q may also be established relative to Y-axis 735. In the example set forth in FIG. 22, axial force $F_a$ threshold Q may be established at 100,000 pounds of axial force $F_a$. As shown in FIG. 22, conduit member 209, and other conduit members connected thereto, is maintained in an ordinary operating condition with 200,000 pounds of axial force $F_a$ applied thereto, as indicated by force line 739. A predetermined force pattern may be generated by slacking-off weight from conduit member 209 to decrease the axial force $F_a$ detectable at conduit member 209 to an amount below 200,000 of axial force $F_a$.

As shown in FIG. 22, the predetermined axial force $F_a$ pattern includes a number of axial force $F_a$ decreases 741, 743, 745, and 747, separated by axial force increases 749, 751. Processor 203 of the present invention may be programmed during an initialized system mode of operation to respond to the predetermined axial force $F_a$ pattern which is grahically depicted in FIG. 22. During the initialized system mode of operation, axial force $F_a$ values are selected for axial force $F_a$ thresholds X, and Q. In addition, the duration of time intervals Z, Y, and R selected by the operator during the initialized system mode of operation. In FIG. 22, three pressure decreases 741, 743, and 745 are provided within time interval Z. Each pressure decrease 741, 743, 745 has an amplitude less than axial force $F_a$ threshold X, and a duration in excess of Y time units. Also, axial force $F_a$ decrease 747 has an amplitude which is less than axial force $F_a$ threshold Q. Upon detection of axial force $F_a$ decreases 741, 743, 745 within time interval Z, the system of the present invention is switched between "unarmed" and "armed" conditions. Thereafter, a software timer is initiated having the direction of time interval R. During this time interval, axial force $F_a$ is monitored to determine if it drops below axial force $F_a$ threshold Q during the time interval R. If so, the system of the present invention will monitor axial force $F_a$ amplitude to detect an increase in axial force $F_a$ amplitude above axial force $F_a$ threshold Q. Thereafter, processor 203 of the present invention will provide a time delay of R time units. At the expiration of the time delay, processor 203 will provide an actuation signal to a wellbore tool.

Figure 24:
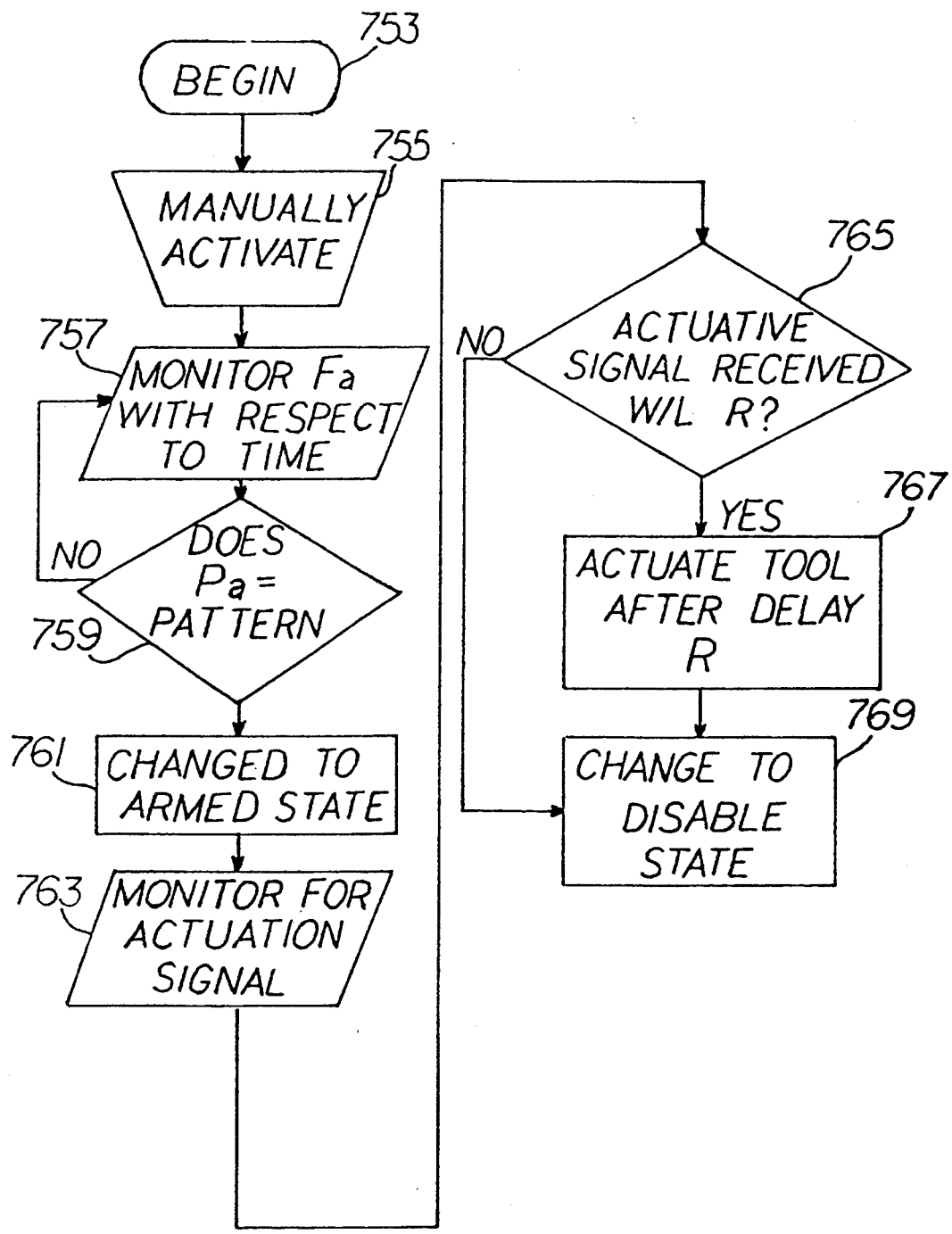

The operation of processor 203 is set forth broadly, in flowchart form, in FIG. 24. As shown, the system is in an inactive state at step 753. At step 755, the operator manually activates wellbore communication device 201 of the present invention by supplying electrical power to processor 203. Immediately, processor 203 begins monitoring axial force $F_a$ with respect to time, according to step 757. As depicted in step 759, processor 203 continually compares the "profile" of axial force $F_a$ with respect to time to a pattern which is programmed into the software of processor 203 during the initialized system mode of operation.

With reference to FIG. 22, when three axial force $F_a$ decreases 741, 743, 745 are detected within time interval Z, with each axial force $F_a$ being of sufficient duration. The system is switched between "unarmed" and "armed" conditions, as set forth in step 761 of FIG. 24. The process continues at step 763, wherein processor 203 continually monitors for an actuation signal. As shown in FIG. 22, the actuation signal comprises an axial force $F_a$ decrease 741, which is less than axial force $F_a$ threshold Q, and which occurs during time interval R. With reference to FIG. 24, software block 765 represents the detection of an actuating signal within time period R. If the actuation signal occurs within time period R, the process continues in block 767, in which the wellbore tool is actuated after time delay R. If the actuation signal is not received within time interval R, the process continues at step 769, wherein the system is disabled.

In broad terms, the present invention allows for communication of coded messages through an imperforate wall of the conduit member 209 by providing a predetermined pattern of axial force $F_a$ with respect to time, or a predetermined pattern of internal pressure $P_i$ over time, or a predetermined force pattern composed of any combination of axial force $F_a$ and internal pressure $P_i$.

FIG. 20 is a tabular comparison of the actuating system of the present invention to prior art systems, including mechanical, hydraulic, slick line, electric wireline, and electromagnetic actuation systems. As can be seen from the table, properties of the workstring can limit the performance of prior art systems. Likewise, the depth and deviation of the well can limit the prior art systems. The presence or absence of certain performance equipment can also limit the performance of prior art systems. The useful life of subsurface elastomer elements can likewise limit the performance of prior art systems. The total force available through the workstring or wireline is likewise a limitation to the prior art systems.

For example, the depth and deviation of a particular well can prevent or impair the use of an electric wireline to actuate subsurface tools.

For an alternative example, hydraulic actuation methods require the use of certain surface equipment, and is impaired over time by lapse of the useful life of elastomer elements in subsurface seals.

For yet another example, for mechanical actuation systems, the workstring must be sufficiently "stiff" to allow the use of axial and rotation forces to manipulate wellbore tools between operating conditions. Also, for mechanical actuation systems, the depth and deviation of the well can become a problem. For example, in deviated or horizontal boreholes, mechanical actuation methods are practically useless.

The table of FIG. 20 demonstrates that the actuation method of the present invention is not dependent upon string properties. It can be employed with metal tubular conduits, wellbore hoses, or coiled-tubing workstrings. The depth and deviation of the well also does not present a problem for the actuation method of the present invention. Predetermined fluid pressure patterns can be transferred through deviated or horizontal wellbores without any problem. The surface equipment required for the present invention is not elaborate or difficult to transport, and presents no real problem as compared to wireline and others systems which require huge spools of cable or tubing, which are particularly problematic in off-shore operations. In the present invention, elastomer life does not present a problem, since internal pressure is sensed through imperforate conduit members, and the system does not rely at all upon elastomer seals. For these practical reasons, the actuation method of the present invention presents a dramatic advance over the prior art methods.

Figure 25:
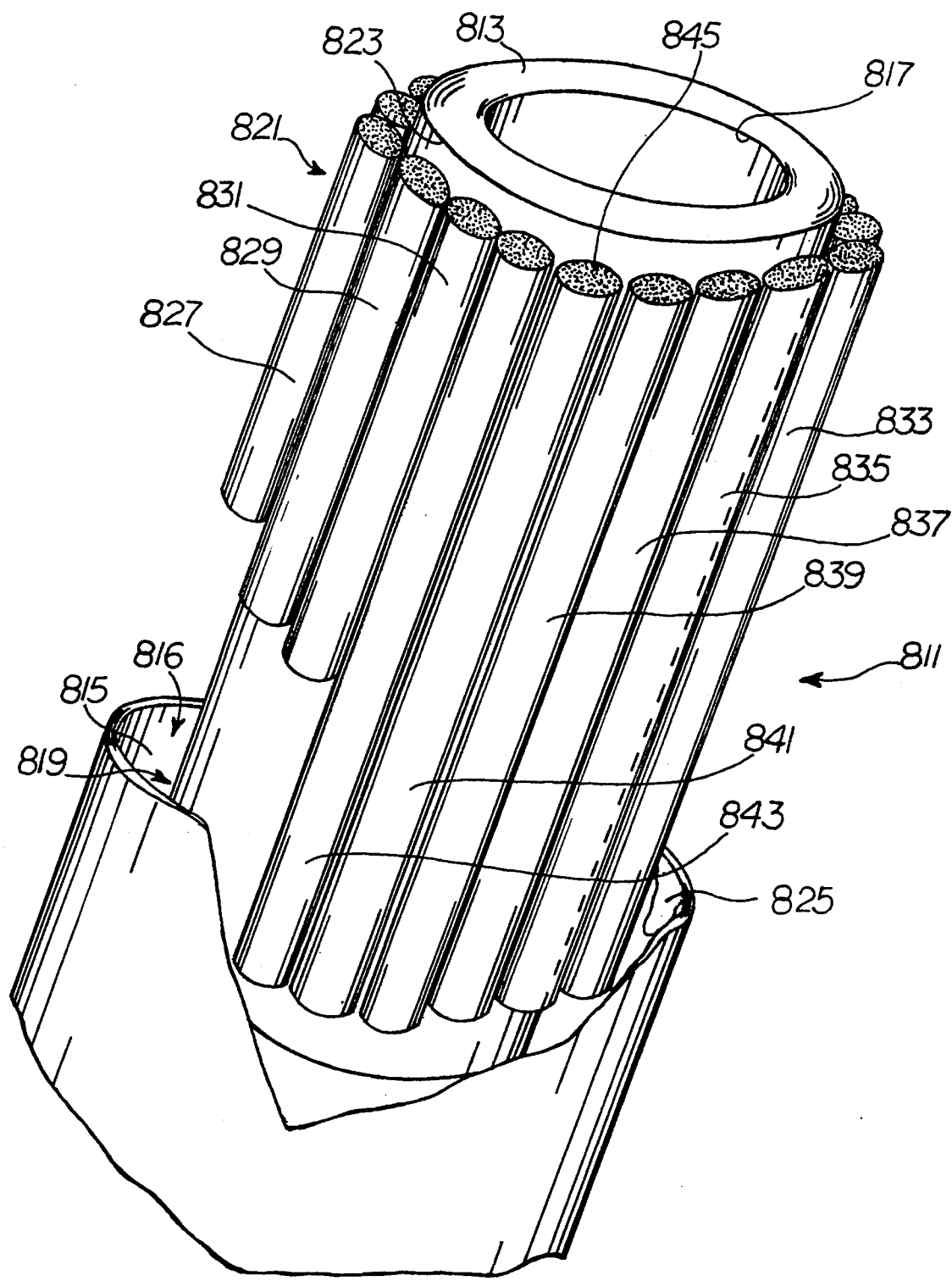
FIG. 25 is a fragmentary and exploded view of the preferred actuation apparatus of the present invention, in simplified form.

FIG. 25 is a depiction of the preferred embodiment of a portion of the actuation apparatus 811 of the present invention, in fragmentary and exploded perspective view. The portion of actuation apparatus 811 which is shown in FIG. 25 includes inner tubular member 813 and outer tubular member 815, with inner tubular member 813 concentrically disposed within central bore 816 of outer tubular member 815. Annular region 819 is defined between outer surface 823 of inner tubular member 813 and central bore 816 of outer tubular member 815. Inner tubular member 813 is also equipped with central bore 817, which allows the passage of wellbore and completion fluids upward and downward within actuation apparatus 811.

In the preferred embodiment of the present invention, a plurality of selectively actuatable pressure generators 821 are circumferentially disposed about inner tubular member 813, and may be held firmly in place within annular region 819 by use of packing substance 825, which may comprise silicone grease, which is a thermal and electrical insulator. In the a preferred embodiment of the present invention, a plurality of selectively-actuable pressure generators 821 include metal tubes having a length of either one or two feet, with an inner diameter of less than an inch (and preferably 11/16 of an inch). As shown in FIG. 25, metal tubes 827, 829, 831 are approximately one foot in length, while metal tubes 833, 835, 837, 839, 841 and 843 are approximately two feet in length. In the preferred embodiment of the present invention, inner tubular member 813 and outer tubular member 815 are approximately two feet in length, and are equipped with upper and lower threaded couplings and fluid-tight seals, allowing inner and outer tubular members 813, 815 to be coupled into the wellbore tool which is depicted in FIGS. 2 and 3 herein, in lieu of nitrogen chamber 171.

Each of the plurality of selectively-actuable pressure generators 821 includes an electrically or thermally triggerable gas generating substance. In the preferred embodiment of the present invention, each of the plurality of selectively actuable pressure generators 821 is filled with thermally activated gas generating substance 845. Any solid propellant, such as those used for rocket propulsion and in underwater and road flares may be used as the thermally-activated substance 845. However, any gas-generating electrically or thermally activated substance can be used. The chemical reaction may be triggered by electric match igniters, which are conventional, such as Estes brand model rocket igniters.

Figure 26:
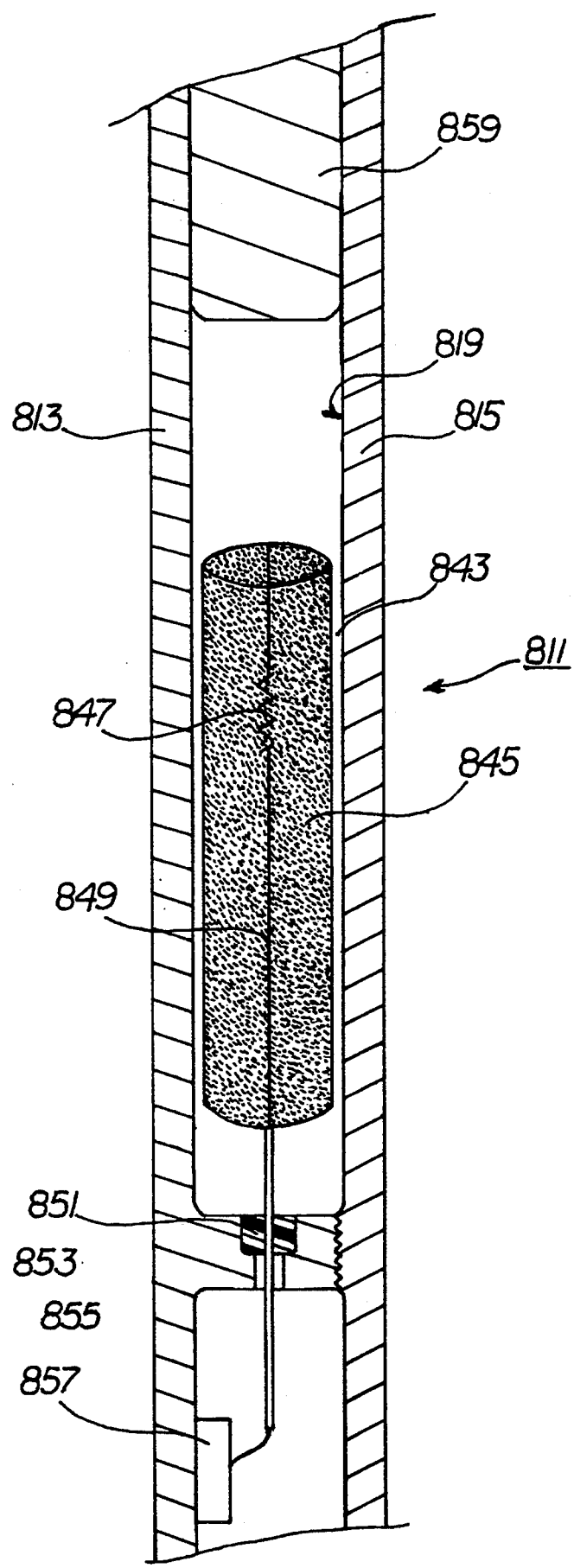
FIG. 26 is a fragmentary longitudinal section view of a portion of the preferred actuation apparatus of the present invention.

FIG. 26 is a fragmentary longitudinal section view of a portion of the preferred actuation apparatus 811 of the present invention. As is shown, metal tube 843 is disposed in annular region 819 between inner tubular member 813 and outer tubular member 815. Thermally-activated substance 845 is disposed within the central bore of metal tube 843. Igniter 847 is shown disposed surrounded by the material of thermally-activated substance 845. Electrical conductor 849 extends through metal tube 843 and is electrically coupled to igniter 847, and to electrical ground.

Electrical conductor 849 is passed into annular region 819 by a conventional pressure containing electrical feed-through 851. Electrical conductor 849 is connected at its lowermost end to printed circuit board 853 which includes a number of electrical components mounted thereon, including electrical switches 855 and microprocessor 857. As will be discussed below, electrical switches 855 and microprocessor 857 cooperate to selectively activate igniters (like igniter 847) and cause the initiation of a chemical reaction in thermally-activated substance 845, which releases a gas which is contained by annular region 819, which forms a gas-tight pressure containment vessel.

Piston 859 at least in-part defines the pressure containment vessel of annular region 819, and serves as a force-transferring member of actuation apparatus 81. While shown only in simplified form in FIG. 26, piston 859 is similar in configuration and operation to piston head 165 which is depicted in FIGS. 2a, 2b, 2c, 2d, 3a, 3b, 3c, 3d and 3e discussed hereabove. As is described with reference to FIGS. 2a, 2b, 2c, 2d, 2e, 3a, 3b, 3c, 3d and 3e, piston 859 operates to energize a wellbore packer which includes an elastomeric resilient element. Piston 859 will serve to transfer force from the gas generated from the burning of thermally-activated substance 845 into an axial force which serves to energize the elastomeric packing element and form a fluid-tight and gas-tight seal against a selected wellbore surface.

Figure 27:
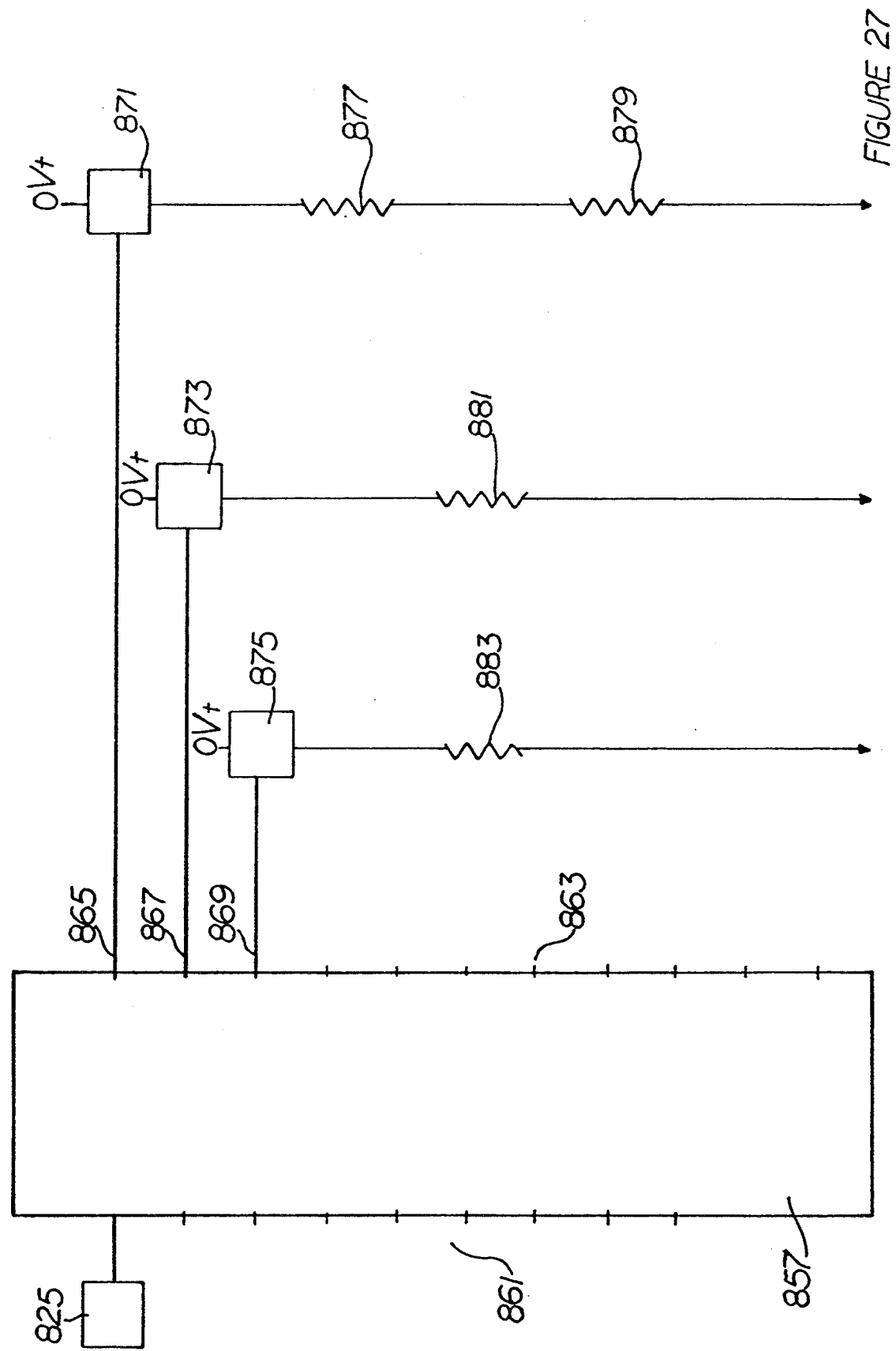
FIG. 27 is a simplified electrical schematic view of the electrical interconnection of the preferred controller of the present invention, the preferred pressure monitoring sensor of the present invention, and the preferred electrically-actuable pressure generation member of the present invention.

The method by which the present invention accomplishes this objective is best described with reference first to FIG. 27, which is a simplified block diagram of an electrical schematic view of the preferred actuation apparatus 811 of the present invention. As shown in FIG. 27, micropocessor 857 includes a number of input pins 861, and dedicated output pins 863. Microprocessor 857 of the actuation apparatus 811 of the present invention is similar to that shown in FIG. 6 herebelow, but is shown in simplified form in FIG. 27 to facilitate this discussion.

Output pin 865 of microprocessor 857 is connected to one terminal of switch 871. The other terminal of switch 871 is connected to a voltage source, and the remaining terminal of switch 871 is connected to igniter switches 877, 879, each of which are disposed in a separate metal tube of the plurality of selectively activated pressure generators 821.

Providing a high output signal on output pin 865 will cause switch 871 to move from the normally-open position to the closed position, which will allow the voltage source to direct a current through igniter switches 877, 879. In the preferred embodiment of the present invention, switches 871, 873, and 875 may comprise simple transistor switches (with one terminal connected to voltage, one terminal connected to the microprocessor output pin, and the other terminal connected to an igniter; application of a high voltage to the transistor switch allows the transistor to conduct, which allows currents to pass).

Similarly, switch 873 includes one terminal which is connected to output pin 867 of microprocessor 859, one terminal which is connected to a voltage source, and one terminal which is connected to igniter 881. A high output on output pin 867 of microprocessor 857 causes switch 873 to move between a normally-open position to a closed position, allowing current flow through igniter 881. Likewise, switch 875 includes one terminal which is connected to output pin 869 of microprocessor 857, one terminal which is connected to voltage, and one terminal which is connected to igniter switch 883. Igniter switch 881 is disposed in a single metal tube of the plurality of selectively-actuable pressure generators 821. In contrast, igniter switch 883 is disposed in one of the one-foot long metal "half" tubes.

As is shown in FIG. 27, output pin 865 of microprocessor 857 controls the "firing" of two of the plurality of selectively-actuable pressure generators 821; this is referred to as firing "doubles". Output pin 867 of microprocessor 857 selectively controls the "firing" of only one of the plurality of selectively-actuable pressure generators 821; this is referred to as firing "singles". In contrast, output pin 869 of microprocessor 859 selectively controls the "firing" of one of the plurality of selectively-actuable pressure generators 821 which is one-half the length of a regular metal tube; this is referred to as firing "halves". In this specification, the word "firing" means the initiation of the chemical reaction which produces the gas which pressurizes annular region 819, but should not be comprehended to indicate that any type of explosion is taking place. The burning reaction of thermally-activated substance 845 is a slow gas generating process, and is nothing is like an explosion.

The remaining output pins of 863 are likewise selectively connected to single sticks, double sticks, and half sticks. Preferably, most or all of the output pins of microprocessor 857 may be used for selective firing of selected ones of the plurality of selectively-actuable pressure generators 821.

In the preferred embodiment of the present invention, actuation apparatus 811 includes pressure transducer 825 which is coupled to one or more input pins of microprocessor 857. In the preferred embodiment, pressure transducer 825 is disposed within annular region 819, and is electrically coupled to microprocessor 857 by an electrical conductor which is routed into annular region 819 with a conventional pressure-containing electrical feed through. In the preferred embodiment of the present invention, pressure transducer 825 serves to provide a continuous indication of the pressure within annular region 819. The computer program resident in memory and microprocessor 857 will periodically compare the pressure reading of pressure transducer 825 to one or more target pressures, as will be discussed herebelow.

In the present invention, the computer program resident in microprocessor 857 should include a look-up table which is used to correlate output pins 863 of microprocessor 857 to the number and length of selectively-actuable pressure generators 821 to which the output pin is connected. As selected ones of the plurality of selectively-actuable pressure generators 821 are "fired" by microprocessor 857, the items should either be automatically removed from the look-up table, or flagged as having already been discharged, to prevent the attempted firing of a selected selectively-actuable pressure generator 821 which has already been discharged.

Figure 31:
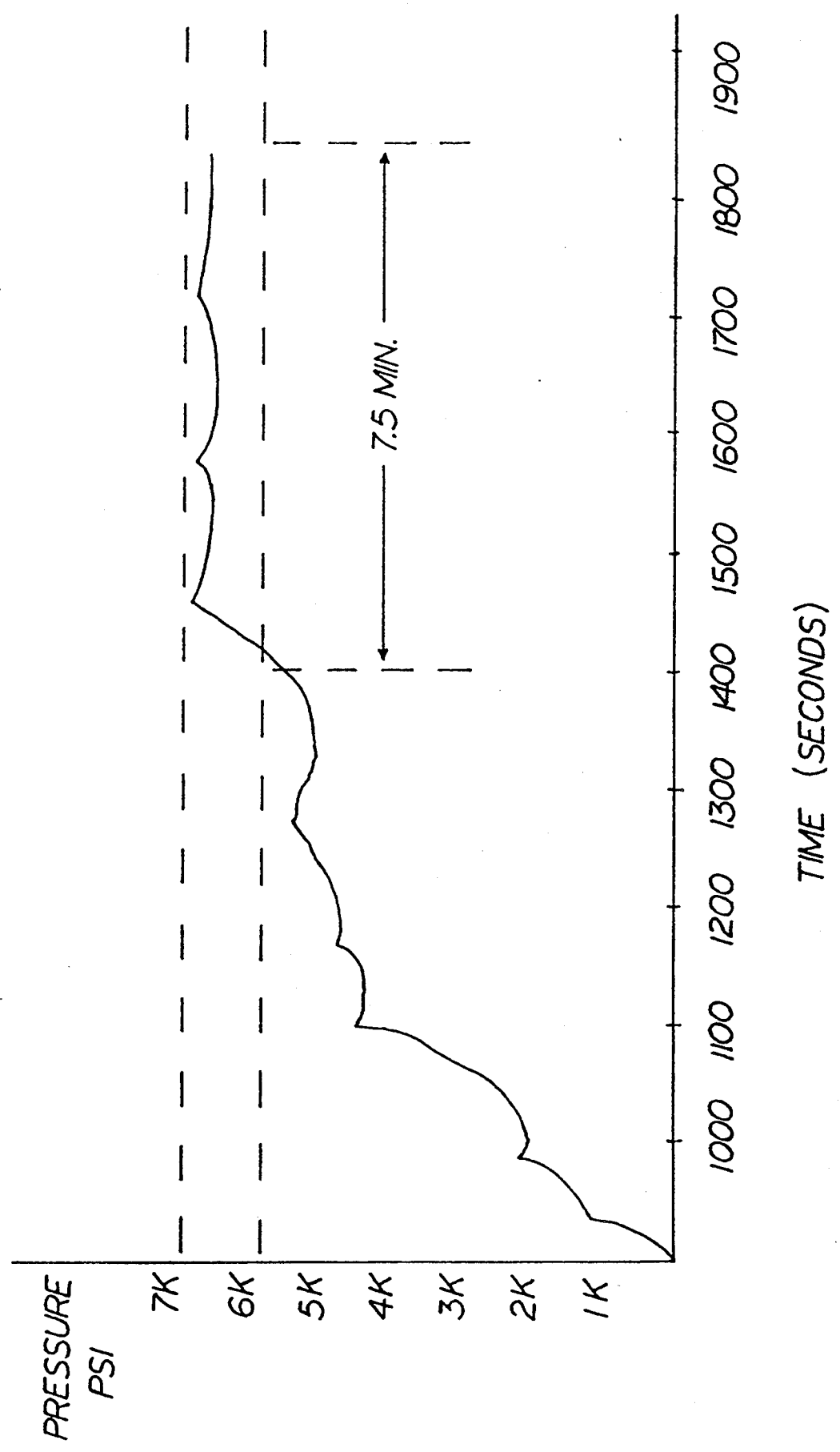
FIG. 31 is a graph of pressure versus time which provides an example of the pressure versus time profile which can be generated by the preferred embodiment of the actuation apparatus of the present invention.

FIG. 31 is a graph of pressure versus time which can be used to describe the general objectives of one use of the present invention. As is shown, the X-axis of the present invention is representative of time, in seconds. The Y-axis of the graph of FIG. 31 is representative of the pressure within annular region 819, in pounds per square inch. The solid line on the graph indicates the pressure within annular region 819 with respect to time. The peaks and valleys of this curve represent the build-up and degradation of gas pressure within annular region 819 due to the selective discharge of ones of the plurality of selectively-actuable pressure generators 821. The specific engineering objective sought to be obtained by the example of FIG. 31 is the application of over four thousand pounds per square inch of force to piston 859, which serves as a force-transferring member to energize an elastomeric sealing element in the packer which is described hereabove in the discussion of in FIGS. 2a, 2b, 2c, 2d, 2e, 3a, 3b, 3c, 3d, and 3e.

This objective is obtained by preprogramming microprocessor 857 to periodically examine the value provided by pressure transducer 885 to determine: (1) what the magnitude is of the pressure within annular region 819; (2) whether the pressure within annular region 819 is ascending or descending; and (3) whether the pressure within annular region 819 has been maintained between an upper pressure limit of 6,500 pounds per square inch and a lower pressure limit of 5,500 pounds per square inch for a period of 7.5 minutes. Bear in mind that the graph of FIG. 31 depicts one of a number of pressure versus time curves which may be selected by the user during a programming mode of operation.

Figure 28:
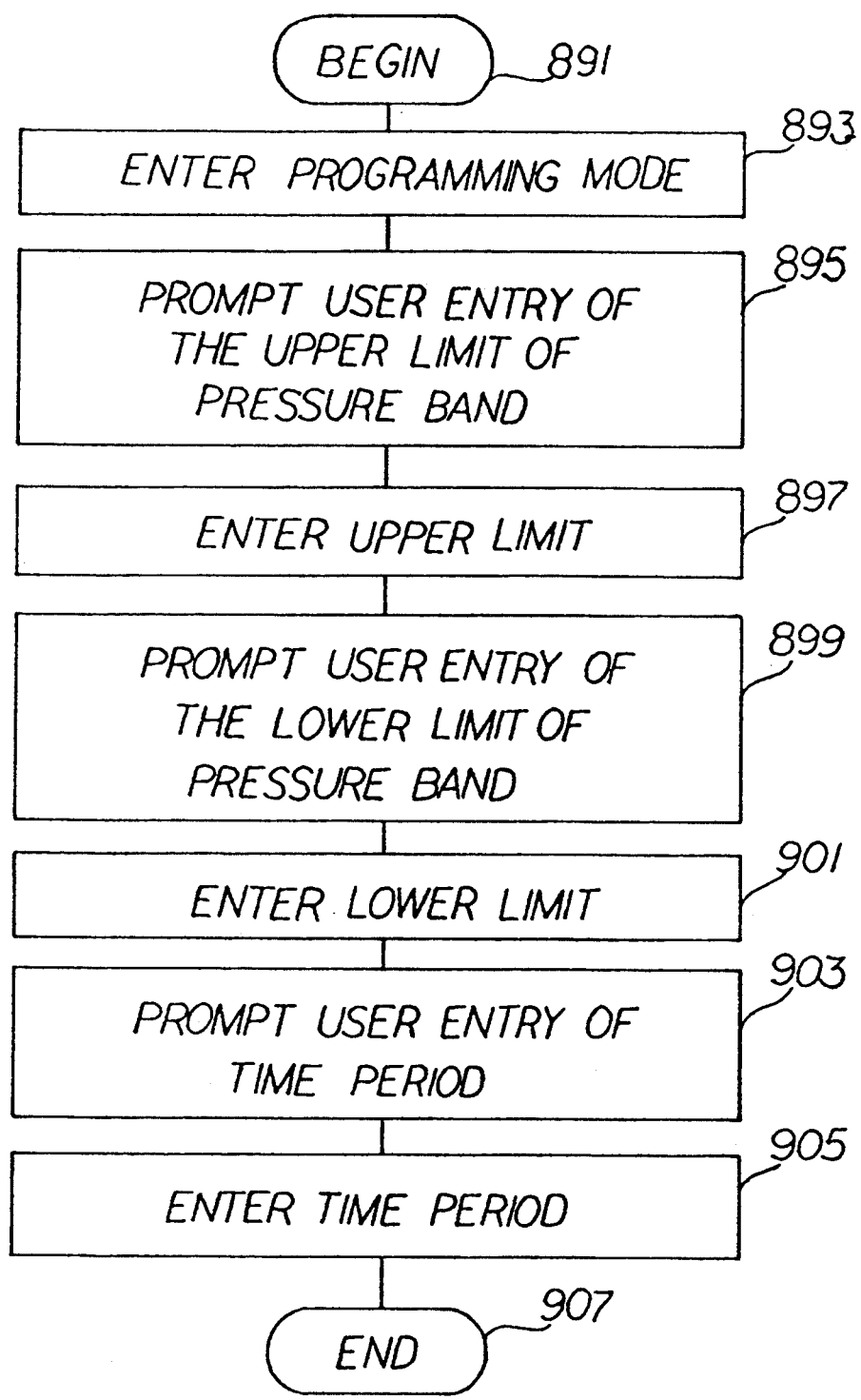
FIG. 28 is a flowchart depicting the programming mode of operation of the preferred actuation apparatus of the present invention.

During the programming mode of operation, which is described hereabove in connection with FIGS. 17a, 17b, 17c, 17d and 17e, microprocessor 857 may be programmed with the user-selected pressure criteria which establishes a force profile for application to wellbore tools through the force-transferring action of piston 859. The programming mode of operation is depicted in flowchart from in FIG. 28. The programming mode of operation begins in step 891. In step 893, the programming mode is entered by the operator. The user is prompted to enter the upper limit of a selected pressure band, in step 895. The user responds to the prompt, in step 897, by entering the upper pressure limit. For the example of FIG. 31, the user would enter "6500".

Next, in step 899, the user is prompted to enter the lower limit of a selected pressure band. In response to the prompt, in step 901, the user enters the lower limit of the selected pressure band. Again, with reference to the example of FIG. 31, the lower limit is 5,500 pounds per square inch, so the user would enter "5500".

The programming process continues in step 903, when the computer prompts the user to enter a time period for which the pressure within annular region 819 must be maintained within the upper and lower pressure limits which have been entered in the preceding steps. In step 905, the user responds to the prompt by entering the time period, in accordance with the present invention in units of seconds. Again, with reference to the example of FIG. 31, the user selected time interval is 7.5 minutes, which corresponds to 450 seconds, so the user would enter "450".

Figure 29:
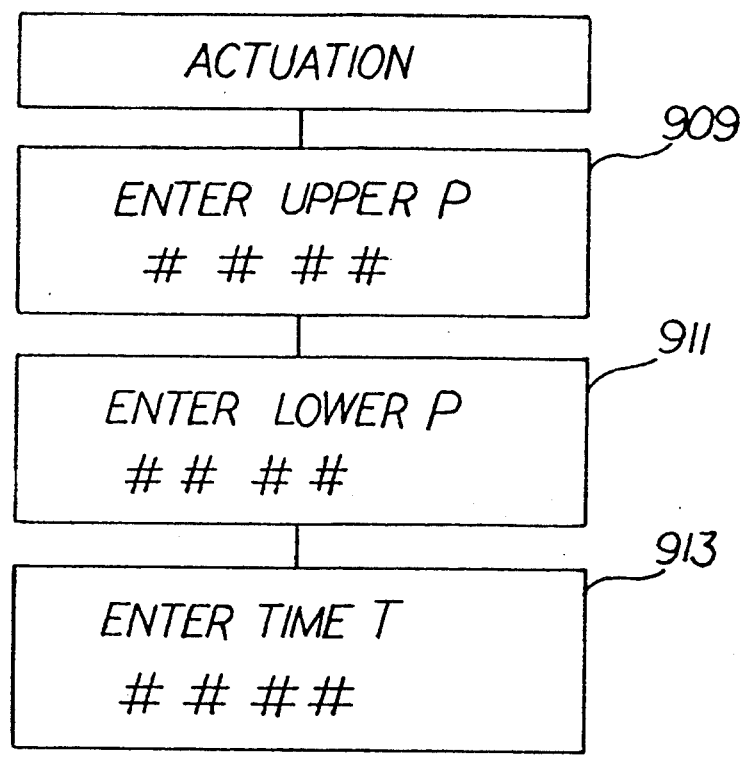
FIG. 29 is a depiction of the user interface display of the preferred actuation apparatus of the present invention.

Preferably, programming would occur through use of programming unit 207 which is discussed hereabove in connection with FIG. 6. Programming unit 207 would provide a digital display of the prompts, and allow the user to enter the numbers which establish the upper pressure limit and lower pressure limit of the selected pressure span, as well as the time interval which is desired. The digital message are displayed in FIG. 29. Display 909 prompts the user to enter the upper pressure limit; display 911 prompts the user to enter the lower pressure limit; display 913 prompts the user to enter the selected time interval, in seconds.

FIGS. 30a, 30b, 30c and 31 and will now be used to describe in detail a force moderation mode of operation of microprocessor 857. FIG. 31 depicts the force moderation mode of operation in flowchart form, while FIG. 31 depicts one specific example of a force versus time profile obtained through use of the present invention, for one specific use of the actuation apparatus 811 of the present invention.

Figure 30A:
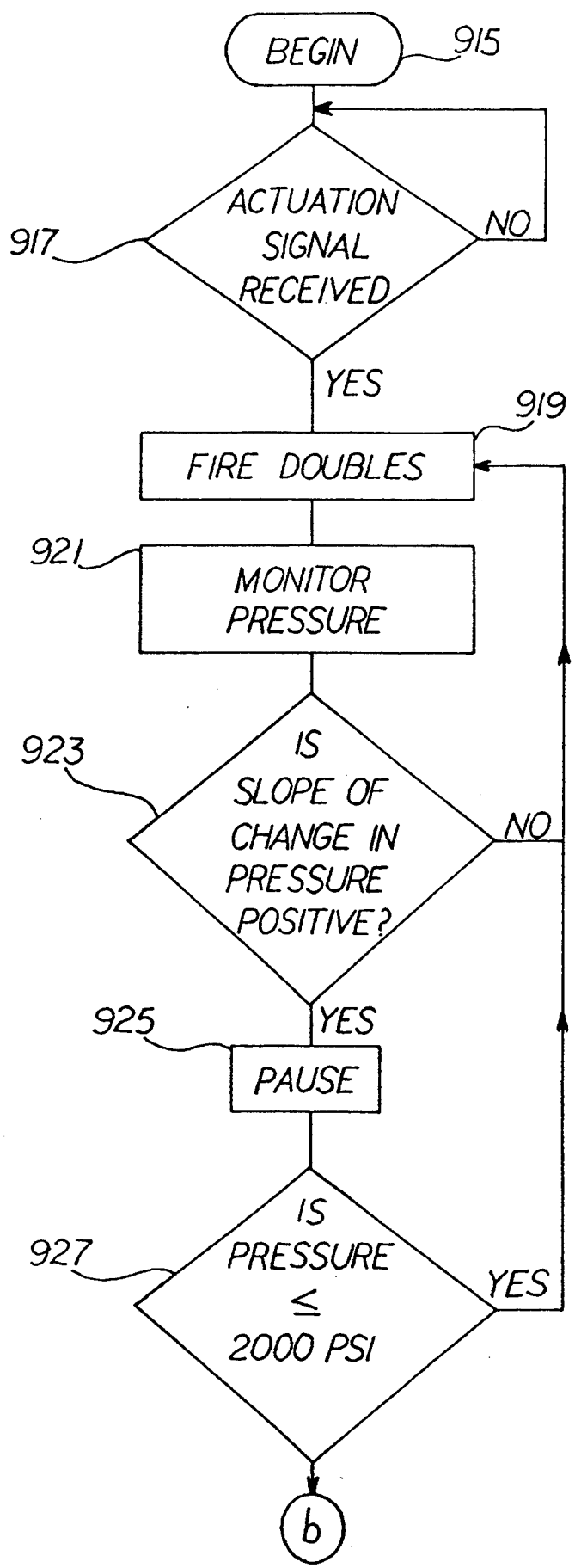
FIGS. 30a, 30b, and 30c are flowcharts depicting the program operation of the preferred actuation apparatus of the present invention.
Figure 30B:
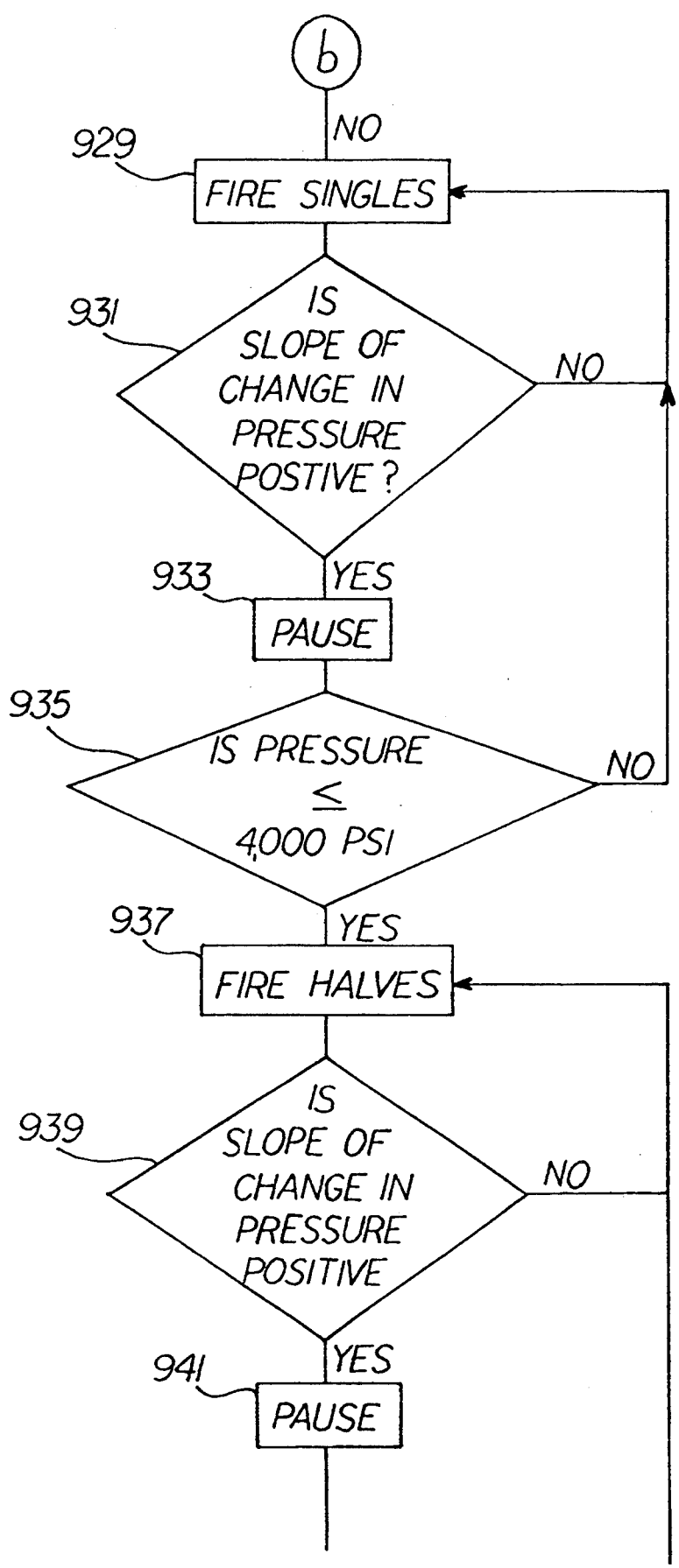
Figure 30C:
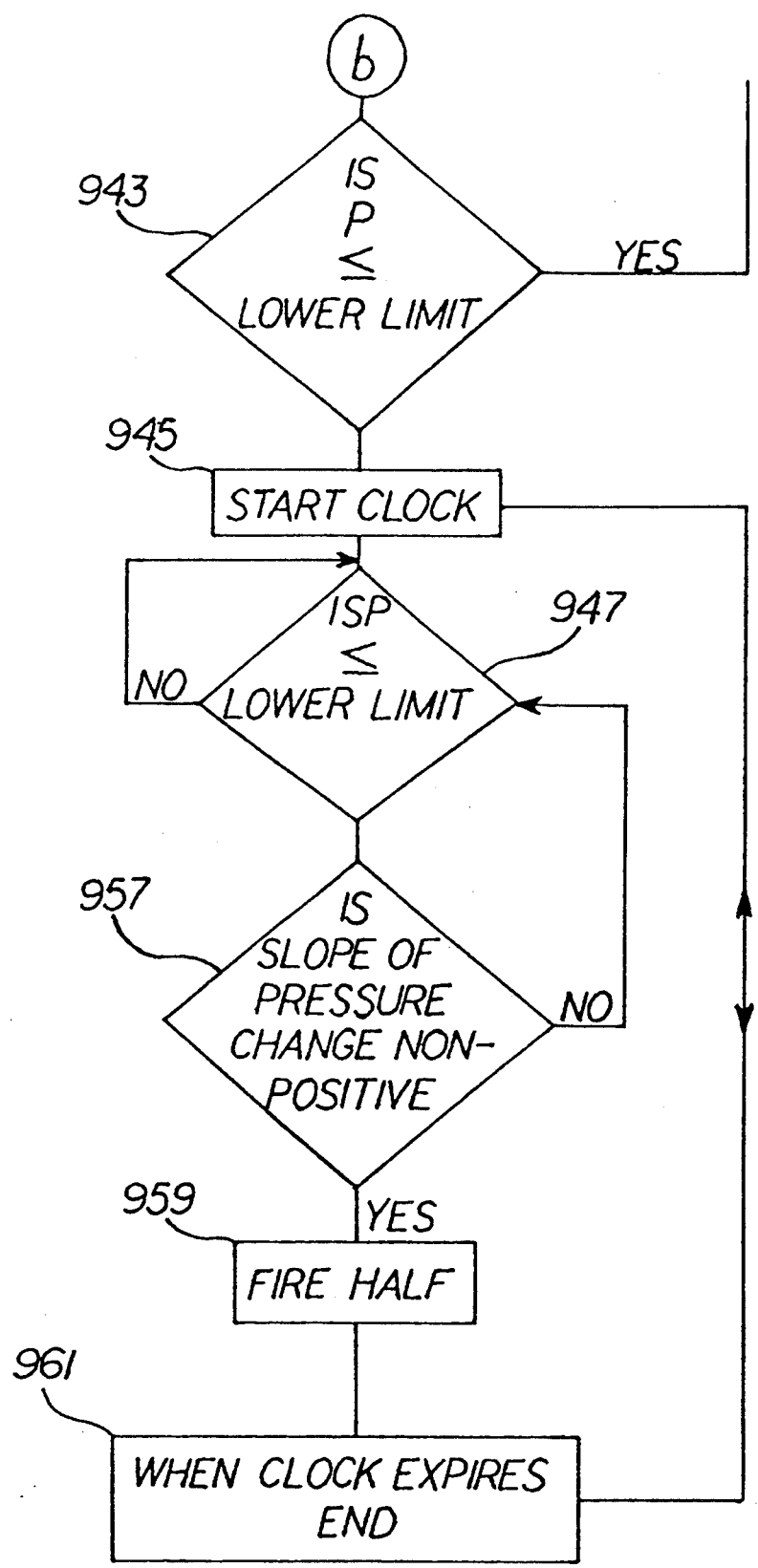

FIGS. 30a, 30b, and 30c should be read together as a single figure, and together depict, in flowchart form, the force moderation mode of operation of the present invention. The process begins at step 915. In step 917, the computer determines whether an actuation signal has been received. The actuation signal may comprise any conventional signal, such as those generated by manipulation of the tubing string or by manipulation of a column of fluid within the wellbore. However, in the present invention, the actuation signal would comprise a pattern of pressure surges which are detected through the imperforate wall of the wellbore apparatus of the present invention.

Once an actuation signal is determined to have been received, the process continues in step 919, in which the computer triggers the firing of doubles, to begin pressurization of annular region 819. In step 921, the computer monitors pressure at two or more time periods, and determines in step 923 if the change in pressure has a positive slope. If the changed pressure does not have a positive slope, this would indicate that the intended firing was not accomplished, so the process returns to step 919 for another firing of doubles. If, in step 923, it is determined that the slope of the change in pressure is positive, the process continues in step 925, wherein the computer pauses for a predetermined time interval to allow the thermally-activated material within the doubles to burn and release gas into the annular region 819.

Next, in step 927, the computer monitors the pressure to determine if it is less than or equal to 2,000 pounds per square inch. If so, the process returns to step 919; if not, the process continues in step 929, by firing of singles. In step 931, the computer determines if the slope in the change of pressure is positive. If not, the computer determines that the single was not properly fired, or misfired. If the slope is positive, the computer determines that the single has been properly fired, and pauses for a predetermined period in step 933.

The process continues in step 935, wherein the computer determines if the pressure is less than or equal to 4,000 pounds per square inch; if so, the process continues at step 929, by firing additional singles. If not, the process continues in step 937 by firing halves.

In step 939, the computer determines if the slope of the change in pressure is positive; if not, the computer determines that the attempt to fire halves has failed, or has otherwise been frustrated, so the process continues in step 937 by an additional half. If, in step 939, it is determined that the slope of the change of pressure is positive, the process continues 4 in step 941, wherein the computer pauses for a predetermined time interval to allow the material within the fired half to completely burn.

In step 943, the computer determines if the pressure is less than or equal to the lower pressure limit; if not, the process returns to step 937, where another half stick is fired.

In steps 919 through 943, the computer moderates the pressurization of annular region 819 by first firing doubles, then firing singles, and then firing halves. This procedure ensures that the annular region 819 will not become over-pressurized. After each firing, the computer determines if the pressure change within the pressure vessels defined by annular region 819 is positive or negative. A negative slope indicates that a misfiring has occurred. A positive slope indicates that proper firing has occurred, so the computer pauses for a predetermined period to allow all the material of the appropriate stick to be consumed by the gas-producing chemical reaction.

It is in step 947 that the computer determines whether the pressure within annular region 819 has exceeded the user-established lower pressure limit of the pressure span within which the user seeks to maintain prolonged force transference.

If, in step 943, it is determined that the pressure within annular region 819 has exceeded the user-established lower pressure limit, the process continues in step 945, wherein the computer starts a clock which will continue to run for the predetermined time interval.

The process continues in step 947, wherein the computer determines if the pressure within annular region 819 is less than or equal to the lower limit. If the pressure has fallen below the user-established lower limit, as determined in step 947, the process continues in step 949, wherein a half is fired. If it is determined, in step 947, that the pressure has not fallen below the user-established lower limit, the process continues in step 957, wherein the system the slope the pressure change.

In step 959, if the lower pressure limit has been violated, as determined in step 947, and the slope of the pressure change is determined to be non-positive, in step 957, the process continues by firing another half stick in step 959. The computer does nothing, in the event that user-selected upper pressure limit is exceeded. The computer system then attempts to maintain the pressure within the annular region at or above the lower limit for the user-selected time interval. When that time limit expires, as set forth in step 961, the process ends.

Essentially, the functional blocks of steps 947 through 961 establish a loop, wherein the computer is continually checking to determine if the pressure within annular region 819 either falls below, the user-established limits. In addition, the computer is continually determining whether the value of the clock has exceeded the user-established time interval limit. Rising above the user-established upper limit will cause no action. Falling below the user-established lower pressure limit will cause the firing of additional sticks to raise the pressure value above the minimum level provides the slope of the pressure is non-positive. Once the pressure within annular region 819 has been maintained within the desired pressure limits, for the desired time interval, the process ends.

This procedure is exemplified in the example of FIG. 31. As shown therein, doubles are fired from 0 to 2,000 pounds per square inch of pressure. Once 2,000 pounds per square inch of pressure has been obtained, the computer begins firing singles, until 4,000 pounds per square inch has been obtained within annular region 819. Once 4,000 pounds per square inch of pressure within annular region 819 has been obtained, the computer switches to firing halves, until the user-selected lower pressure limit of 5,500 pounds per square inch has been exceeded, which triggers the initiation of the software clock. Thereafter, the computer continually monitors the pressure within annular region 819, to determine whether it is within the bounds of the lower pressure limit which is established by the user, which in the example of FIG. 31, is 5,000 pounds per square inch of pressure. If the pressure falls below the lower limit, additional half sticks are fired. Once the pressure has been maintained substantially within the pressure span established by the user for the selected time interval, the process discontinues.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An actuator apparatus for use in a subterranean wellbore having a wellbore tool disposed therein which is operable in a plurality of operating modes and is switchable between selected modes of said plurality of operating modes upon receipt of a selected force pattern with respect to time by at least one force receptor member, wherein said subterranean wellbore has at least one tubular conduit disposed therein, one of which carries said wellbore tool, and wherein said subterranean wellbore includes at least one fluid column disposed therein which is in contact with said at least one tubular conduit, comprising:
   an electrically-actuable force generator assembly in force-transferring communication with said at least one force receptor member;
   a controller, electrically coupled to said electrically-actuable force generator assembly, operable in a plurality of operating modes, including:
      a programming mode of operation, wherein said controller receives selected force parameters which define said selected force pattern with respect to time which is required to switch said wellbore tool between selected modes of operation of said plurality of operating modes;
      an armed mode of operation, wherein said controller continually monitors for receipt of an actuation signal for initiation of force transfer to said wellbore tool; and
      a force moderation mode of operation, wherein said controller continually monitors force transference from said electrically-actuable force generator to said at least one force generator to said at least one force receptor member and selectively actuates said electrically-actuable force generator to obtain said selected force pattern.

2. An actuator apparatus according to claim 1:
   wherein, during said force moderation mode of operation, said controller provides said force pattern with respect to time independently of manipulation of said at least one tubular conduit disposed within said subterranean wellbore and independently of manipulation of said at least one fluid column disposed within said subterranean wellbore.

3. An actuator apparatus according to claim 1:
   wherein, during said armed mode of operation, said controller continually monitors for receipt of an external actuation signal which is initiated at a remote location and conveyed within said wellbore to said controller.

4. An actuator apparatus according to claim 1:
   wherein, during said armed mode of operation, said controller continually monitors for receipt of an actuation signal which is carried within a selected one of said at least one fluid column.

5. An actuator apparatus according to claim 1:
   wherein, during said armed mode of operation, said controller continually monitors for receipt of an actuation signal which comprises a pressure pattern which is carried within a selected one of said at least one fluid column.

6. An actuator apparatus according to claim 1:
   wherein, during said programming mode of operation, said controller receives selected force parameters which define at least one of a plurality of selectable force patterns.

7. An actuator apparatus according to claim 1:
   wherein, said wellbore tool includes at least one resilient member which is urged between selected shapes by application of said selected force patterns; and
   wherein, during said force moderation mode of operation, said controller causes said electrically-actuable force generator to apply a force of a selected pressure level and prolonged duration to said at least one force receptor member of said wellbore tool to ensure complete reshaping of said resilient member.

8. An actuator apparatus according to claim 7:
wherein said resilient member is formed of an elastomer.

9. An actuation apparatus according to claim 1:
wherein said electrically actuable force generator includes a piston member in communication with a source of pressure, and wherein application of pressure to said piston is moderated by said controller during said force moderation mode of operation.

10. An actuation apparatus according to claim 1:
wherein said electrically-actuable force generator is incrementally actuable by said controller during said force moderation mode of operation.

11. An actuation apparatus according to claim 1:
wherein said controller includes a monitor for continually determining actual force applied to said at least one force receptor member; and
wherein, during said force moderation mode of operation, said controller continually compares said actual force applied to said at least one force receptor member and a target force.

12. An actuator apparatus according to claim 11:
wherein, during said force moderation mode of operation, said controller continually compares said actual force applied to said at least one force receptor member at an inquiry time to a target force for a time interval corresponding to said inquiry time.

13. An actuator apparatus according to claim 11:
wherein, during said force moderation mode of operation, said controller continually compares said actual force applied to said at least one force receptor member to a target force span.

14. An actuator apparatus according to claim 11:
wherein, during said force moderation mode of operation, said controller continually compares said actual force applied to said at least one force receptor member at an inquiry time to a target force span for a time interval corresponding to said inquiry time.

15. An actuator apparatus, for use in a subterranean wellbore having a wellbore tool disposed therein which is operable in a plurality of operating modes and is switchable between selected modes of said plurality of operating modes upon receipt of force of a selected force level by at least one force receptor member, comprising:
a movable force-transferring member which is secured in a selected position relative to said wellbore tool and is in force-transferring communication with said at least one force receptor member of said wellbore tool, said movable force-transferring member also at least in-part defining a pressure containment member;
a sensor for detecting pressure in said pressure containment member and providing an electrical signal corresponding thereto;
an electrically-actuable pressure generation member in communication with said pressure containment member; and
a controller member coupled to said sensor and said electrically-actuable pressure generation member, which continuously compares said electrical signal of said sensor to a preselected pressure criteria and selectively electrically actuates said electrically-actuable pressure generation member to pressurize said containment member and drive said movable force-transferring member to apply said selected force level to said wellbore tool to switch it between selected modes of operation of said plurality of operating modes.

16. An actuator apparatus according to claim 15:
wherein said controllable member is responsive to a user-generated control signal which at least initiates actuation of said electrically-actuable pressure generation member.

17. An actuator apparatus according to claim 15:
wherein said controller member is responsive to at least one control signal in the form of hydraulic pressure imposed upon a fluid column in said subterranean wellbore.

18. An actuator apparatus according to claim 15:
wherein said controller member is responsive to at least one control signal in the form of a hydraulic pressure pattern imposed upon a fluid column in said subterranean wellbore.

19. An actuator apparatus according to claim 15:
wherein said controller member is responsive to at least one control signal in the form of a hydraulic pressure pattern imposed upon a fluid column in said subterranean wellbore which is user-generated at a location distant from said actuator apparatus.

20. An actuator apparatus according to claim 15:
wherein said preselected pressure criteria defines at least one pressure level.

21. An actuator apparatus according to claim 15:
wherein said preselected pressure criteria defines a plurality of differing pressure levels.

22. An actuator apparatus according to claim 15:
wherein said preselected pressure criteria defines at least one pressure level and at least one time interval.

23. An actuator apparatus according to claim 15:
wherein said preselected pressure criteria defines a plurality of pressure levels and a plurality of time intervals.

24. An actuator apparatus according to claim 15:
wherein said preselected pressure criteria defines a plurality of target pressure levels for said pressure containment member with respect to time.

25. An actuator apparatus according to claim 15:
wherein, during a programming mode of operation, values are established for said pressure criteria.

26. An actuator apparatus according to claim 15:
wherein, during a programming mode of operation, values are established for said preselected pressure criteria which define a force pattern which may be provided by said movable force-transferring member.

27. An actuator apparatus according to claim 15:
wherein electrically-actuable pressure generation member is selectively actuable by said controller member to provide a selectable pressure level within said pressure containment member which is established by said preselected pressure criteria.

28. An actuator apparatus according to claim 15:
wherein said control member includes a pre-programmable memory.

29. An actuator apparatus according to claim 15:
wherein said control member comprises a microprocessor with programmable memory.

30. An actuator apparatus according to claim 15:
wherein said control member comprises a microprocessor with a program resident in memory which receives said preselected pressure criteria during a programming mode of operation and which continually monitors pressure within said containment member during a pressurizing mode of operation and moderates operation of said electrically-actuable pressure generation member to ensure that pressure within said containment member corresponds to a pressure profile with respect to time which is established by said preselected pressure criteria.

31. An actuator apparatus according to claim 15:
wherein said control member comprises a microprocessor with a program resident in memory which receives a preselected pressure criteria which defines a selected force pattern with respect to time which is suited for a particular wellbore tool, and which moderates pressure within said containment member during a pressurization mode of operation by selective and repeated actuation of said electrically-actuable pressure generation member for selected pressurization with respect to time of said containment member and corresponding movement of said movable force-transmitting member with respect to time which applies said force with respect to time corresponding to selected force pattern to said force receptor member of said wellbore tool.

32. An actuator apparatus according to claim 15:
wherein said electrically-actuable pressure generation member includes a plurality of individually-actuable pressure generation components which define an array of selectively actuable pressure generators.

33. An actuator apparatus according to claim 15:
wherein said electrically-actuable pressure generation member includes a plurality of individually-actuable gas generators, each of which is separably actuable by said controller member.

34. An actuator apparatus for use in a subterranean wellbore having a wellbore tool disposed therein which is operable in a plurality of operating modes upon receipt of a selected force pattern with respect to time by at least one force receptor member, wherein said subterranean wellbore has at least one tubular conduit disposed therein, one of which carries one fluid column disposed therein which is in contact with said at least one tubular conduit, comprising:
an electrically actuable force generator assembly in force-transferring communication with said at least one force receptor member:
a controller, electrically coupled to said electrically-actuable force generator assembly, operable in a plurality of operating modes, including:
a force moderation mode of operation, wherein said controller continually monitors force transference from said electrically-actuable force generator to said at least one force generator to said at least one force receptor member and selectively actuates said electrically-actuable force generator to obtain said selected force pattern.

35. An actuator apparatus according to claim 34:
wherein, during said force moderation mode of operation, said controller provides said force pattern with respect to time independently of manipulation of said at least one tubular conduit disposed within said subterranean wellbore and independently of manipulation of said at least one fluid column disposed within said subterranean wellbore.

36. An actuator apparatus according to claim 34:
wherein, said wellbore tool includes at least one resilient member which is urged between selected shapes by application of said selected force patterns: and
wherein, during said force moderation mode of operation, said controller causes said electrically-actuable force generator to apply a force of a selected pressure level and prolonged duration to said at least one force receptor member of said wellbore tool to ensure complete reshaping of said resilient member.

37. An actuator apparatus according to claim 36:
wherein said resilient member is formed of an elastomer.

38. An actuator apparatus according to claim 34:
wherein said electrically actuable force generator includes a piston member in communication with a source of pressure, and wherein application of pressure to said piston is moderated by said controller during said force moderation mode of operation.

39. An actuation apparatus according to claim 34:
wherein said electrically-actuable force generator is incrementally actuable by said controller during said force moderation mode of operation.

40. An actuation apparatus according to claim 34:
wherein said controller includes a monitor for continually determining actual force applied to .said at least one force receptor member; and
wherein, during said force moderation mode of operation, said controller continually compares said actual force applied to said at least one force receptor member and a target force.

41. An actuator apparatus according to claim 40:
wherein, during said force moderation mode of operation, said controller continually compares said actual force applied to said at least one force receptor member at an inquiry time to a target force for a time interval corresponding to said inquiry time.

42. An actuator apparatus according to claim 40:
wherein, during said force moderation mode of operation, said controller continually compares said actual force applied to said at least one force receptor member to a target force span.

43. An actuator apparatus according to claim 40:
wherein, during said force moderation mode of operation, said controller continually compares said actual force applied to said at least one force receptor member at an inquiry time to a target force span for a time interval corresponding to said inquiry time.

* * * * *